US007999958B2

(12) United States Patent
Matsuda

(10) Patent No.: US 7,999,958 B2
(45) Date of Patent: Aug. 16, 2011

(54) PRINTING SYSTEM, JOB PROCESSING METHOD, AND STORAGE MEDIUM

(75) Inventor: Hiroshi Matsuda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1055 days.

(21) Appl. No.: 11/782,789

(22) Filed: Jul. 25, 2007

(65) Prior Publication Data

US 2008/0024807 A1 Jan. 31, 2008

(30) Foreign Application Priority Data

Jul. 28, 2006 (JP) ................................ 2006-207171

(51) Int. Cl.
*G06F 15/00* (2006.01)
*G06G 15/00* (2006.01)

(52) U.S. Cl. ........................................ 358/1.15; 399/23

(58) Field of Classification Search ................. 358/1.15, 358/1.14, 1.18, 1.9, 468, 1.12, 1.2, 3.29, 358/302, 524, 450, 453; 399/23, 24, 10, 399/81, 384, 406; 400/593, 621, 73; 270/39.05, 270/52.02; 156/269, 522
See application file for complete search history.

(56) References Cited

U.S. PATENT DOCUMENTS

2007/0013959 A1* 1/2007 Miwa ........................... 358/304

FOREIGN PATENT DOCUMENTS

JP 2004-310746 A 11/2004
JP 2004-310747 A 11/2004

* cited by examiner

*Primary Examiner* — Saeid Ebrahimi Dehkordy
(74) *Attorney, Agent, or Firm* — Rossi, Kimms & McDowell LLP

(57) ABSTRACT

A printing system adapted to be able to supply printing media of a job subjected to a printing process by a printing apparatus from the printing apparatus to a cutting apparatus, the cutting apparatus being capable of performing a cutting process for the printing media, includes a controller that permits printing print data of a job in a specific area on a printing medium by the printing apparatus in case that the job to be processed is a first type job that does not need the cutting process by the cutting apparatus, the controller inhibiting printing print data of a job in the specific area on the printing medium by the printing apparatus in case that the job to be processed is a second type job that needs the cutting process by the cutting apparatus.

11 Claims, 39 Drawing Sheets

FIG. 26

2600

| CUTTING METHOD | RIP IMAGE GENERATION METHOD |
|---|---|
| CUTTING BY INLINE FINISHER | GENERATE BITMAP IMAGE IN WHICH RENDERING (BLEED, ETC.) OUTSIDE FINISHING-SIZE RECTANGLE IS LIMITED. |
| CUTTING BY NON-INLINE FINISHER (NEAR-LINE FINISHER OR OFFLINE FINISHER) | GENERATE BITMAP IMAGE IN WHICH RENDERING (BLEED, ETC.) OUTSIDE FINISHING-SIZE RECTANGLE IS SET. |

FIG. 28

2800

| HOLDING OF PRINT IMAGE | CUTTING METHOD (INITIAL DESIGNATION IN BOX STORAGE) | RIP IMAGE GENERATION METHOD |
|---|---|---|
| ONLY PRINT AND NOT HOLD | CUTTING BY INLINE FINISHER | GENERATE BITMAP IMAGE IN WHICH RENDERING (BLEED, ETC.) OUTSIDE FINISHING-SIZE RECTANGLE IS LIMITED |
| | CUTTING BY NON-INLINE FINISHER | GENERATE BITMAP IMAGE IN WHICH RENDERING (BLEED, ETC.) OUTSIDE FINISHING-SIZE RECTANGLE IS SET |
| STORE IN BOX OR STORE IN BOX AFTER PRINTING | CUTTING BY INLINE FINISHER | GENERATE BOTH BITMAP IMAGE IN WHICH RENDERING (BLEED, ETC.) OUTSIDE FINISHING-SIZE RECTANGLE IS LIMITED, AND BITMAP IMAGE IN WHICH RENDERING (BLEED, ETC.) OUTSIDE FINISHING-SIZE RECTANGLE IS SET |
| | CUTTING BY NON-INLINE FINISHER | GENERATE BITMAP IMAGE IN WHICH RENDERING (BLEED, ETC.) OUTSIDE FINISHING-SIZE RECTANGLE IS SET |

FIG. 29

2900

| CUTTING METHOD | PRINT DATA GENERATION METHOD |
|---|---|
| CUTTING BY INLINE FINISHER | GENERATE PRINT DATA IN WHICH RENDERING (BLEED, ETC.) OUTSIDE FINISHING-SIZE RECTANGLE IS LIMITED |
| CUTTING BY NON-INLINE FINISHER (NEAR-LINE FINISHER OR OFFLINE FINISHER) | GENERATE PRINT DATA IN WHICH RENDERING (BLEED, ETC.) OUTSIDE FINISHING-SIZE RECTANGLE IS SET |

PRINTING SYSTEM, JOB PROCESSING METHOD, AND STORAGE MEDIUM

BACKGROUND OF THE INVENTION

1. Field of the Invention

The present invention relates to a printing system, job processing method, and storage medium.

2. Description of the Related Art

In the commercial printing industry, publications are issued through various work steps. These work steps include a document entry, document design, layout editing, comprehensive layout (presentation by printing), proofreading (layout correction and color correction), proof (proof print), block copy preparation, printing, post-process, and shipping.

The commercial printing industry often uses an offset reproduction printing press in the printing step, and the block copy preparation step is inevitable. However, once the block copy is prepared, it is difficult and disadvantageous in terms of cost to correct the block copy. In block copy preparation, therefore, careful proofreading (i.e., careful layout check and color confirmation) is indispensable. Some period of time is generally taken until publication is complete.

In the commercial printing industry, most of apparatuses used in respective work steps are bulky and expensive. In addition, work with these apparatuses requires expert knowledge, and know-how of experts is indispensable. Against the commercial printing industry, a so-called POD (Print On Demand) market is about to appear with the advent of high-speed and high-quality electrophotographic and inkjet printing apparatuses.

The POD market appears to replace large-scale printing presses and printing methods so as to deal with jobs of relatively small lots within a short period without using any bulky apparatus or system. In the POD market, digital printing using electronic data can be implemented to provide printing services and the like by making the best of printing apparatuses such as a digital copying machine and digital multifunction peripheral.

Devices in the POD market advance digitization more than in the conventional commercial printing industry, and management and control using computers has become widespread. In the POD market, a printed material can be issued within a short period. As another advantage, the POD market does not require any know-how of the operator. Recent devices in the POD market are achieving almost the same image quality of printed materials as the level of the commercial printing industry.

Patent references 1 and 2 disclose image forming systems which optimize scheduling in consideration of an efficient work order, the order of other jobs, and the like. Office-equipment makers and the like are studying these image forming systems for entry into a new POD market. Particularly in recent days, printing apparatuses and printing systems have been examined which suit not only the office environment but also the POD environment expected to have cases of use and needs different from those in the office environment. In the printing environment in the POD market, how to increase the productivity of the printing system is an important consideration. It is also important to provide a printing system that is convenient to the operator while maintaining high productivity.

[Patent Reference 1] Japanese Patent Laid-Open No. 2004-310746

[Patent Reference 2] Japanese Patent Laid-Open No. 2004-310747

However, there is room for further study in commercializing a printing system suitable to even the POD environment. It should be noted that there are objects rendered even outside an area finally cut by a finisher in the POD environment. Such objects are a printer's mark, color bar, bleed, page information, and the like. These objects are necessary when cutting sheets by an offline or near-line finisher, but lead to an unnecessary rendering process when cutting sheets by an inline finisher. A minimum bleed is necessary, but an excessive bleed results in an unnecessary rendering process. More specifically, no object need be printed for an inline type printing system because apparatuses are electrically connected to each other and can electrically transfer necessary information to a succeeding apparatus. If an unnecessary rendering process is done for all printed materials, toner consumption reduces the profits of an office-equipment distributor or printing company. An unnecessary RIP process for print data may degrade RIP performance, and large-size image data after RIP may occupy extra storage space.

SUMMARY OF THE INVENTION

The present invention enables realization of a printing system capable of building an efficient printing environment.

According to one aspect of the present invention, a printing system adapted to be able to supply printing media of a job subjected to a printing process by a printing apparatus from the printing apparatus to a cutting apparatus, the cutting apparatus being capable of performing a cutting process for the printing media, the printing system comprises:

a controller adapted to permits printing print data of a job in a specific area on a printing medium by the printing apparatus in case that the job to be processed is a first type job that does not need the cutting process by the cutting apparatus, the controller inhibiting printing print data of a job in the specific area on the printing medium by the printing apparatus in case that the job to be processed is a second type job that needs the cutting process by the cutting apparatus.

According to another aspect of the present invention, a job processing method for a printing system adapted to be able to supply printing media of a job subjected to a printing process by a printing apparatus from the printing apparatus to a cutting apparatus, the cutting apparatus being capable of performing a cutting process for the printing media, the method comprises the steps of:

permitting printing print data of a job in a specific area on a printing medium by the printing apparatus in case that the job to be processed is a first type job that does not need the cutting process by the cutting apparatus; and inhibiting printing print data of a job in the specific area on the printing medium by the printing apparatus in case that the job to be processed is a second type job that needs the cutting process by the cutting apparatus.

Further features of the present invention will be apparent from the following description of exemplary embodiments with reference to the attached drawings.

BRIEF DESCRIPTION OF THE DRAWINGS

FIG. 26 is a table showing the contents of a management table looked up by the control unit according to the first embodiment;

FIG. 28 is a table showing the contents of a management table looked up by a control unit according to the second embodiment; and FIG. 29 is a table showing a management table looked up by a control unit according to another embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Configuration of Printing System]

Figure 1:
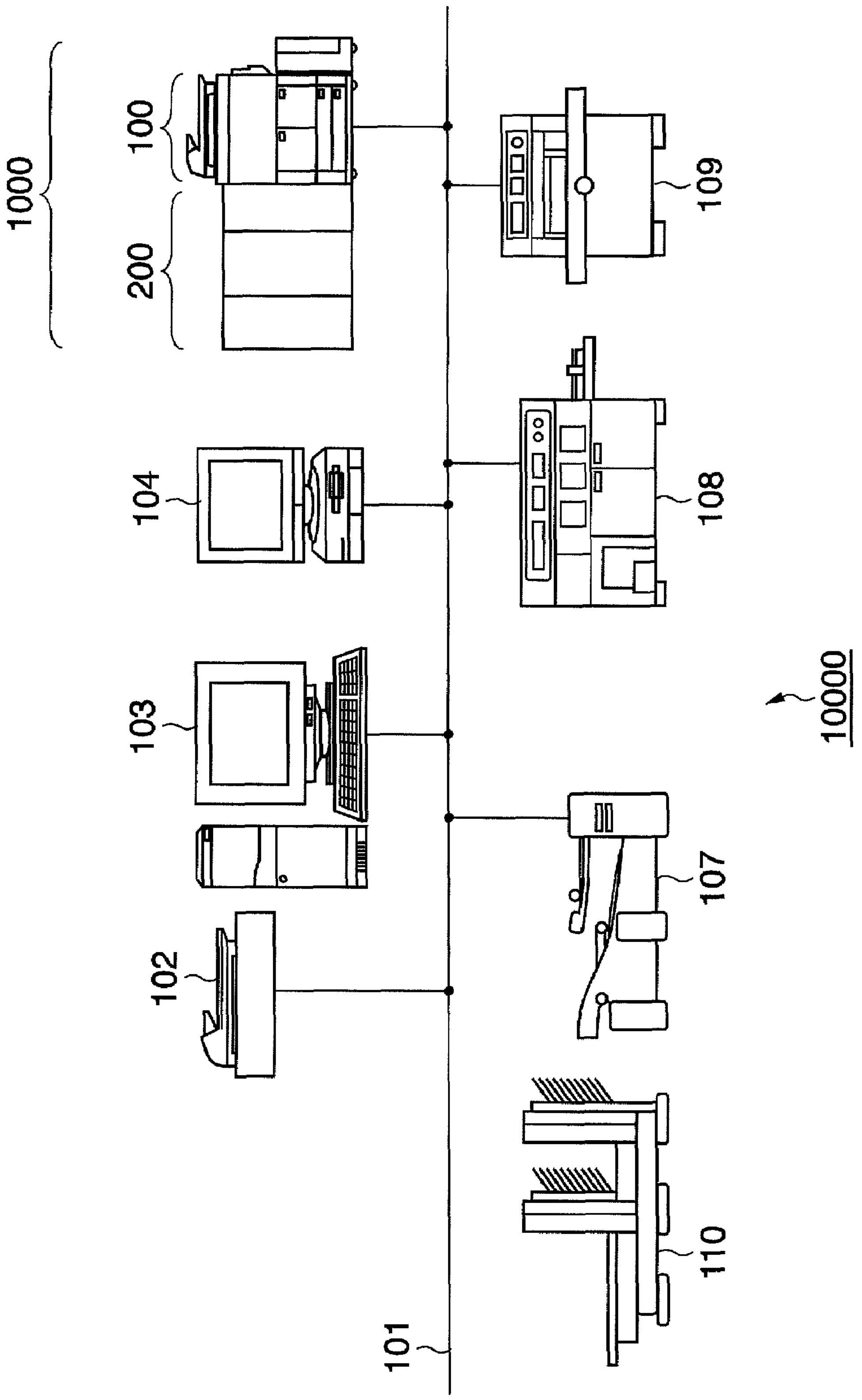
FIG. 1 is a view showing an overall configuration of a printing environment including a printing system 1000 according to the first embodiment.

The embodiment assumes a printing environment (POD environment) different from the office environment in order to solve problems described in Description of the Related Art. The embodiment will explain the system environment of an entire POD environment site (POD system 10000 in FIG. 1) including a printing system 1000. FIG. 1 is a view showing an overall configuration of the POD system 10000 including the printing system 1000 according to the first embodiment.

In the embodiment, a printing environment where the printing system 1000 is applicable is also suited to the POD environment and is called the POD system 10000.

The POD system 10000 in FIG. 1 comprises, as building components, the printing system 1000 of the embodiment, and a server computer 103 and client computer 104 (to be referred to as PCs 103 and 104 hereinafter). The POD system 10000 also comprises a paper folding apparatus 107, cutting apparatus 109, saddle stitching apparatus 110, case binding apparatus 108, scanner 102, and the like. In this manner, a plurality of apparatuses are prepared in the POD system 10000.

The printing system 1000 comprises a printing apparatus main body 100 and sheet processing apparatus 200 as building components. As an example of the printing apparatus 100, the embodiment will explain a multifunction peripheral having a plurality of functions such as the copy function and print function. However, the printing apparatus 100 may be a single function type printing apparatus having only the print function or copy function. The multifunction peripheral will also be called an MFP hereinafter.

The paper folding apparatus 107, cutting apparatus 109, saddle stitching apparatus 110, and case binding apparatus 108 in FIG. 1 serve as sheet processing apparatuses 200 of the printing system 1000. For example, the paper folding apparatus 107 folds sheets printed by the printing apparatus 100. The cutting apparatus 109 cuts a bundle of sheets printed by the printing apparatus 100. The saddle stitching apparatus 110 saddle-stitches sheets of a job printed by the printing apparatus 100. The case binding apparatus 108 case-binds sheets of a job printed by the printing apparatus 100. In a conventional printing system, an operator must take out printed materials (e.g., sheets) printed by the printing apparatus 100 from the delivery unit of the printing apparatus 100, and set the printed materials in a target sheet processing apparatus.

However, the printing system 1000 according to the embodiment does not require any intervention work by the operator after the printing apparatus 100 executes a printing process. For example, the printing apparatus 100 can directly supply sheets to the sheet processing apparatus 200. More specifically, the sheet feeding path in the printing apparatus 100 couples to that in the sheet processing apparatus 200. In this manner, the sheet processing apparatus 200 and printing apparatus 100 of the printing system 1000 are physically connected to each other. In addition, the printing apparatus 100 and sheet processing apparatus 200 comprise CPUs, are electrically connected to each other, and can communicate data in two ways.

In the embodiment, the control unit of the printing system comprehensively controls the printing apparatus 100 and sheet processing apparatus 200. An example of comprehensively controlling the printing apparatus 100 and sheet processing apparatus by a control unit 205 of the printing apparatus 100 will be explained. In the embodiment, these sheet processing apparatuses are also called post-processing apparatuses or post-presses.

All these apparatuses in the POD system 10000 except the saddle stitching apparatus 110 connect to a network 101 so as to communicate data with each other.

For example, the POD system 10000 causes the printing apparatus 100 to print the print data of a job transmitted from the PC 103 or 104 or the like via the network 101.

For example, the PC 103 can manage all jobs to be processed in the POD system 10000 by transmitting/receiving data to/from another apparatus by network communication. That is, the PC 103 functions as a PC which comprehensively manages a series of workflow steps including a plurality of process steps. The PC 103 determines post-process conditions capable of finishing in the environment based on a job instruction accepted from an operator. In addition, the PC 103 designates a post-process (finishing process) step complying with a request from an end user (customer who requests printing in this example). At this time, the PC 103 uses information exchange tools such as JDF to exchange information with respective post-processing devices using commands and statuses in post-presses.

The embodiment classifies sheet processing apparatuses applied to the POD system 10000 having the above-mentioned building components into three categories and defines them as follows.

[Definition 1]

A sheet processing apparatus which satisfies both (condition 1) and (condition 2) listed below is defined as an "inline finisher". The embodiment also refers to an apparatus satisfying this definition as an inline type sheet processing apparatus.

(Condition 1) The paper path (sheet feeding path) is physically connected to the printing apparatus 100 50 as to directly receive sheets conveyed from the printing apparatus 100 without any operator intervention.

(Condition 2) A sheet processing apparatus is electrically connected to another apparatus so as to communicate data necessary for an operation instruction, status confirmation, or the like with another apparatus. More specifically, a sheet processing apparatus is electrically connected to the printing apparatus 100 so as to communicate data with it, or electrically connected to an apparatus (e.g., the PC 103 or 104) other than the printing apparatus 100 via the network 101 so as to communicate data with the apparatus. A sheet processing apparatus which satisfies either condition meets (condition 2).

The sheet processing apparatus 200 of the printing system 1000 according to the embodiment corresponds to an "inline finisher".

[Definition 2]

A sheet processing apparatus which satisfies not (condition 1) out of (condition 1) and (condition 2) listed above but satisfies (condition 2) is defined as a "near-line finisher". The embodiment also refers to an apparatus satisfying this definition as a near-line type sheet processing apparatus.

For example, the paper path of a near-line type sheet processing apparatus is not connected to the printing apparatus 100, and the near-line type sheet processing apparatus requires intervention work by an operator such as carrying of a printed material. However, the sheet processing apparatus can electrically exchange information such as an operation instruction or status confirmation via a communication means such as the network 101. A sheet processing apparatus which meets these conditions will be defined as a "near-line finisher".

For example, the paper folding apparatus 107, cutting apparatus 109, and case binding apparatus 108 shown in FIG. 1 correspond to "near-line finishers".

[Definition 3]

A sheet processing apparatus which satisfies neither (condition 1) nor (condition 2) listed above is defined as an "offline finisher". The embodiment also refers to an apparatus satisfying this definition as an offline type sheet processing apparatus.

For example, the paper path of an offline type sheet processing apparatus is not connected to the printing apparatus 100, and the offline type sheet processing apparatus requires intervention work by an operator such as carrying of a printed material. Further, the sheet processing apparatus does not comprise any communication unit necessary for an operation instruction and status confirmation, and cannot communicate data with another apparatus. Thus, the operator carries an output material, sets it, manually inputs an operation, and manually gives a status report from the device. A sheet processing apparatus which meets these conditions will be defined as an "offline finisher".

For example, the saddle stitching apparatus 110 shown in FIG. 1 corresponds to an "offline finishers".

The POD system 10000 comprises a plurality of the sheet processing apparatuses, and can execute various sheet processes for sheets output from the printing apparatus 100. For example, the POD system can perform sheet processes such as a cutting process, saddle stitching process, case binding process, sheet folding process, punch pressing process, enclosing process, and collecting process.

Near-line finishers and offline finishers managed by the PC 103 include various finishers such as a dedicated stapler, dedicated puncher, enclosure, and collator. The PC 103 grasps a device status and job status from near-line finishers via the network 101 by sequential polling or the like using a predetermined protocol. In addition, the PC 103 manages the execution statuses (progresses) of jobs processed in the environment.

In the embodiment, different sheet processing apparatuses may execute the aforementioned sheet processes, or one sheet processing apparatus may execute a plurality of types of sheet processes.

The printing system 1000 in FIG. 1 comprises the printing apparatus 100, and the sheet processing apparatuses 200 detachable from the printing apparatus 100. The sheet processing apparatus 200 in the embodiment is physically, electrically connected to the printing apparatus 100. Thus, the sheet processing apparatus 200 can directly receive, via the sheet feeding path, sheets printed by the printing apparatus 100. The sheet processing apparatus 200 executes a sheet process requested by a user together with a print execute request via a user interface unit for sheets printed by a printer unit 203 of the printing apparatus 100. This is apparent from the fact that the sheet processing apparatus 200 is an inline type sheet processing apparatus as described above.

It should be noted that the sheet processing apparatus 200 in the embodiment can also be defined as a group of sheet processing apparatuses. This is because in the embodiment, a plurality of sheet processing apparatuses, which are independent housings and independently available, are coupled to the printing apparatus 100 and are available as the sheet processing apparatuses 200. For example, the printing system 1000 shown in FIG. 1 comprises the printing apparatus 100 and three sheet processing apparatuses. That is, in the printing system 1000 in FIG. 1, three sheet processing apparatuses are series-connected to the printing apparatus 100. In this example, an arrangement in which a plurality of sheet processing apparatuses are connected to the printing apparatus 100 is called a cascade connection. All sheet processing apparatuses cascade-connected to the printing apparatus 100 function as inline finishers. The control unit 205 in FIG. 2 serving as an example of the control unit of the printing system 1000 comprehensively controls the printing apparatus 100 and a plurality of inline type sheet processing apparatuses, and executes various control operations to be described below in the embodiment.

Checked Up to Here

[Internal Configuration of Printing System]

Figure 2:
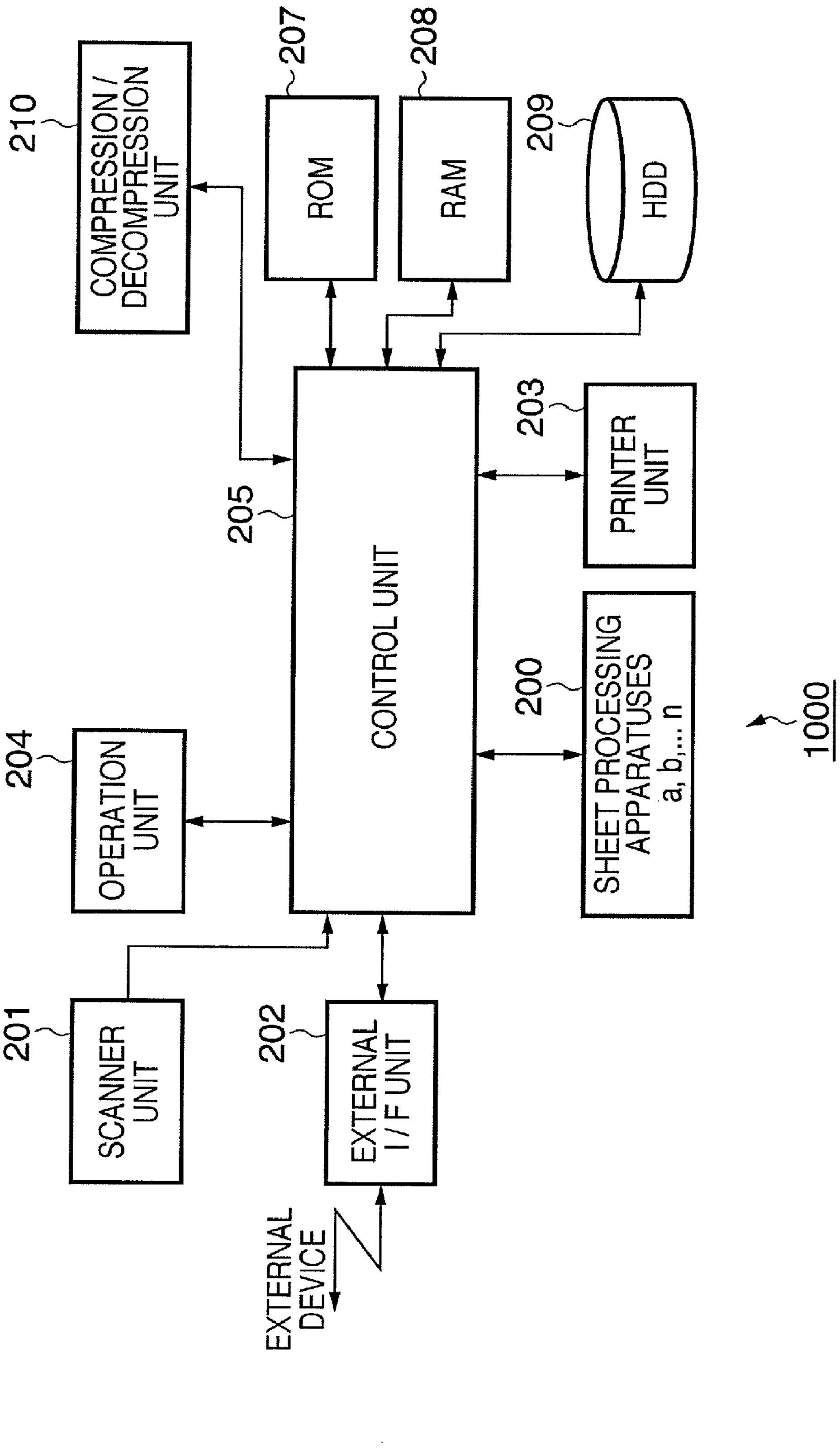
FIG. 2 is a block diagram showing a configuration of the printing system 1000 according to the first embodiment.

The internal configuration (mainly software configuration) of the printing system 1000 will be explained with reference to the system block diagram of FIG. 2. FIG. 2 is a block diagram showing a configuration of the printing system 1000 according to the first embodiment. In this example, the printing apparatus 100 incorporates all the units of the printing system 1000 shown in FIG. 2 except the sheet processing apparatus 200. Strictly speaking, the sheet processing apparatus 200 is a series of sheet processing apparatuses configurable by a plurality of inline type sheet processing apparatuses. The sheet processing apparatus 200 is detachable from the printing apparatus 100, and is providable as an option of the printing apparatus 100. This configuration aims to provide a necessary number of inline finishers in the POD environment.

The printing apparatus 100 comprises a nonvolatile memory such as a hard disk 209 (to be also referred to as an HDD hereinafter) capable of storing a plurality of job data to be processed. The printing apparatus 100 has the copy function of printing, by the printer unit 203 via the HDD, job data accepted from a scanner unit 201 of the printing apparatus 100. The printing apparatus 100 also has the print function of printing, by the printer unit 203 via the HDD, job data accepted from an external apparatus such as the PC 103 or 104 via an external I/F unit 202 serving as an example of a communication unit. The printing apparatus 100 is an MFP type printing apparatus having a plurality of functions.

The printing apparatus according to the embodiment may be a color or monochrome printing apparatus as long as it can execute various control operations described in the embodiment.

The printing apparatus 100 according to the embodiment comprises the scanner unit 201 which scans a document image and processes scanned image data. The printing apparatus 100 also comprises the external I/F unit 202 which transmits/receives image data to/from a facsimile device, network connection device, or external dedicated device. The printing apparatus 100 comprises the hard disk 209 capable of storing image data of jobs to be printed that are accepted from either the scanner unit 201 or external I/F unit 202. The printing apparatus 100 comprises the printer unit 203 which prints a target job stored in the hard disk 209 on a printing medium. The printing apparatus 100 further comprises an operation unit 204 which has a display unit and serves as an example of the user interface unit of the printing system 1000. Other examples of the user interface unit provided by the printing system 1000 are the display unit, keyboard, and mouse of an external apparatus such as the PC 103 or 104.

The controller (to be also referred to as a control unit or CPU) 205 serving as an example of the control unit of the printing system 1000 comprehensively controls the processes, operations, and the like of various units of the printing system 1000. A ROM 207 stores programs for executing various processes of a flowchart shown in FIG. 23 (to be described later) and the like. The ROM 207 also stores a display control program for displaying various UI windows on the display unit of the operation unit 204 including user interface windows (to be referred to as UI windows hereinafter) shown in the accompanying drawings. The control unit 205 reads out and executes programs from the ROM 207 to cause the printing apparatus to execute various operations described in the embodiment. The ROM 207 also stores, e.g., a program for executing an operation to analyze PDL (Page Description Language) code data received from an external apparatus (e.g., the PC 103 or 104) via the external I/F unit 202, and rasterizes the PDL code data into raster image data (bitmap image data).

The ROM 207 is a read-only memory, and stores various programs such as a boot sequence and font information in advance. A RAM 208 is a readable/writable memory, and stores image data, various programs, and setting information sent from the scanner unit 201 or external I/F unit 202 via a memory controller.

The HDD (hard disk) 209 is a large-capacity storage device which stores image data compressed by a compression/decompression unit 210. The HDD 209 stores a plurality of data such as print data of a job to be processed. The control unit 205 controls to print, by the printer unit 203 via the HDD 209, job data input via various input units such as the scanner unit 201 and external I/F unit 202. The control unit 205 also controls to transmit job data to an external apparatus via the external I/F unit 202. The compression/decompression unit 210 compresses/decompresses image data and the like stored in the RAM 208 and HDD 209 in accordance with various compression schemes such as JBIG and JPEG.

The control unit 205 functions as a determination unit, and determines whether a plurality of sheet processing apparatuses are physically, electrically connected to the printing apparatus. That is, the control unit 205 determines whether the sheet processing apparatuses 200 are connected in line to the printing apparatus 100. When the sheet processing apparatuses 200 are connected physically and electrically, the control unit 205 functions as a print limiting unit, and limits a supplementary area which exceeds the finishing size of a sheet after a sheet process and is used to print an image for assisting a sheet process. The control unit 205 limits the supplementary area because when the sheet processing apparatuses 200 are connected in line to the printing apparatus 100, an image printed in the supplementary area to assist a sheet process is not necessary. When the sheet processing apparatuses 200 are connected in line, the printing apparatus 100 may electrically transfer information for assisting a sheet process. The printing apparatus 100 can suppress an unnecessary printing process and reduce the toner consumption amount.

[Apparatus Configuration of Printing System]

Figure 3:
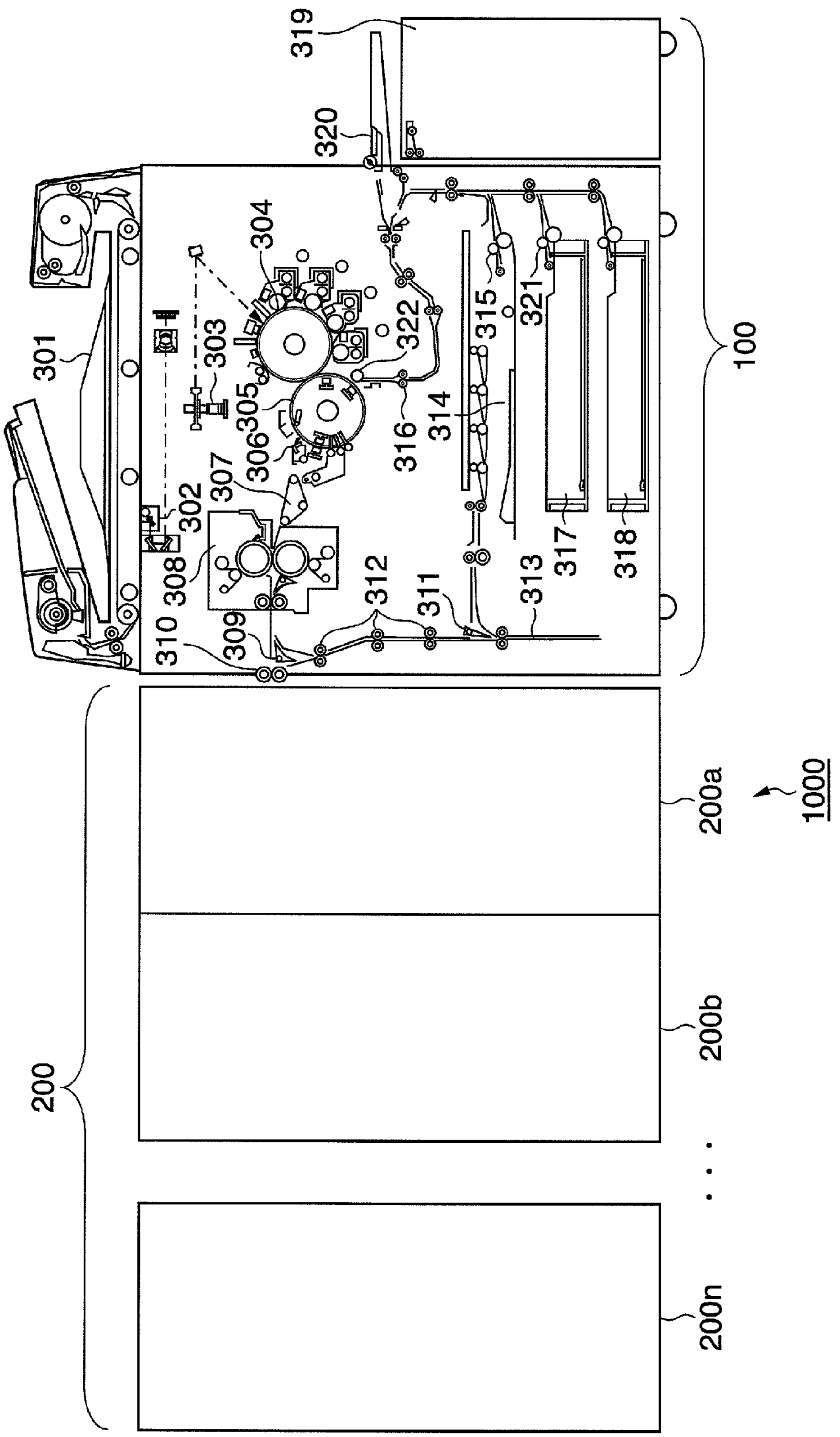
FIG. 3 is a sectional view showing a configuration of the printing system 1000 according to the first embodiment.

The configuration (mainly mechanical structure) of the printing system 1000 will be explained with reference to FIG. 3. FIG. 3 is a sectional view showing a configuration of the printing system 1000 according to the first embodiment.

Assume that N sheet processing apparatuses 200 are connectable as a series of sheet processing apparatuses. Sheet processing apparatuses are defined as sheet processing apparatuses 200*a*, 200*b*, . . . sequentially from the first sheet processing apparatus, and the Nth sheet processing apparatus is a sheet processing apparatus 200*n*.

A mechanical structure when the printing apparatus 100 executes a printing process will be explained. The controller (to be also referred to as a control unit or CPU hereinafter) 205 in FIG. 2 causes the printing apparatus 100 to execute the printing process. A paper handling operation and the like until printed sheets are supplied from the printer unit 203 into the sheet processing apparatus 200 will be explained.

Reference numeral 301 corresponds to the mechanical structure of the scanner unit 201 in FIG. 2. Reference numerals 302 to 322 correspond to the mechanical structure of the printer unit 203 in FIG. 2. The embodiment will describe the structure of a 1D type color MFP.

The automatic document feeder (ADF) 301 in FIG. 3 separates the first and subsequent document sheets in the order of pages from a document bundle set on the support surface of the document tray, and feeds each document sheet to the glass document table in order to scan the document sheet by the scanner 302. The scanner 302 scans the image of the document sheet fed onto the glass document table, and converts the image into image data by a CCD. The rotary polygon mirror 303 receives a light ray (e.g., a laser beam) modulated in accordance with the image data, and irradiates the photosensitive drum 304 with the reflected scan beam via a reflecting mirror, forming a latent image on the photosensitive drum 304. The latent image is developed with toner, and the toner image is transferred onto a sheet material adhered onto the transfer drum 305. A series of image forming processes are executed sequentially with yellow (Y), magenta (M), cyan (C), and black (K) toners, forming a full-color image. After four image forming processes, the sheet material on the transfer drum 305 is separated by the separation gripper 306, and conveyed to the fixing unit 308 by the pre-fixing conveyor 307.

The fixing unit 308 comprises a combination of rollers and belts, and incorporates a heat source such as a halogen heater. The fixing unit 308 fuses and fixes, by heat and pressure, toner on a sheet material bearing a toner image. The delivery flapper 309 is swingable about the swing shaft, and regulates the sheet material conveyance direction. When the delivery flapper 309 swings clockwise in FIG. 3, a sheet material is conveyed straight, and discharged outside the apparatus by the delivery rollers 310. To form images on the two surfaces of a sheet material, the delivery flapper 309 swings counterclockwise in FIG. 3, and the course of the sheet material changes downward to supply the sheet material to the double-sided conveyance section. The double-sided conveyance section comprises the reverse flapper 311, reverse rollers 312, reverse guide 313, and double-sided tray 314.

The reverse flapper 311 is swingable about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is conveyed in an opposite direction to replace its trailing and leading ends, and then the sheet is guided to the double-sided tray 314.

The double-sided tray 314 temporarily supports the sheet, and the refeed roller 315 supplies the sheet again to the registration rollers 316. At this time, the sheet is sent with a surface opposite to the first surface in the transfer step facing the photosensitive drum. The second image is formed on the second surface of the sheet by the same process as that described above. After the images are formed on the two surfaces of the sheet, the sheet undergoes the fixing step and is discharged from the printing apparatus main body to outside the apparatus via the delivery rollers 310. The control unit 205 executes this double-sided print sequence, and causes the printing apparatus to execute double-sided printing of target job data on the first and second surfaces of a sheet.

The sheet feed/conveyance section comprises the sheet feed cassettes 317 and 318 (each capable of storing, e.g., 500 sheets) serving as sheet feed units storing sheets necessary for a printing process, the paper deck 319 (capable of storing, e.g., 5,000 sheets), and the manual feed tray 320. Units for feeding sheets stored in these sheet feed units are the sheet feed rollers 321, registration rollers 316, and the like. The sheet feed cassettes 317 and 318 and the paper deck 319 can set sheets of various materials at various sheet sizes so as to discriminate these sheets in these sheet feed units.

The manual feed tray 320 allows setting various printing media including a special sheet such as an OHP sheet. The sheet feed cassettes 317 and 318, the paper deck 319, and the manual feed tray 320 respectively have the sheet feed rollers 321 so as to successively feed sheets one by one. For example, a pickup roller sequentially picks up stacked sheets, a separation roller facing the sheet feed roller 321 prevents overlapping feed, and sheet materials are supplied one by one to the conveyance guide. The separation roller receives, via a torque limiter (not shown), a driving force for driving the separation roller in a direction opposite to the conveyance direction. When only one sheet enters a nip portion formed between the separation roller and the sheet feed roller, the separation roller rotates in the conveyance direction following the sheet.

If overlapping feed occurs, the separation roller rotates in the direction opposite to the conveyance direction to set back the overlapping-fed sheet material and supply only one top sheet material. The supplied sheet material is guided between the conveyance guides, and conveyed to the registration rollers 316 by a plurality of conveyance rollers. At this time, the registration rollers 316 stop, the leading end of the sheet abuts against the nip portion formed between the pair of registration rollers 316. Then, the sheet material forms a loop to correct skew. The registration rollers 316 start rotating to convey the sheet in synchronism with the timing of a toner image formed on the photosensitive drum 304 in the image forming section. The attraction roller 322 electrostatically attracts the sheet sent by the registration rollers 316 onto the surface of the transfer drum 305. The sheet material discharged from the fixing unit 308 is introduced into the sheet feeding path in the sheet processing apparatus 200 via the delivery rollers 310.

Through the above-described printing process, the control unit 205 processes a job to be printed. The control unit 205 causes the printer unit 203 by the above-described method to print job print data stored in the HDD 209 from a data generation source on the basis of a print execute request accepted from the user via the UI unit.

The control unit 205 stores print data of a job to be processed sequentially from the start page in the HDD 209, and reads out the print data of the job sequentially from the start page from the HDD 209 to form the image of the print data on a sheet. The control unit 205 performs this start page process. In addition, the control unit 205 supplies printed sheets sequentially from the start page to the sheet feeding path in the sheet processing apparatus 200 with the image surfaces of the sheets facing down. For this purpose, immediately before the delivery rollers 310 introduce a sheet into the sheet processing apparatus 200, the control unit 205 causes the units 309 and 312 and the like to execute a switchback operation to reverse the sheet traveling from the fixing unit 308. The control unit 205 also executes paper handling control for the start page process.

The arrangement of the inline type sheet processing apparatus 200 of the printing system 1000 also having the printing apparatus 100 will be explained.

As shown in FIG. 3, the printing system 1000 according to the embodiment comprises a total of n inline type sheet processing apparatuses cascade-connectable to the printing apparatus 100. The number of installed inline type sheet processing apparatuses is arbitrary as many as possible. However, the sheet processing apparatus 200 requires an arrangement capable of supplying a sheet printed by the printer unit 203 to an internal sheet processing unit without any intervention work by an operator. For example, the sheet processing apparatus 200 desirably comprises a sheet feeding path (paper path) capable of conveying a printed medium discharged from the printer unit 203 via the delivery rollers 310 of the printing apparatus 100.

For example, the printing system 1000 allows connecting three or five inline type sheet processing apparatuses 200. That is, the printing system 1000 allows connecting n arbitrary sheet processing apparatuses 200. The embodiment also assumes a POD environment where no inline type sheet processing apparatus 200 is necessary in order to increase the use efficiency of an offline type sheet processing apparatus 200. For example, even when no inline type sheet processing apparatus 200 is used (i.e., the number of inline type sheet processing apparatuses 200 is 0), the printing apparatus 100 of the embodiment is available.

When cascade-connecting a plurality of inline type sheet processing apparatuses 200 to the printing apparatus 100, their connection order can also be arbitrarily changed. In this case, a specific user such as an administrator can arbitrarily change and decide the connection order under the restriction.

The above-mentioned mechanism aims to improve user friendliness, and is not an indispensable constituent feature. In other words, the present invention is not limited to this arrangement. For example, the present invention is applicable to a system configuration which uniformly defines the number of inline type sheet processing apparatuses 200 available in the printing system 1000 and their connection order. The printing system 1000 falls within the present invention regardless of the system configuration and apparatus configuration as long as at least one of various job control examples (to be described later) is executable.

[Arrangement of Operation Unit in Printing System]

The operation unit 204 serving as the user interface unit (to be referred to as a UI unit hereinafter) of the printing apparatus 100 will be explained with reference to FIGS. 4 to 6.

Figure 4:
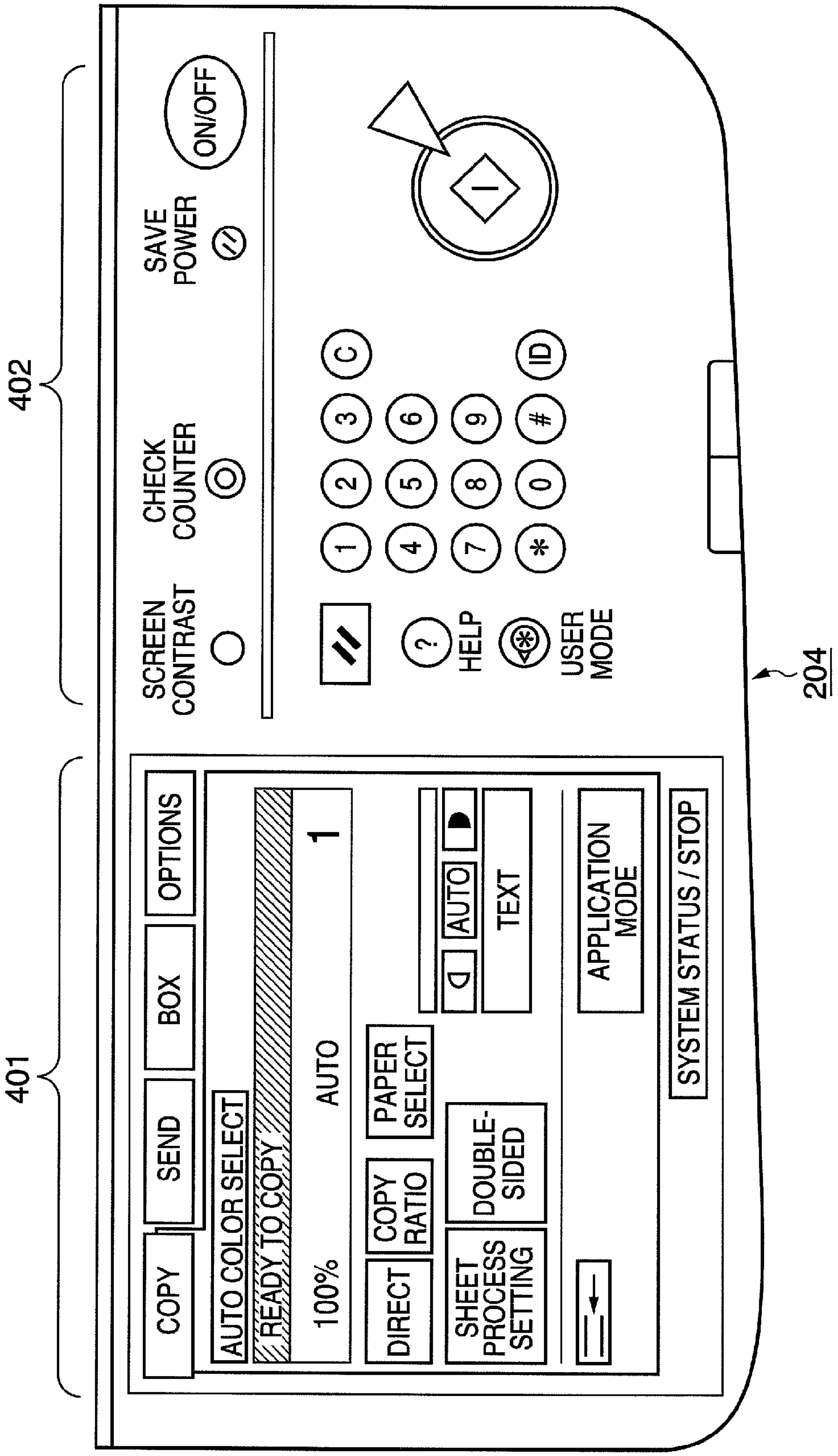
FIG. 4 is a view showing an example of a UI unit according to the first embodiment.

FIG. 4 is a view showing an example of the UI unit according to the first embodiment. The operation unit 204 comprises a key input unit 402 capable of accepting a user operation with hard keys, and a display unit capable of accepting a user operation with soft keys (display keys), e.g., a display unit 401 functioning as a touch panel.

Figure 5:
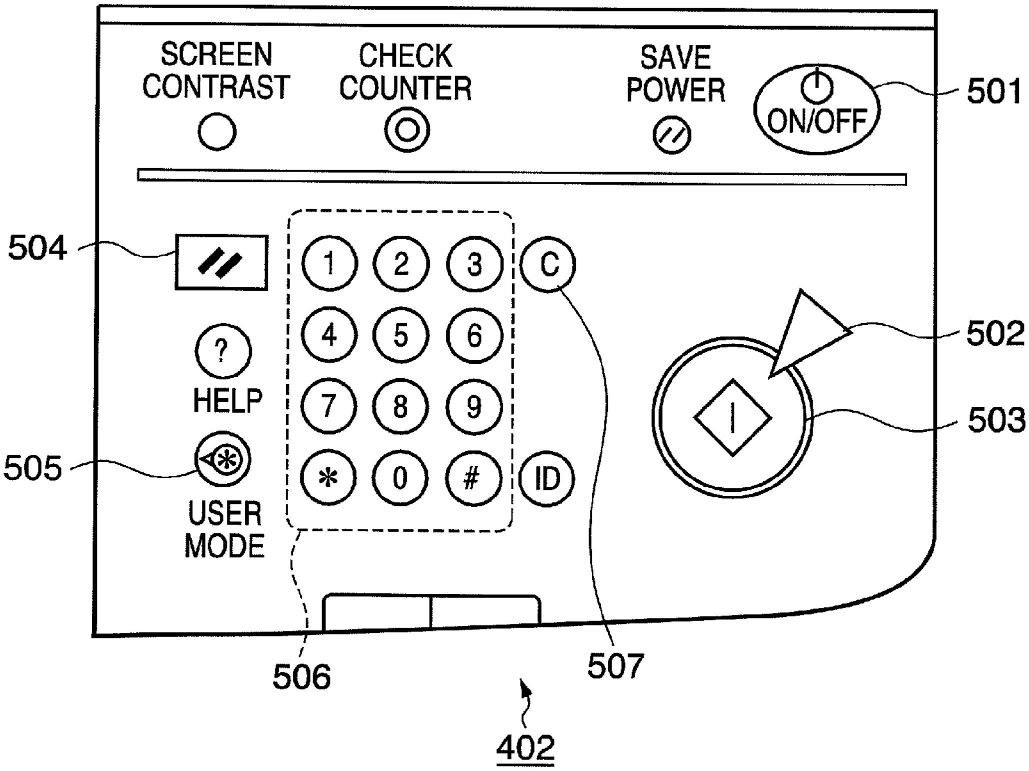
FIG. 5 is a view showing an example of the UI unit according to the first embodiment.

FIG. 5 is a view showing an example of the UI unit according to the first embodiment. As shown in FIG. 5, the key input unit 402 comprises an operation unit power switch 501. In response to a user operation to the operation unit power switch 501, the control unit 205 selectively switches between the standby mode (normal operation state) and the sleep mode. The sleep mode is a state in which the program stops in wait for an interrupt by network printing, facsimile transmission, or the like, suppressing power consumption. The control unit 205 controls to accept a user operation to the operation unit power switch 501 while a main power switch (not shown) for supplying power to the whole system is ON.

A start key 503 enables accepting an instruction from the user to cause the printing apparatus 100 to start a type of job process designated by the user, such as copying or transmission of a job to be processed. A stop key 502 enables accepting an instruction from the user to cause the printing apparatus 100 to interrupt the process of an accepted job. A ten-key pad 506 enables accepting an instruction from the user to input numerical values of various settings. A clear key 507 is used to cancel various parameters such as numerical values input by the user via the ten-key pad 506. A reset key 504 is used to accept an instruction from the user to invalidate various settings of a job to be processed by the user and restore the setting values to defaults. A user mode key 505 is used to shift to a system setup window for each user.

Figure 6:
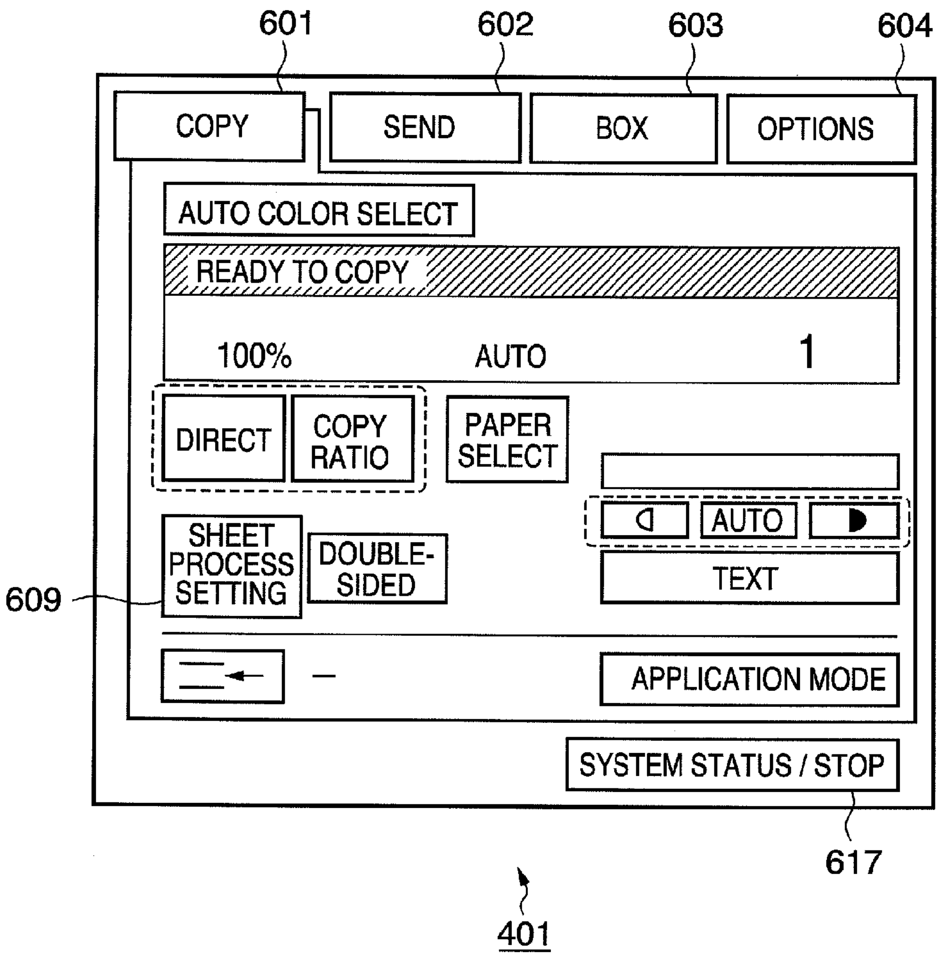
FIG. 6 is a view showing a display control example for the UI unit according to the first embodiment.

FIG. 6 is a view showing a display control example for the UI unit according to the first embodiment. The touch panel unit (display unit) 401 includes an LCD (Liquid Crystal Display), and a touch panel display formed from a transparent electrode adhered onto the LCD. The display unit 401 has both a function of accepting various settings from an operator and a function of presenting information to the operator. For example, when the user presses a portion corresponding to an effective display key on the LCD, the control unit 205 displays an operation window corresponding to the key operation on the display unit 401 in accordance with a display control program stored in advance in the ROM 207. FIG. 6 shows an example of an initial window displayed on the display unit 401 when the printing apparatus 100 is in the standby mode (state in which there is no job to be processed by the printing apparatus).

When the user presses a copy tab 601 on the display unit 401, the control unit 205 causes the display unit 401 to display the operation window of the copy function provided by the printing apparatus 100. When the user presses a send tab 602, the control unit 205 causes the display unit 401 to display the operation window of the data send function (e.g., FAX transmission or E-mail sending) provided by the printing apparatus. When the user presses a box tab 603, the control unit 205 causes the display unit 401 to display the operation window of the box function provided by the printing apparatus.

The box function uses a plurality of data storage boxes (to be referred to boxes hereinafter) which are virtually ensured in the HDD 209 in advance and are available discriminately for respective users. The control unit 205 allows a user to select these boxes via the user interface unit, and accepts a desired operation from the user. For example, the control unit 205 responds to an instruction input from the user via the operation unit 204, and stores document data of a job accepted by the printing apparatus 100 in a box selected by the user in the HDD 209. The control unit 205 may also store, e.g., text data of a job or the like accepted from an external apparatus (e.g., the PC 103 or 104) via the external I/F unit 202 in a box designated by the user. In this case, the control unit 205 desirably follows an instruction from the user of the external apparatus designated via the user interface unit of the external apparatus. The control unit 205 performs the following process for job data stored in the box in accordance with a user instruction from the operation unit 204. For example, the control unit 205 causes the printer unit 203 to print the job data, or transmits the job data to an external apparatus via the external I/F unit 202.

To allow the user to execute various box operations, the control unit 205 controls the display unit 401 to display a box function operation window in response to press of the box tab

603 by the user. When the user presses an option tab 604 on the display unit 401 of FIG. 6, the control unit 205 causes the display unit 401 to display a window for setting optional functions such as scanner setting. When the user presses a system monitor key 617, the control unit 205 causes the display unit 401 to display a display window for notifying the user of the MFP state or status.

As a job setting, the control unit 205 causes the UI unit to execute a display for accepting a request from the user to execute a sheet process by the sheet processing unit of the inline type sheet processing apparatus 200. The control unit 205 also causes the UI unit to execute a display for accepting an instruction from the user to cause the UI unit to execute this display.

For example, the control unit 205 causes the display unit 401 to display a sheet process setting key 609. Assume that the user presses the sheet process setting key 609. Then, the control unit 205 causes the display unit 401 to execute a display for prompting the user to select a sheet process executable using the inline type sheet processing apparatus 200. The "sheet process setting key 609" illustrated in the display of FIG. 6 will also be referred to as a "finishing key" in FIG. 19 and subsequent drawings. That is, the "sheet process setting key 609" and "finishing key" mean the same function button. In the following description, a "sheet process" will also be referred to as "finishing". As for a "punching process", needs for various punching processes (processes to punch a printed sheet) are assumed in the POD environment.

Figure 19:
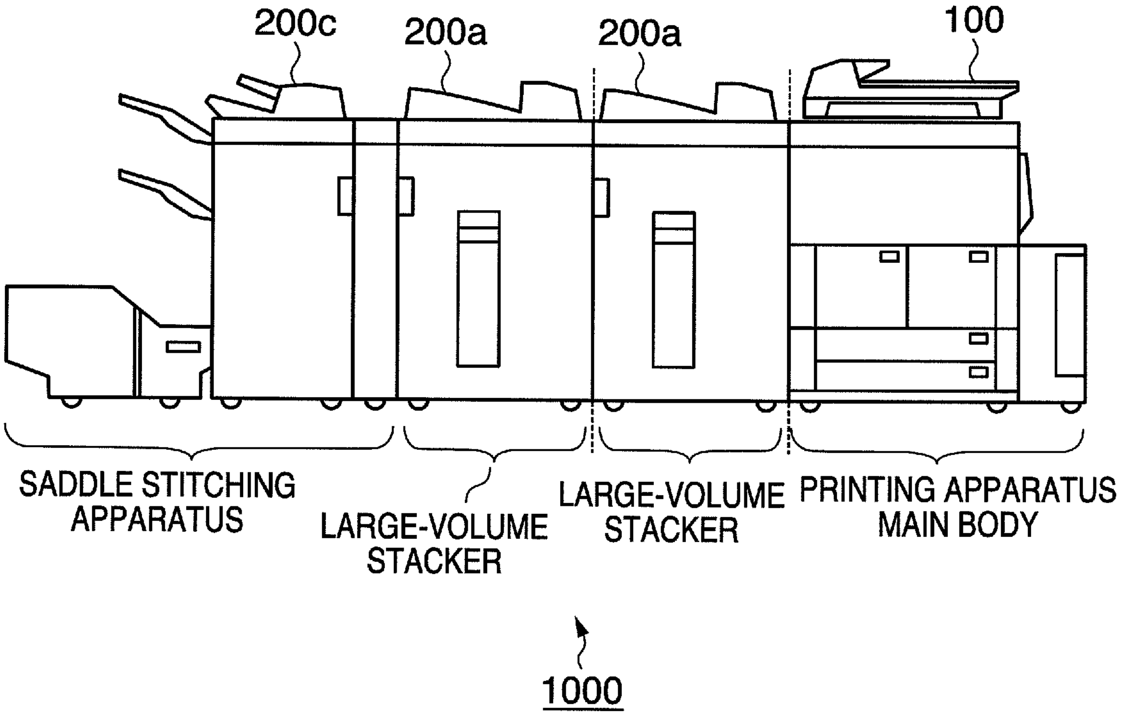
FIG. 19 is a view showing another system configuration of the printing system 1000 according to the first embodiment.

Thus, FIG. 19 and subsequent drawings illustrate "two-hole punching (process to form two holes at a sheet end corresponding to a sheet binding edge)" and "multi-hole punching (process to form many holes such as 30 holes at a sheet end)" as a plurality of types of punching processes. These processes are executable by the punching unit of the saddle stitching apparatus shown in FIGS. 8A to 10B in correspondence with the above-described configuration. Another apparatus or unit may execute these punching processes. However, as described above, the printing system 1000 permits the use of an apparatus which satisfies the definition of an inline finisher, and inhibits the use of a different type of apparatus.

Figure 7:
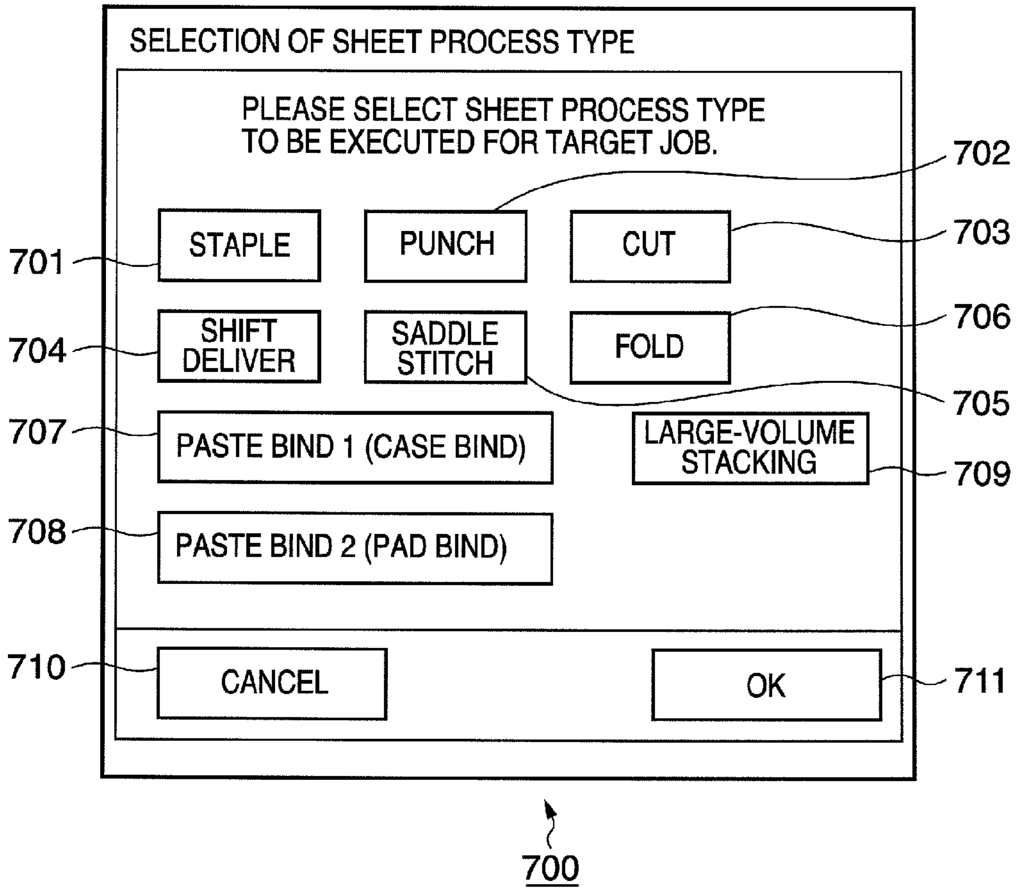
FIG. 7 is a view showing a display control example for the UI unit according to the first embodiment.

In this example, when the user presses the sheet process setting key 609, the control unit 205 causes the display unit 401 to execute a display in FIG. 7. FIG. 7 is a view showing a display control example for the UI unit according to the first embodiment. The control unit 205 controls to accept a request via the display of FIG. 7 to execute a sheet process by the inline sheet processing apparatus 200 for printed sheets of a target job.

The control unit 205 determines selectable sheet process candidates in accordance with the type of sheet processing apparatus installed in the printing system 1000. For example, the display of FIG. 7 permits sheet processes listed below for sheets printed by the printer unit 203:

(1) a stapling process, (2) a punching process, (3) a folding process, (4) a shift delivery process, (5) a cutting process, (6) a saddle stitching process, (7) a case binding process as an example of the paste binding process, (8) a pad binding process as another example of the paste binding process, and (9) a large-volume stacking process.

The control unit 205 controls the operation unit 204 to set these nine sheet processes as selection candidates.

The control unit 205 controls the display to exclude a type of sheet process unexecutable by the printing system 1000 from selection candidates. For example, when the printing system 1000 does not comprise one sheet processing apparatus capable of selectively executing a case binding process and pad binding process, or this sheet processing apparatus is out of order, the control unit 205 controls to invalidate keys 707 and 708. For example, the control unit 205 hatches corresponding operation keys. With this setting, the control unit 205 controls not to accept a request from the user to execute corresponding sheet processes. Further, when the printing system 1000 comprises a sheet processing apparatus capable of executing a sheet process different from the above-mentioned nine candidates, the control unit 205 controls the display to validate a display key for accepting a request from the user to execute the different sheet process. The control unit 205 can accept a request from the user via this display key to execute the sheet process. The embodiment can execute this display control together with job process control (to be described later), preventing any user operation error.

In executing this control, the control unit 205 acquires system configuration information for specifying what kind of sheet processing apparatus the printing system 1000 comprises as the sheet processing apparatus 200. In this control, the control unit 205 also uses, e.g., status information for specifying whether an error occurs in the sheet processing apparatus 200. The control unit 205 acquires these pieces of information from user inputs via the UI unit, or by detecting that the sheet processing apparatus 200 is connected to the printing apparatus 100.

The printing system 1000 can accept requests from an external apparatus such as the PC 103 or 104 to print a target job and to execute a sheet process necessary for the job. When inputting a job from the external apparatus, the control unit 205 desirably causes the display unit of the external apparatus serving as a print data transmission source to display the same functions as those of the display in FIG. 7. When the UI of the external apparatus executes this display, the control unit of the apparatus executes the above-described control. For example, when the display unit of the PC 103 or 104 displays a printer driver UI window (to be described later), the main controller is the CPU of the PC.

[Exemplary Configuration of Printing System]

Figure 8A:
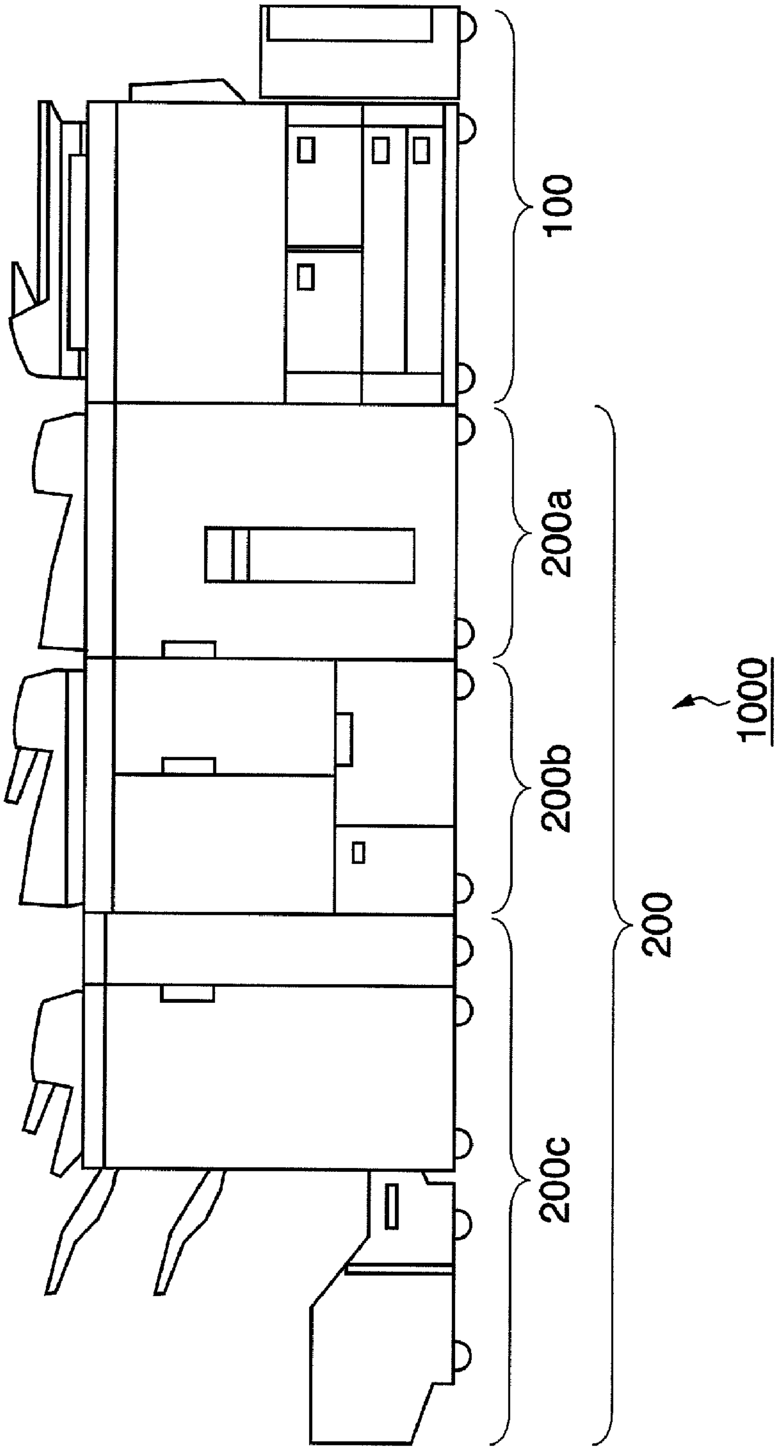
FIG. 8A is a view showing a control example of the printing system 1000 according to the first embodiment.
Figure 8B:
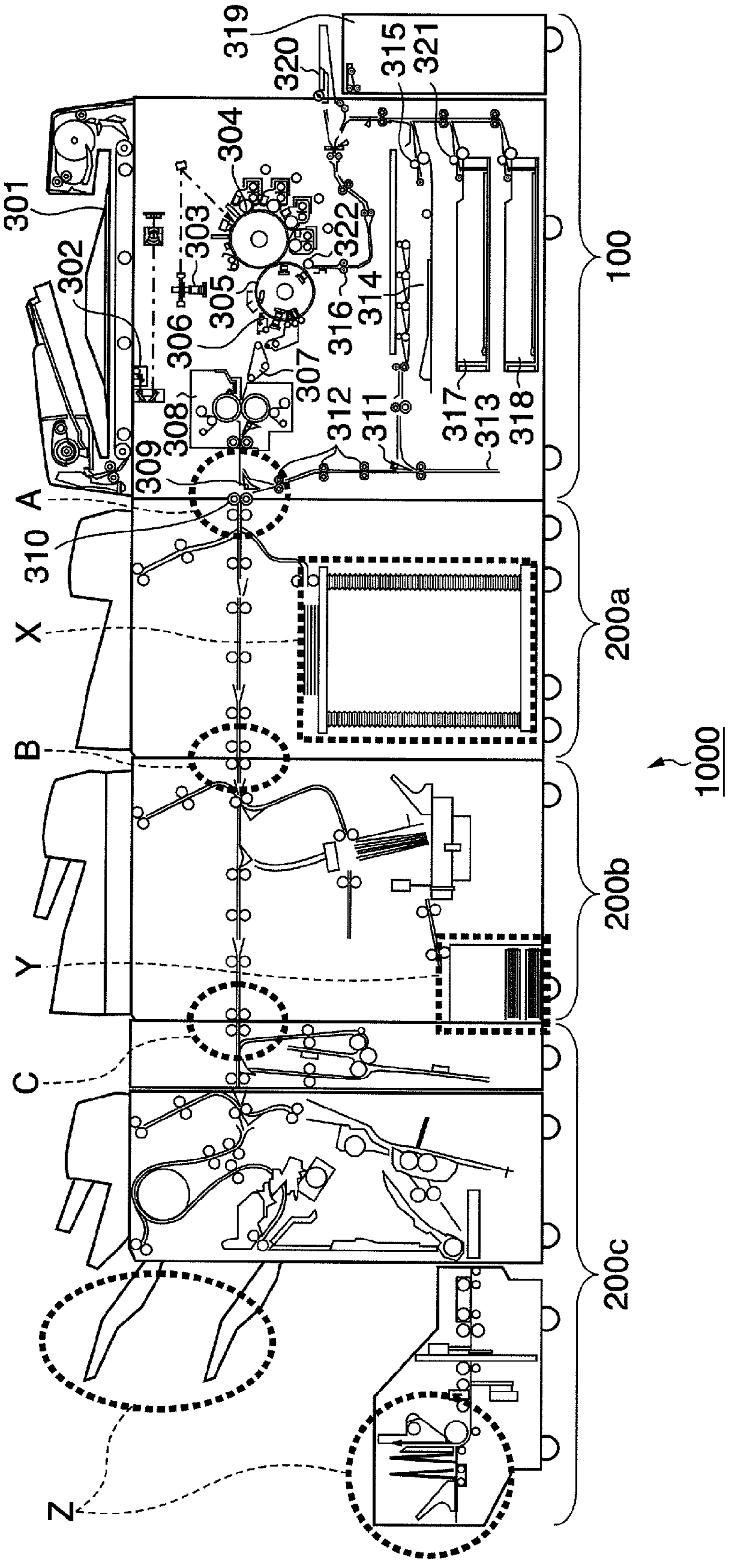
FIG. 8B is a sectional view showing the control example of the printing system 1000 according to the first embodiment.

An exemplary system configuration of the printing system 1000 will be explained with reference to FIGS. 8A and 8B. FIG. 8A is a view showing a control example of the printing system 1000 according to the first embodiment. FIG. 8B is a sectional view showing the control example of the printing system 1000 according to the first embodiment.

As shown in FIG. 8A, the printing system 1000 includes a large-volume stacker 200*a*, paste binding apparatus 200*b*, and saddle stitching apparatus 200*c* as the sheet processing apparatuses 200. In the configuration of FIG. 8A, the large-volume stacker 200*a*, paste binding apparatus 200*b*, and saddle stitching apparatus 200*c* are connected in the order named to the printing apparatus 100 of the printing system. 1000.

The large-volume stacker 200*a* is a sheet processing apparatus capable of stacking a large number (e.g., 5,000) of sheets conveyed from the printer unit 203. The paste binding apparatus 200*b* in this example is a sheet processing apparatus which executes a sheet pasting process (case binding process) to attach a cover and bind a bundle of sheets printed by the printer unit 203. The paste binding apparatus 200*b* can also execute a pad binding process to paste and bind a bundle of sheets without attaching any cover. The paste binding apparatus is also called a case binding apparatus because it is a sheet processing apparatus capable of executing at least a case binding process. The saddle stitching apparatus 200*c* is a sheet processing apparatus capable of selectively executing a stapling process, punching process, cutting process, shift delivery process, saddle stitching process, and folding process for sheets from the printer unit 203.

In the embodiment, the control unit 205 registers, in a specific memory, various types of system configuration information on these sheet processing apparatuses as management information necessary for various control operations. For example, when the printing system 1000 has the system configuration as shown in FIG. 8A, the control unit 205 registers the following pieces of information in the HDD 209. The control unit 205 utilizes information registered in the HDD 209 as decision-making information in job control (to be described later).

For example, the control unit 205 registers apparatus presence/absence information, apparatus count information, type information, apparatus performance information, and connection order information in the HDD 209. The apparatus presence/absence information contains information representing whether a sheet processing apparatus is connected to the printing system 1000. The apparatus count information contains information representing the number of sheet processing apparatuses connected to the printing system 1000. The type information contains information representing the types of sheet processing apparatuses connected to the printing system 1000, e.g., the large-volume stacker, paste binding apparatus, and saddle stitching apparatus.

The apparatus performance information contains information representing a sheet process executable by a sheet processing apparatus connected to the printing system 1000. For example, in the printing system shown in FIG. 8A, the apparatus performance information contains information representing a stacking process by the large-volume stacker 200*a*, a paste binding process by the paste binding apparatus 200*b*, or the like. When a plurality of sheet processes are executable, like the saddle stitching apparatus 200*c*, the apparatus performance information contains information representing stapling, punching, cutting, shift delivery, saddle stitching, and folding by the saddle stitching apparatus 200*c*. That is, in the printing system shown in FIG. 8A, the apparatus performance information contains information representing that sheet processes of stapling, punching, cutting, shift delivery, saddle stitching, folding, case binding, pad binding, and large-volume stacking are executable.

The connection order information represents the connection order of sheet processing apparatuses connected to the printing system 1000. For example, in the printing system shown in FIG. 8A, the connection order information contains information representing that the large-volume stacker 200*a* directly connected to the printing apparatus 100, the paste binding apparatus 200*b*, and the saddle stitching apparatus 200*c* are sequentially connected.

Control by the control unit 205 in the system configuration shown in FIG. 8A will be explained.

For example, when the printing system 1000 has the system configuration in FIG. 8A, it can execute all the nine sheet processes described above. The control unit 205 recognizes this on the basis of the five pieces of information. Based on this recognitions the control unit 205 controls the UI unit to set all the nine executable sheet processes as selection candidates. In addition, the control unit 205 executes the following control in response to a user operation.

Assume that the control unit 205 accepts a stapling process execute request from a user via the UI unit in response to press of a key 701 shown in FIG. 7 by the user. In response to this request, the control unit 205 causes the saddle stitching apparatus 200*c* to staple printed sheets of the job.

Assume that the control unit 205 accepts a punching process (sheet punch pressing process) execute request from the user via the UI unit in response to press of a key 702 by the user. In response to this request, the control unit 205 causes the saddle stitching apparatus 200*c* to punch printed sheets of the job.

Assume that the control unit 205 accepts a case binding process execute request from the user via the UI unit in response to press of the key 707 by the user. In response to this request, the control unit 205 causes the paste binding apparatus 200*b* to case-bind printed sheets of the job.

Assume that the control unit 205 accepts a large-volume stacking process execute request from the user via the UI unit in response to press of a key 709 by the user. In response to this request, the control unit 205 causes the large-volume stacker 200*a* to stack a large number of printed sheets of the job.

The internal system configuration of the printing system 1000 according to the embodiment will be explained with reference to FIG. 8B. FIG. 8B is a sectional view showing an example of the apparatuses of the whole printing system 1000 according to the embodiment. The system configuration shown in FIG. 8B is the same as that in FIG. 8A.

As shown in FIG. 8B, sheets printed by the printer unit 203 of the printing apparatus 100 are supplied into the respective sheet processing apparatuses 200. More specifically, as shown in FIG. 8B, the respective sheet processing apparatuses 200 convey sheets between them via points A, B, and C in the apparatuses.

Each sheet processing apparatus 200 in FIG. 8B desirably has a function of conveying sheets even when not executing any sheet process. For example, when the paste binding apparatus 200*b* among the sheet processing apparatuses 200 executes only a case binding process, the large-volume stacker 200*a* must receive sheets from the printing apparatus 100 and convey them to the paste binding apparatus 200*b*. In other words, the sheet processing apparatus 200 which does not perform a sheet process has a function of receiving sheets from a preceding apparatus and conveying them to a succeeding apparatus. When a plurality of succeeding apparatuses do not perform a sheet process, the sheet processing apparatus 200 desirably executes a delivery process.

An operation of the sheet processing apparatus 200 in response to a print job request will be described. Assume that a target job whose print execute request is accepted from a user requires a sheet process (stacking process) by the large-volume stacker after a printing process. This job is called a "stacker job".

The control unit 205 conveys sheets of the job printed by the printing apparatus 100 via point A shown in FIG. 8B, and causes the large-volume stacker to execute a stacking process. Since no sheet process by a succeeding apparatus remains, the control unit 205 causes the large-volume stacker 200*a* to discharge sheets to delivery destination X inside it. For this print job, the large-volume stacker 200*a* does not convey any sheet to a succeeding apparatus. The printing system 1000 can omit a series of unnecessary apparatus operations and operator operations to convey sheets to the most downstream delivery destination Z in the sheet conveyance direction in FIG. 8B and take out the printed materials of the stacker job.

Assume that a target job whose print execute request is accepted from a user requires a sheet process (e.g., case binding process or pad binding process) by the paste binding apparatus after a printing process in the system configuration of FIG. 8B. This job is called a "paste binding job".

The control unit 205 conveys sheets of the job printed by the printing apparatus 100 to the paste binding apparatus via points A and B in FIG. 8B. The control unit 205 conveys sheets case-bound or pad-bound by the paste binding apparatus to delivery destination Y inside the paste binding apparatus. The printing system 1000 can omit a series of unnecessary apparatus operations and operator operations to convey sheets to the most downstream delivery destination Z in the sheet conveyance direction in FIG. 8B and take out the printed materials of the stacker job.

Assume that a target job whose print execute request is accepted from a user requires a sheet process by the saddle stitching apparatus after a printing process in the system configuration of FIG. 8B. As a sheet process by the saddle stitching process, saddle stitching, punching, cutting, shift delivery, folding, or the like is executed. These jobs are called a "saddle stitching job".

The control unit 205 conveys sheets of the job printed by the printing apparatus 100 to the saddle stitching apparatus via points A, B, and C in FIG. 8B. The control unit 205 conveys sheets having undergone the sheet process by the saddle stitching apparatus to delivery destination Z of the saddle stitching apparatus.

In this fashion, the sheet processing apparatuses 200 in the printing system execute paper handling control to control sheet conveyance in accordance with the request of a print job. Delivery destination Z in FIG. 8B has a plurality of delivery destination candidates. This will be explained with reference to FIG. 13.

As described above, the printing system 1000 enables connecting a plurality of inline type sheet processing apparatuses 200. A plurality of inline type sheet processing apparatuses 200 can be independently connected or disconnected, or a free combination of them can be attached to the printing apparatus 100. The connection order of sheet processing apparatuses is arbitrary as long as they are physically connectable. However, the printing system 1000 has the following restrictions on the system configuration. For example, an apparatus permitted to be adopted as the inline type sheet processing apparatus 200 in the printing system 1000 has the following constituent features.

The sheet processing apparatus 200 of the printing system 1000 can execute a sheet process corresponding to a job request. The sheet processing apparatus 200 has a sheet conveyance function of receiving sheets from a preceding apparatus and conveying them to a succeeding apparatus when the request does not contain a sheet process by the sheet processing apparatus 200 itself. For example, in the system configuration shown in FIG. 8B, the large-volume stacker and paste binding apparatus correspond to this sheet processing apparatus.

Even if the sheet processing apparatus 200 of the printing system 1000 does not meet the above-mentioned configuration, it is connectable as an inline type sheet processing apparatus to the printing system 1000. For example, the saddle stitching apparatus 200*c* corresponds to a sheet processing apparatus 200 having no sheet conveyance function. However, restrictions are imposed on an apparatus of this type.

For example, the number of sheet processing apparatuses 200 connected to the printing system 1000 without the function of conveying sheets to a succeeding apparatus is limited to one. However, another type of sheet processing apparatus 200, e.g., the large-volume stacker 200*a* having the function of conveying sheets to a succeeding apparatus is simultaneously available. When a plurality of sheet processing apparatuses 200 are cascade-connected and used, a sheet processing apparatus 200 having no function of conveying sheets to a succeeding apparatus is installed at the most downstream position in the sheet conveyance direction.

If inline type sheet processing apparatuses 200 are connected in a connection order which violates the restrictions, the control unit 205 causes the UI unit to display a warning. For example, when a user inputs the connection order of sheet processing apparatuses 200 via the UI unit, the control unit 205 controls to invalidate a user setting which violates the restrictions. For example, the control unit 205 executes gray-out display or hatching display to inhibit any improper connection setting. The printing system 1000 can prevent any user operation error, apparatus malfunction, and the like.

Figure 9A:
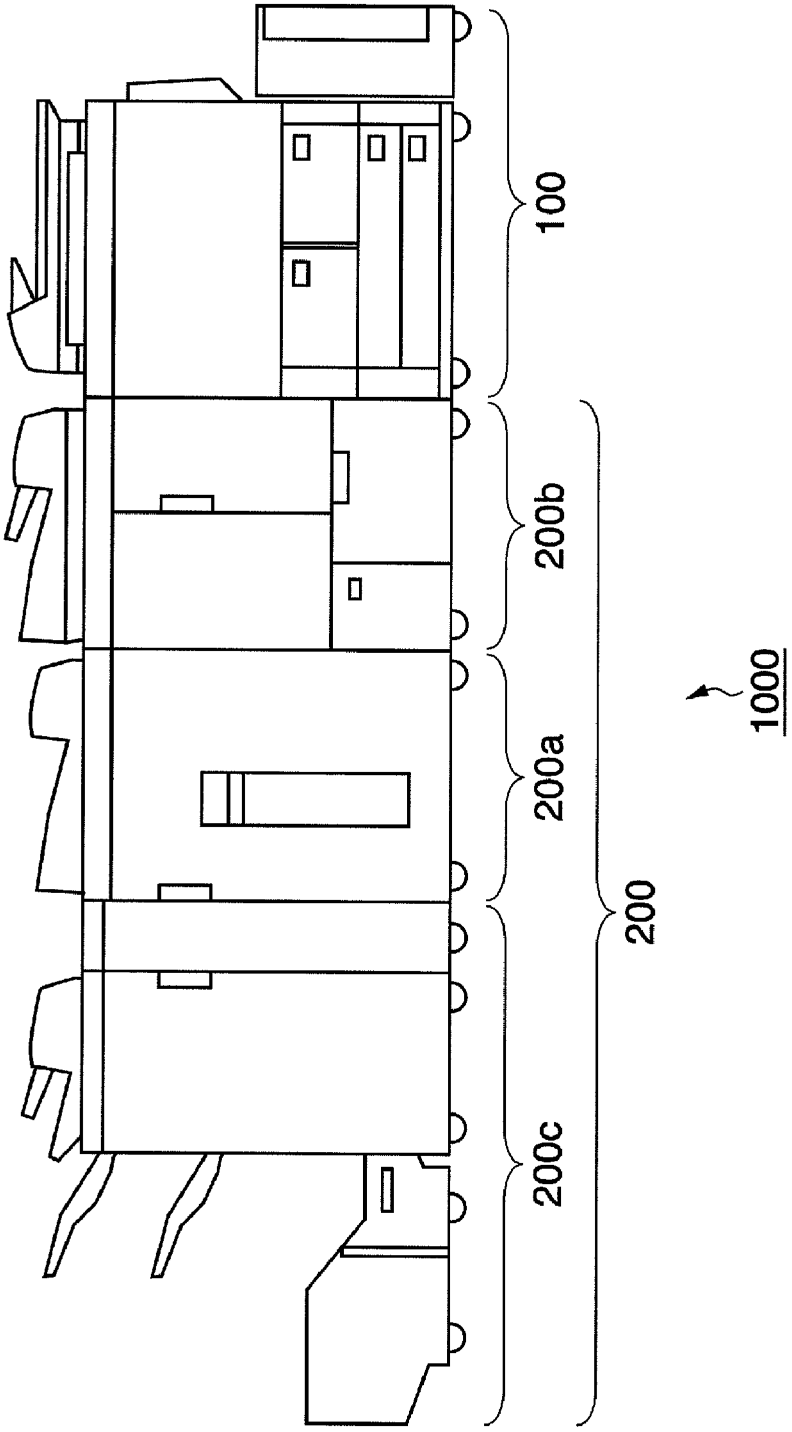
FIG. 9A is a view showing a control example of the printing system 1000 according to the first embodiment.

The printing system 1000 allows the operator of the POD system 10000 to arbitrarily decide and change the connection order of inline type sheet processing apparatuses 200 and the number of connected inline type sheet processing apparatuses 200 under the restrictions. The printing system 1000 executes control corresponding to the system configuration status. An example of this control will be described. FIG. 9A is a view showing a control example of the printing system 1000 according to the first embodiment.

The system configuration in FIG. 9A is different from that in FIG. 8A in the connection order of sheet processing apparatuses 200. More specifically, the paste binding apparatus 200*b*, large-volume stacker 200*a*, and saddle stitching apparatus 200*c* are connected in the order named to the printing apparatus 100.

Figure 9B:
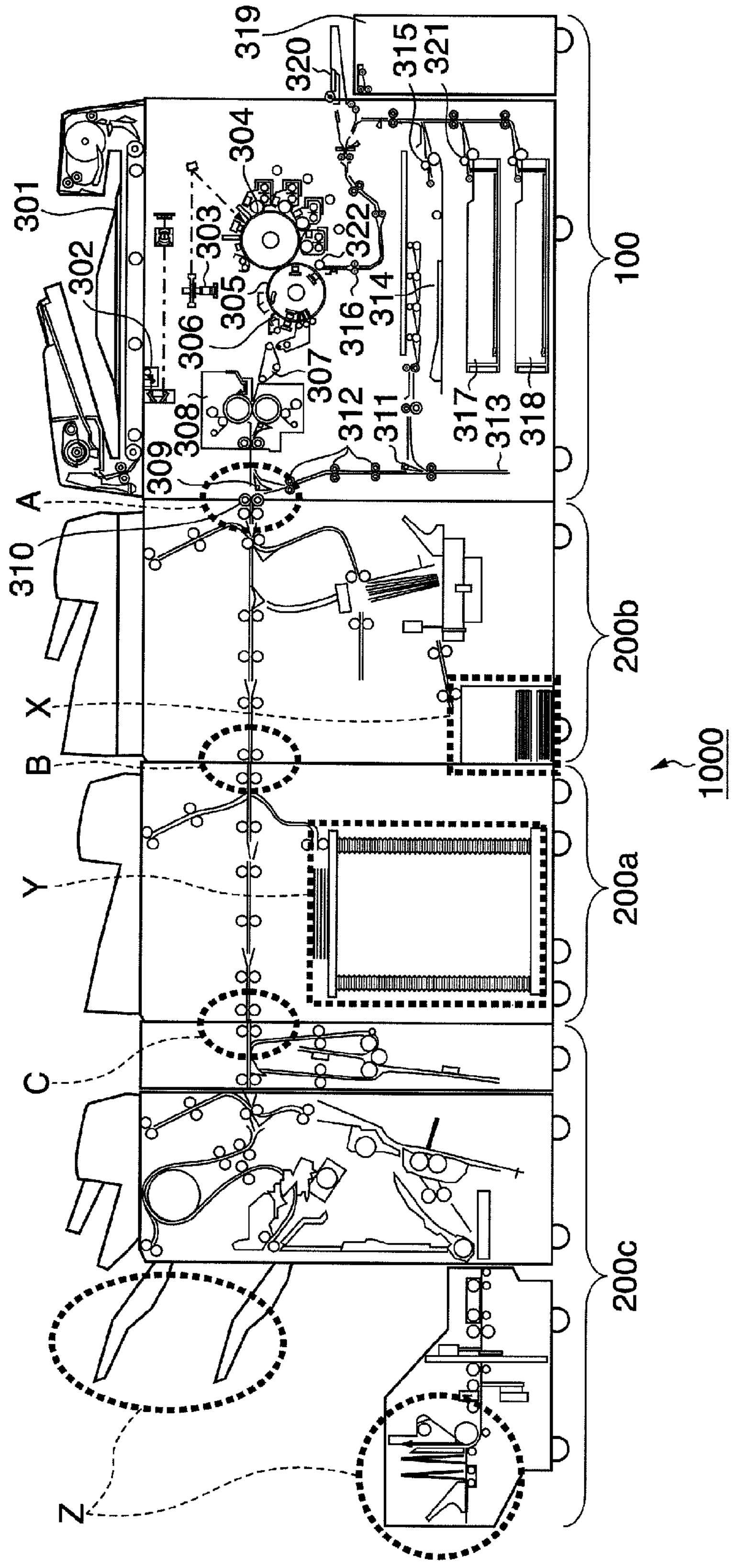
FIG. 9B is a sectional view showing the control example of the printing system 1000 according to the first embodiment.

FIG. 9B is a sectional view showing the control example of the printing system 1000 according to the first embodiment. The system configuration in FIG. 9B corresponds to the internal system configuration in FIG. 9A.

Similar to the internal system configuration shown in FIG. 8B, the internal system configuration in FIG. 9B can also supply sheets printed by the printer unit 203 of the printing apparatus 100 into the respective sheet processing apparatuses 200. More specifically, as shown in FIG. 9B, the respective sheet processing apparatuses 200 have sheet feeding paths capable of feeding sheets from the printer unit 203 via points A, B, and C in the apparatuses.

The system configuration in FIGS. 9A and 9B also follows the above-described restrictions. For example, the sheet processing apparatuses 200 are cascade-connected to the printing apparatus 100 so as to install the saddle stitching apparatus at the most downstream position in the sheet conveyance direction.

Figure 10A:
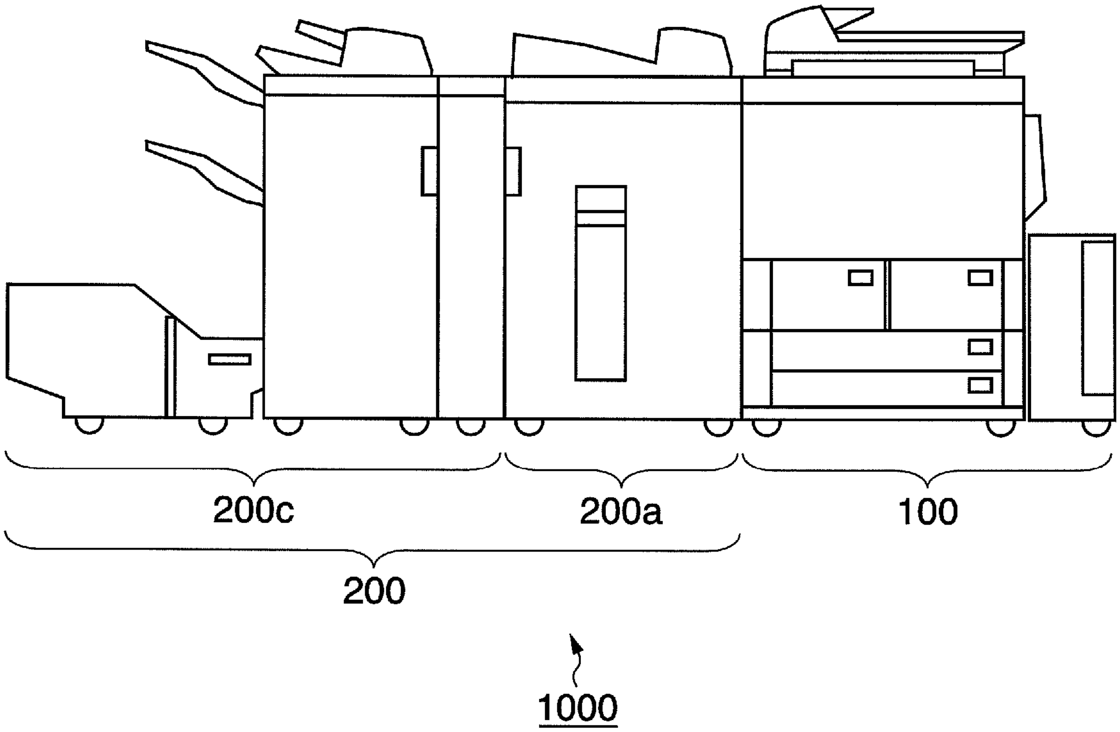
FIG. 10A is a view showing a control example of the printing system 1000 according to the first embodiment.

FIG. 10A is a view showing a control example of the printing system 1000 according to the first embodiment. The system configuration in FIG. 10A is different from those in FIGS. 8A and 9A in the number of connected sheet processing apparatuses 200. More specifically, the two, large-volume stacker 200*a* and saddle stitching apparatus 200*c* are connected in the order named to the printing apparatus 100. The internal system configuration in this case is as shown in FIG. 10B.

Figure 10B:
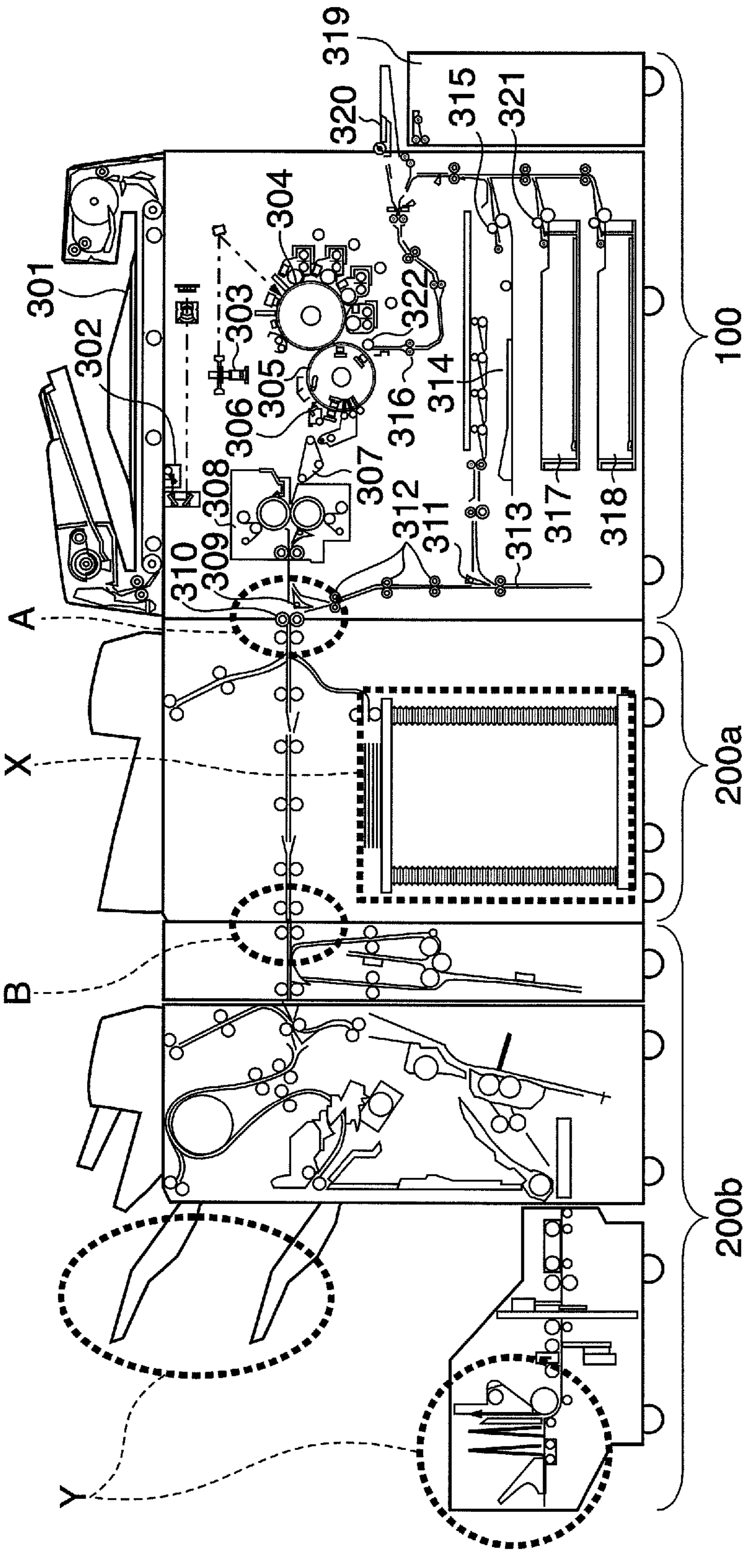
FIG. 10B is a sectional view showing the control example of the printing system 1000 according to the first embodiment.

FIG. 10B is a sectional view showing the control example of the printing system 1000 according to the first embodiment. The apparatus configuration in FIG. 10B corresponds to that in FIG. 10A.

Similar to the system configuration examples in FIGS. 8B and 9B, the internal apparatus configuration in FIG. 10B can also supply sheets printed by the printer unit 203 of the printing apparatus 100 into the respective sheet processing apparatuses 200. More specifically, as shown in FIG. 10B, the respective sheet processing apparatuses 200 have sheet feeding paths capable of feeding sheets via points A and B in the apparatuses. This system configuration follows the above-described restrictions. For example, the sheet processing apparatuses 200 are so connected as to install the saddle stitching apparatus at the most downstream position in the sheet conveyance direction.

In the system configuration of FIG. 10B, the control unit 205 controls not to accept a request from the user to execute a case binding process or pad binding process executable by the paste binding apparatus 200*b*.

For example, when causing the UI unit to execute the display in FIG. 7, the control unit 205 controls (inhibition control) to hatch or gray out the display keys 707 and 708. In other words, the control unit 205 invalidates user operations to the keys 707 and 708. When the printing system 1000 has the system configuration as shown in FIG. 10B, the control unit 205 inhibits the printing system 1000 from executing the paste binding process.

As described above, the printing system 1000 allows connecting a plurality of inline type sheet processing apparatuses 200, and their connection order and connection count are freely changeable under the above-described restrictions. The printing system 1000 causes the UI unit for performing a user operation, to selectively display processes executable by currently connected sheet processing apparatuses 200 in accordance with the types and performance of connected sheet processing apparatuses 200. A configuration capable of changing the connection order of sheet processing apparatuses 200 or the number of connected sheet processing apparatuses 200 in the printing system 1000 will be explained.

The reason why each inline type sheet processing apparatus 200 permitted to be used in the printing system 1000 is an independent housing and is detachable from the printing apparatus 100 will be described.

As one reason, this configuration considers a company or the like which does not require any case binding process but wants to perform a large-volume stacking process, as a POD company which is the delivery destination of the printing system 1000. That is, a need to implement all the nine sheet processes by the sheet processing apparatuses 200, and a need to implement only a specific sheet process by the sheet processing apparatus 200 are expected. The printing system 1000 must be configured to allow changing connected sheet processing apparatuses 200 in accordance with needs from respective POD companies serving as delivery destinations.

The reason why inline type sheet processing apparatuses 200 permitted to be used in the printing system 1000 can be arbitrarily changed in connection order or combined under the restrictions will be explained. This reason is also a reason for setting a delivery destination from which the user takes out a printed material from each sheet processing apparatus 200.

As one reason, user friendliness improves by flexibly building the system in accordance with the use frequencies of sheet processes requested in the printing system 1000.

For example, a POD company having the POD system 10000 in FIG. 1 tends to receive a relatively large number of print jobs requiring a case binding process for a user manual, guidebook, and the like, as print form needs from customers. In this use environment, it is more convenient to build the system 1000 not in the connection order as shown in FIGS. 8A and 8B but in the connection order as shown in FIGS. 9A and 9B.

That is, it is more convenient to connect the paste binding apparatus 200*b* at a portion closer to the printing apparatus 100. This is because a shorter sheet conveyance distance in the apparatus necessary to execute a case binding process for a case binding job is effective.

For example, as the sheet conveyance distance is longer, the time taken to complete a printed material as the final product of the job is longer. As the sheet conveyance distance is longer, the jam generation rate in the apparatus during sheet conveyance is likely to be higher. For these reasons, the printing system 1000 is configured to allow changing the connection order of the sheet processing apparatuses 200.

By connecting a frequently used sheet processing apparatus 200 closer to the printing apparatus 100, the printing system 1000 can shorten the sheet conveyance distance, and allows the user to quickly take out a printed material.

In this fashion, the printing system 1000 pays attention to an increase in productivity of jobs by the printing system 1000 with an efficient, flexible system configuration suited to the use environment. In addition, the printing system 1000 can provide many mechanisms which pursue friendliness to a user who utilizes the printing system 1000.

The internal structures of the inline type sheet processing apparatuses 200 connected to the printing system 1000 will be explained with reference to FIGS. 11 to 13.

[Internal Structure of Large-volume Stacker]

Figure 11:
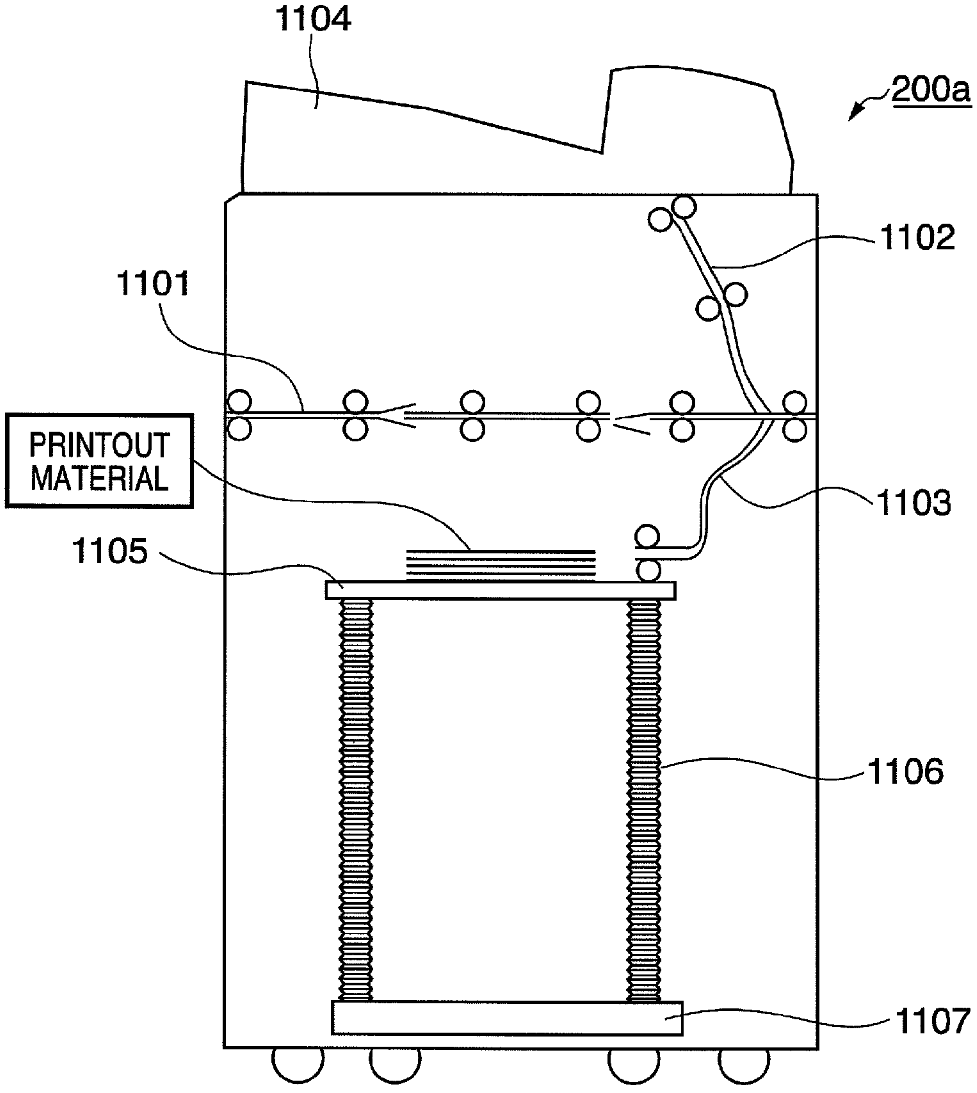
FIG. 11 is a sectional view showing the internal structure of a large-volume stacker according to the first embodiment.

FIG. 11 is a sectional view showing the internal structure of the large-volume stacker according to the first embodiment.

The large-volume stacker 200*a* includes three feeding paths: a straight path 1101, escape path 1102, and stack path 1103. The large-volume stacker 200*a* also includes an escape tray 1104 and stack tray 1105. The straight path 1101 is a feeding path for conveying sheets received from a preceding apparatus to a succeeding apparatus. The straight path 1101 is also called a through path. When no sheet process by the sheet processing apparatus is requested, the straight path 1101 serves as a feeding path for conveying sheets to a succeeding apparatus.

The escape path is used to discharge sheets without stacking them. For example, when no succeeding sheet processing apparatus is connected and confirmation work (proof print) or the like is to be executed, the control unit 205 discharges sheets from the escape path 1102 to the escape tray 1104. The sheet feeding path in the large-volume stacker 200a desirably comprises a plurality of sheet sensors to detect the sheet conveyance status and jam.

The CPU (not shown) of the large-volume stacker 200*a* notifies the control unit 205 of sheet detection information from each sensor via a signal line for communicating data with the control unit 205. The signal line electrically connects the sheet processing apparatus 200 to the control unit 205. On the basis of the information from the large-volume stacker, the control unit 205 grasps the sheet conveyance status and jam in the large-volume stacker. As a system configuration of the printing system, another sheet processing apparatus 200 may be cascade-connected between the large-volume stacker 200*a* and the printing apparatus 100. In this case, the CPU of the large-volume stacker 200*a* notifies the control unit 205 via the CPU of the cascade-connected sheet processing apparatus 200, of sensor information of the large-volume stacker 200*a*. The printing system 1000 comprises an arrangement unique to an inline finisher.

The stack path 1103 is a sheet feeding path for conveying sheets to the stacking unit of the large-volume stacker 200*a*. For example, upon accepting a stacking process request from the user, the control unit 205 controls to convey sheets to the stack path 1103. Sheets conveyed to the stack path 1103 are delivered to the stack tray 1105.

The stack tray 1105 is a stacking unit mounted on an extensible stay 1106. A shock absorber or the like is attached to the joint between the stack tray 1105 and the stay 1106. A truck 1107 supports the extensible stay 1106 from below it.

When attaching a handle (not shown) to the truck 1107, the truck can carry stacked outputs on it to another offline finisher.

When the front door of the stacker unit is kept closed, the extensible stay 1106 moves up to a position where outputs are easily stacked. If an operator opens the front door (or issues an opening instruction), the stack tray 1105 moves down so that the operator can easily takes out stacked outputs.

Outputs can be stacked by flat stacking or shift stacking. Flat stacking is a method of always stacking sheets at the same position. Shift stacking is a method of stacking sheets with a shift in a far/near direction every number of copies or jobs so as to divide outputs and easily handle them.

The large-volume stacker 200*a* connected to the printing system 1000 implements a plurality of types of stacking methods when stacking sheets from the printer unit 203. The control unit 205 controls various operations of the large-volume stacker 200*a*.

[Internal Structure of Paste Binding Apparatus]

Figure 12:
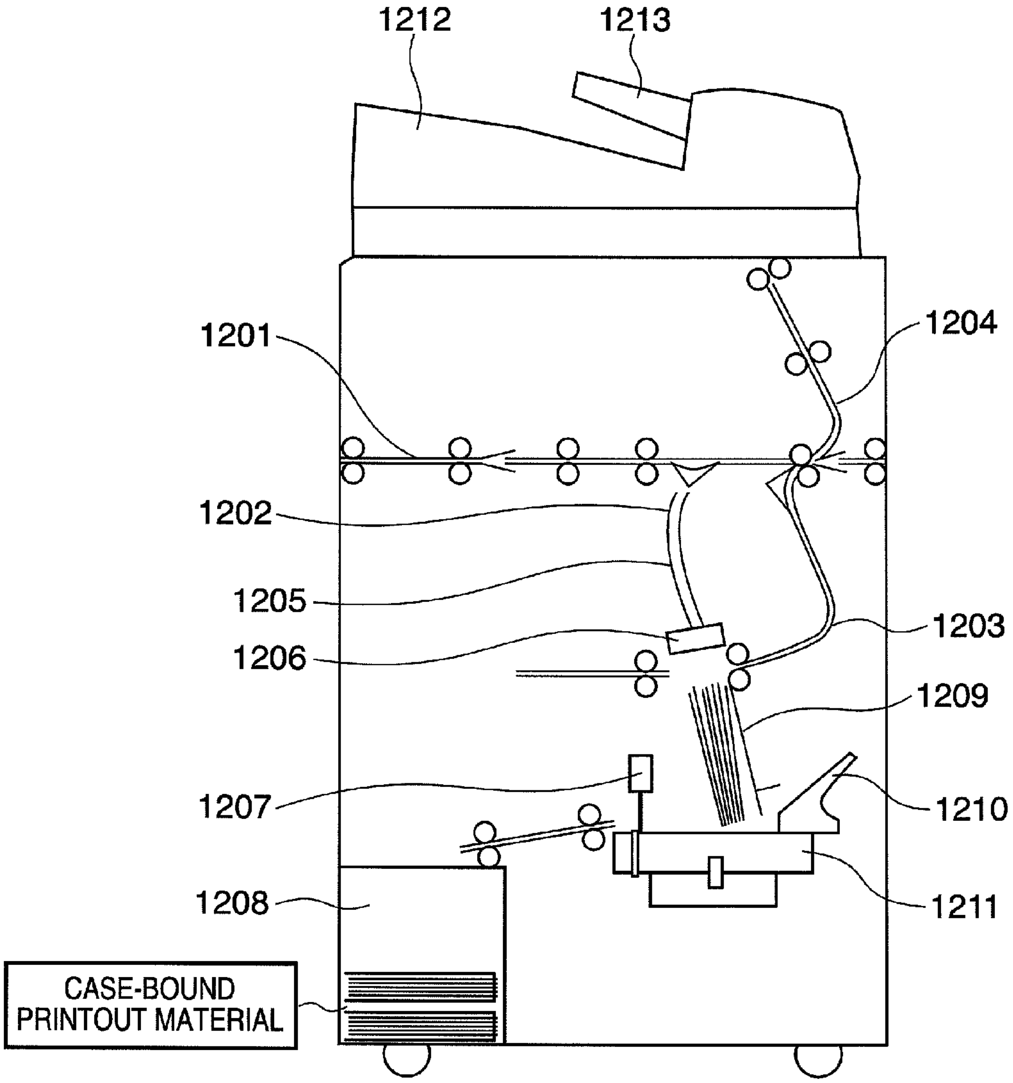
FIG. 12 is a sectional view showing the internal structure of a paste binding apparatus according to the first embodiment.

FIG. 12 is a sectional view showing the internal structure of the paste binding apparatus according to the first embodiment.

The paste binding apparatus 200*b* includes four feeding paths: a straight path 1201, main body path 1202, cover path 1203, and inserter path 1204. The paste binding apparatus 200*b* also includes a stacking unit 1205, pasting unit 1206, cutter 1207, basket 1208, guide 1209, aligning unit 1210, rotating table 1211, insertion tray 1212, and inserter 1213. The straight path (through path) 1201 is a feeding path having the same function as that of the straight path 1101 in the large-volume stacker 200*a*. Thus, a detailed description of the straight path 1201 and signal line will not be repeated.

The main body path 1202 and cover path 1203 are sheet feeding paths for creating a case-bound printed material. The main body path 1202 is a feeding path for conveying sheets serving as the body of a printed material to be case-bound. The cover path 1203 is a feeding path for conveying a cover sheet. In case binding, a sheet bundle of a body on which print data corresponding to the body is printed is called a "main body".

Assume that the control unit 205 accepts a case binding process execute request from the user via the UI unit by a key operation to the key 707 shown in FIG. 7 in this configuration. In this case, the control unit 205 performs the following control.

The control unit 205 sequentially accumulates sheets printed by the printer unit 203 on the stacking unit 1205 via the main body path 1202. The control unit 205 accumulates sheets of all pages bearing body data on the stacking unit 1205. After that, the control unit 205 conveys a cover sheet via the cover path 1203.

A cover sheet may be supplied from the insertion tray 1212 of the inserter 1213 of the paste binding apparatus 200*b*, as shown in FIG. 12. In this case, the cover sheet is conveyed to the inserter path 1204. A cover sheet may also be supplied from a preceding apparatus to the straight path 1201 after printing by the printing apparatus 100. The control unit 205 conveys either sheet as a cover sheet to the cover path 1203. The control unit 205 suspends conveyance of the cover sheet below the stacking unit 1205.

In parallel with this operation, the control unit 205 executes a pasting process for all body pages (main body) stacked on the stacking unit 1205. For example, the pasting unit 1206 applies a predetermined amount of paste to the lower portion of the main body. After the paste spreads sufficiently, the pasted portion of the main body is attached to the center of the cover, wrapped, and joined. In joining, the main body is pushed down, and the covered main body slides onto the rotating table 1211 along the guide 1209. The guide 1209 moves so that the covered main body falls onto the rotating table 1211.

The control unit 205 causes the aligning unit 1210 to align the covered main body laid on the rotating table 1211. After aligning the main body, the control unit 205 causes the cutter 1207 to cut an edge. The control unit 205 rotates the rotating table 1211 through 90°. The control unit 205 causes the aligning unit 1210 to align the main body, and the cutter 1207 to cut the top edge. Further, the control unit 205 rotates the rotating table 1211 through 180°. The control unit 205 causes the aligning unit 1210 to align the main body, and the cutter 1207 to cut the tail edge.

After cutting, the control unit 205 causes the aligning unit again to push the main body to an inner portion, putting the completed covered main body into the basket 1208.

After the paste is satisfactorily dried in the basket 1208, an operator can take out the completed case-bound bundle. The number of sheets processed by the case binding process is much larger than that of sheets processed by a sheet process different from the paste binding process. More specifically, the case binding process permits processing a maximum of 200 sheets as one body sheet bundle. To the contrary, the stapling process or the like permits processing a maximum of 20 sheets, and the saddle stitching process permits processing a maximum of 15 sheets. The number of sheet process-permitted print sheets as one sheet bundle is greatly different between the paste binding process and another sheet process.

According to the embodiment, the control unit 205 allows a target inline type sheet processing apparatus to execute the paste binding process as a case binding process. The embodiment can provide new finishing as finishing which is not even requested in the office environment and is executable by an inline type sheet processing apparatus. This configuration is one of mechanisms assuming the POD environment, and is related to control to be described later.

As described above, the paste binding process executable by an inline type sheet processing apparatus in the embodiment has many process steps and many preparations, compared to other sheet processes, as represented by the configuration. In other words, the paste binding process is different in configuration from sheet processes such as stapling and saddle stitching often used in the office environment. The process time taken to complete a requested sheet process is likely to be longer in the paste binding process than other sheet processes. The embodiment pays attention to even this point.

As is apparent from merely the paste binding function, the printing system 1000 in the embodiment is applicable not only to the office environment but also to a new printing environment such as the POD environment. As constituent features available even in the POD environment, the printing system 1000 comprises new functions such as the case binding function and large-volume stacking function which are not supported in the office environment. As illustrated in FIGS. 8A to 10B, a plurality of inline type sheet processing apparatuses 200 are connected to the printing apparatus 100 in order to achieve this purpose.

It should be noted that the printing system 1000 not only provides the above-described new functions and system configurations, but also finds out and examines problems such as use cases and user needs to be tackled. One feature of the printing system 1000 is to provide constituent features serving as solutions to the problems. In this way, the printing system 1000 finds out and examines in advance problems such as market demands, and employs mechanisms as configurations considering solutions to the problems when an office-equipment maker finds and enters a new market.

[Internal Structure of Saddle Stitching Apparatus]

Figure 13:
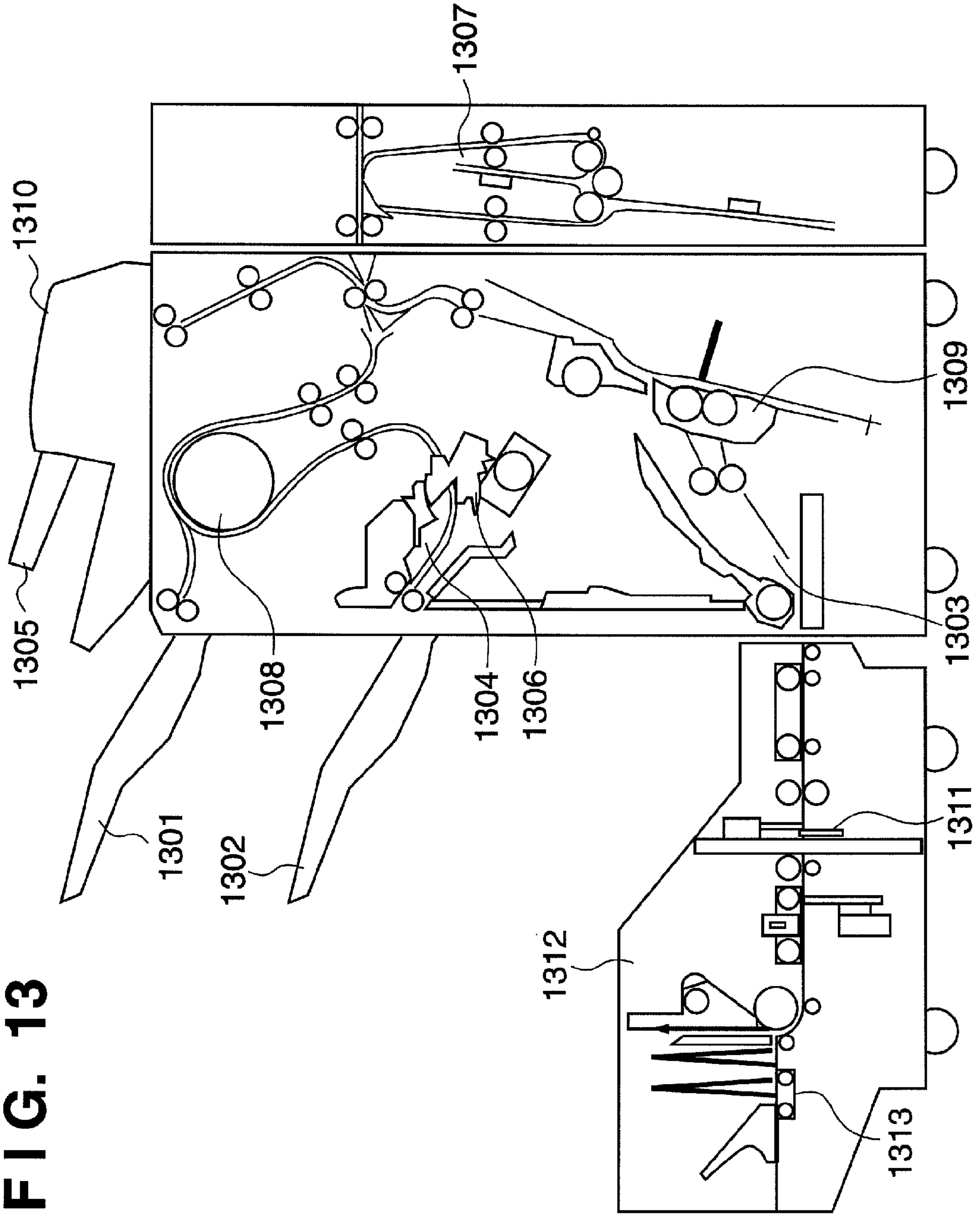
FIG. 13 is a sectional view showing the internal structure of a saddle stitching apparatus according to the first embodiment.

FIG. 13 is a sectional view showing the internal structure of the saddle stitching apparatus according to the first embodiment.

The saddle stitching apparatus 200*c* incorporates various units for selectively executing a stapling process, cutting process, punching process, and folding process for sheets from the printing apparatus 100. As described in the restrictions, the saddle stitching apparatus 200*c* does not have a through path serving as the function of conveying sheets to a succeeding apparatus.

The sheet feeding path in the saddle stitching apparatus 200*c* comprises a plurality of sheet sensors necessary to detect the sheet conveyance status and jam.

The CPU (not shown) of the saddle stitching apparatus 200*c* notifies the control unit 205 of sheet detection information from each sensor via a signal line for communicating data with the control unit 205. On the basis of the information from the saddle stitching apparatus, the control unit 205 grasps the sheet conveyance status and jam in the saddle stitching apparatus 200*c*. As a system configuration of the printing system 1000, another sheet processing apparatus 200 may be cascade-connected between the sheet processing apparatus 200 and the printing apparatus 100. In this case, the CPU of the saddle stitching apparatus 200*c* notifies the control unit 205 via the CPU of the cascade-connected sheet processing apparatus 200, of sensor information of the saddle stitching apparatus 200*c*. The printing system 1000 comprises an arrangement unique to an inline finisher.

The saddle stitching apparatus 200*c* includes a sample tray 1301, stack tray 1302, booklet tray 1303, process tray 1304, and insertion tray 1305. The saddle stitching apparatus 200*c* also includes a stapler 1306, Z-folding unit 1307, puncher 1308, saddle stitcher 1309, and inserter 1310. The saddle stitching apparatus 200*c* further includes a cutter 1311, trimmer 1312, and booklet holding unit 1313. The control unit 205 switches a unit for use in accordance with the job type and the number of discharged sheets.

Assume that the control unit 205 accepts a request from the user via the UI unit to execute a stapling process executable by the saddle stitching apparatus 200*c*. In this case, the control unit 205 conveys sheets from the printer unit 203 to the stack tray 1302. Before discharging sheets to the stack tray 1302, the control unit 205 sequentially accumulates them on the process tray 1304 for each job. Then, the control unit 205 causes the stapler 1306 on the process tray 1304 to bind the sheets, and discharges the sheet bundle onto the stack tray 1302. According to this method, sheets printed by the printer unit 203 are stapled.

When the user sets the Z-folding process, the control unit 205 causes the Z-folding unit 1307 to fold sheets. Then, the control unit 205 controls to deliver the sheets onto either the stack tray 1302 or sample tray 1301. When the user sets the punching process, the control unit 205 causes the puncher 1308 to punch sheets. Then, the control unit 205 controls to deliver the sheets onto either the stack tray 1302 or sample tray 1301.

The saddle stitcher 1309 performs a saddle stitching process to bind sheets at two center portions, pinch them at their center by rollers, fold them in half, and create a booklet like a pamphlet. Sheets bound by the saddle stitcher 1309 are discharged onto the booklet tray 1303. Whether a sheet process operation such as a bookbinding process by the saddle stitcher 1309 is executable is also based on sheet process settings made by the user for a job to be output.

The inserter 1310 sends sheets set on the insertion tray 1305 to either the stack tray 1302 or sample tray 1301 without supplying the sheets to the printer. The saddle stitching apparatus 200*c* can insert a sheet set on the inserter 1310 between sheets (sheets printed by the printer unit 203) conveyed inside the saddle stitching apparatus 200*c*. The user sets sheets on the insertion tray 1305 of the inserter 1310 while the sheets face up. The pickup roller sequentially feeds sheets from the top. A sheet from the inserter 1310 is directly conveyed to the stack tray 1302 or sample tray 1301, and discharged while facing down. When conveying a sheet to the saddle stitcher 1309, the control unit 205 adjusts the face orientation by feeding the sheet to the puncher 1308 once, and then switching back and feeding the sheet.

Whether a sheet process operation such as a sheet insertion process by the inserter 1310 is executable is also based on sheet process settings made by the user for a job to be output.

In the saddle stitching apparatus 200*c*, a booklet (saddle-stitched) output enters the trimmer 1312. At this time, the booklet output is fed by a predetermined length by the roller, and cut by a predetermined length by the cutter 1311. As a result, uneven edges between pages of the booklet are aligned. Then, the booklet is stored in the booklet holding unit 1313. Whether a sheet process operation such as a cutting process by the trimmer is executable is also based on sheet process settings made by the user for a job to be output.

Figure 14:
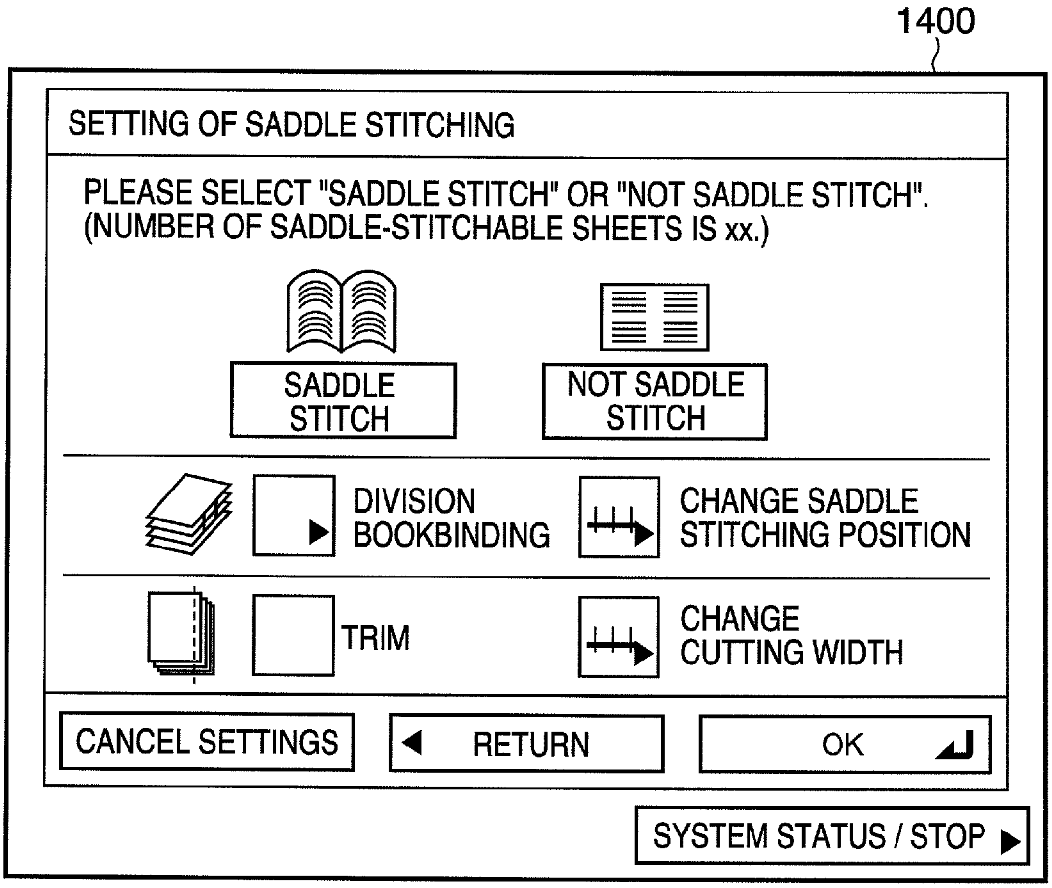
FIG. 14 is a view showing a display control example for the UI unit according to the first embodiment.

When the user selects saddle stitching with the key 705 shown in FIG. 7, the control unit 205 causes the UI unit to execute a display in FIG. 14. FIG. 14 is a view showing a display control example for the UI unit according to the first embodiment. The control unit 205 controls to accept detailed settings of the saddle stitching process from a user via a display 1400 in FIG. 14. For example, the display 1400 allows the user to decide whether to actually saddle-stitch sheets near their center with staples. The display 1400 can also accept a setting such as division bookbinding, change of the saddle stitching position, execution/non-execution of cutting, or change of the cutting width from the user.

Figure 15:
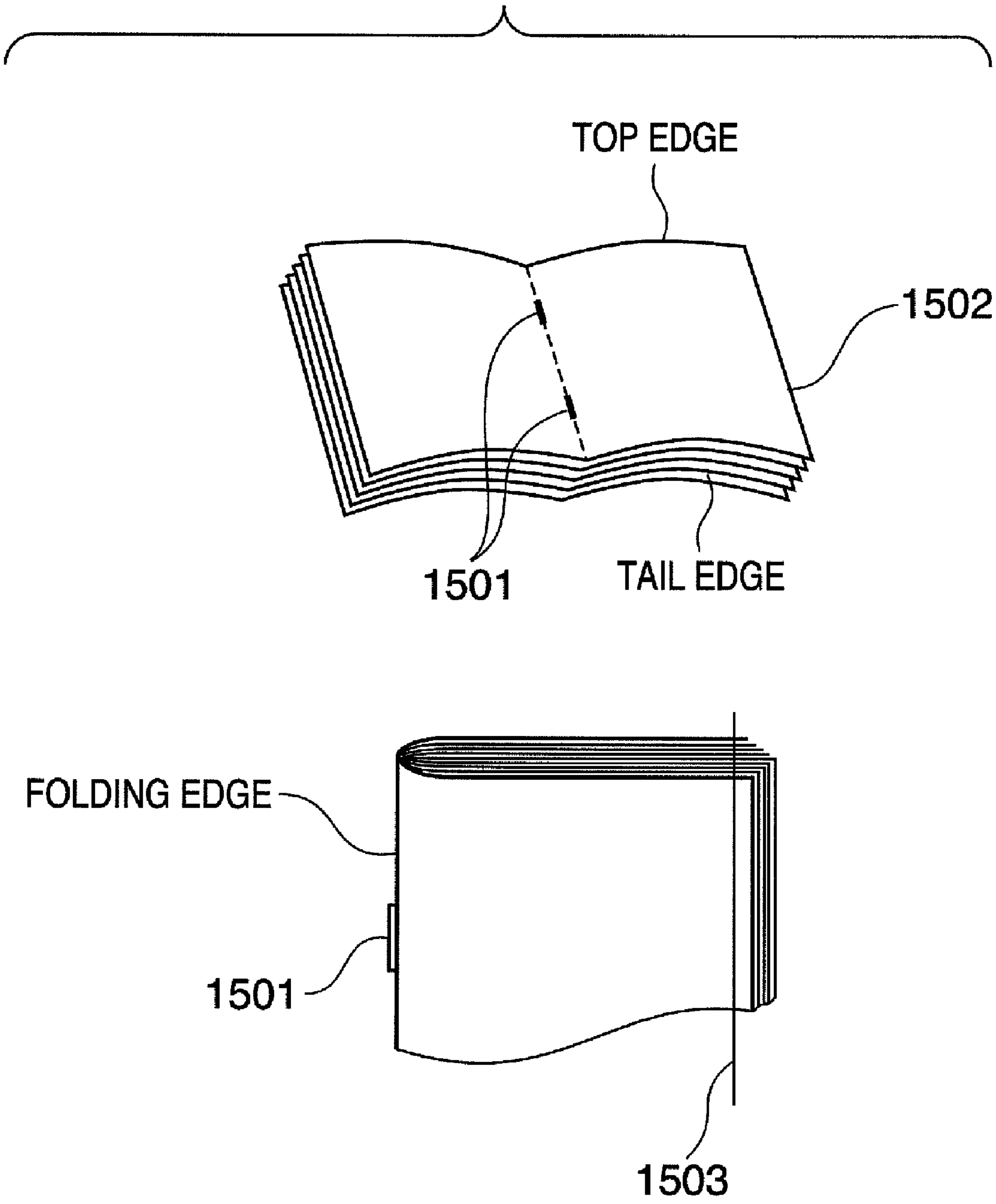
FIG. 15 is a view showing a saddle stitching result according to the first embodiment.

Assume that the user sets "saddle-stitch" and "cut" via the display 1400. In this case, the control unit 205 controls the operation of the printing system 1000 to form a target job into a print style as shown in FIG. 15 as a saddle stitching print result. FIG. 15 is a view showing a saddle stitching result according to the first embodiment. As shown in FIG. 15, saddle stitches 1501 are put in sheets at center portions, and an edge 1502 is cut along a cutting edge 1503. If the positions of the saddle stitches 1501 and the position of the cutting edge are set in advance, they can be changed to desired positions in the saddle stitching process.

Figure 16:
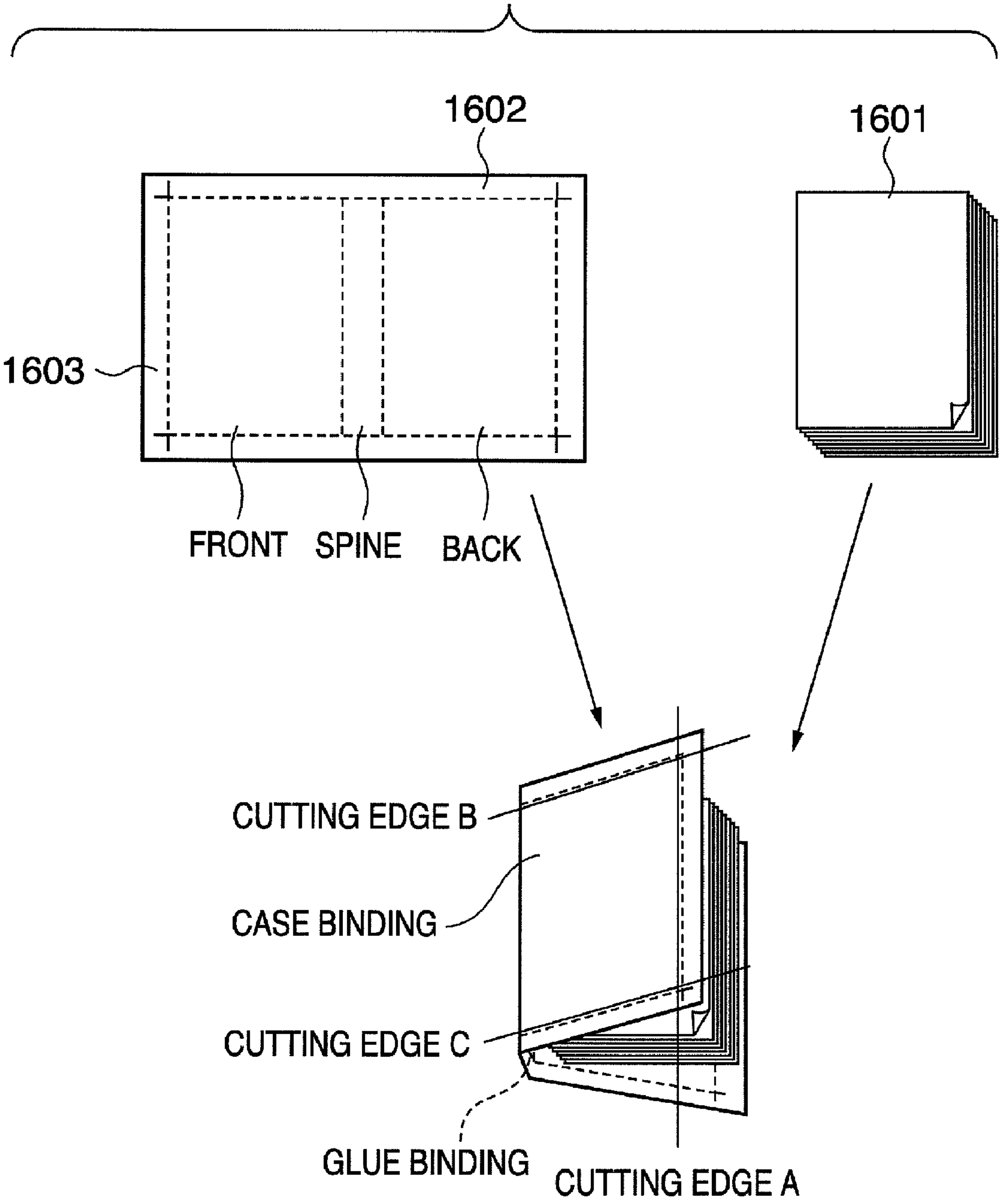
FIG. 16 is view showing a case binding result according to the first embodiment.

When the user sets a case binding process with the key 707 shown in FIG. 7, the control unit 205 controls the printing system 1000 to form a target job into a print style as shown in FIG. 16 as a case binding print result. FIG. 16 is view showing a case binding result according to the first embodiment. In the case binding process, a main body 1601 is wrapped with a cover 1602, and cut along a set cutting edge. As shown in FIG. 16, the cutting widths of cutting edges A, B, and C can be set for a printed material subjected to case binding.

A supplementary area (also called a specific area) 1603 is positioned outside cutting edges A, B, and C. An object to assist a sheet process is printed in the supplementary area 1603. Such objects include printer's marks (dotted lines, and cutting edges A, B, and C shown in FIG. 16), a color bar for adjusting the ink density of the printing apparatus 100, a bleed for assisting a cutting process, and page information containing a file name or page number. The supplementary area 1603 where these objects are printed is discarded after the cutting process. It is, therefore, desirable to minimize objects to be printed, and the printing system 1000 can reduce the toner consumption amount.

Figure 17A:
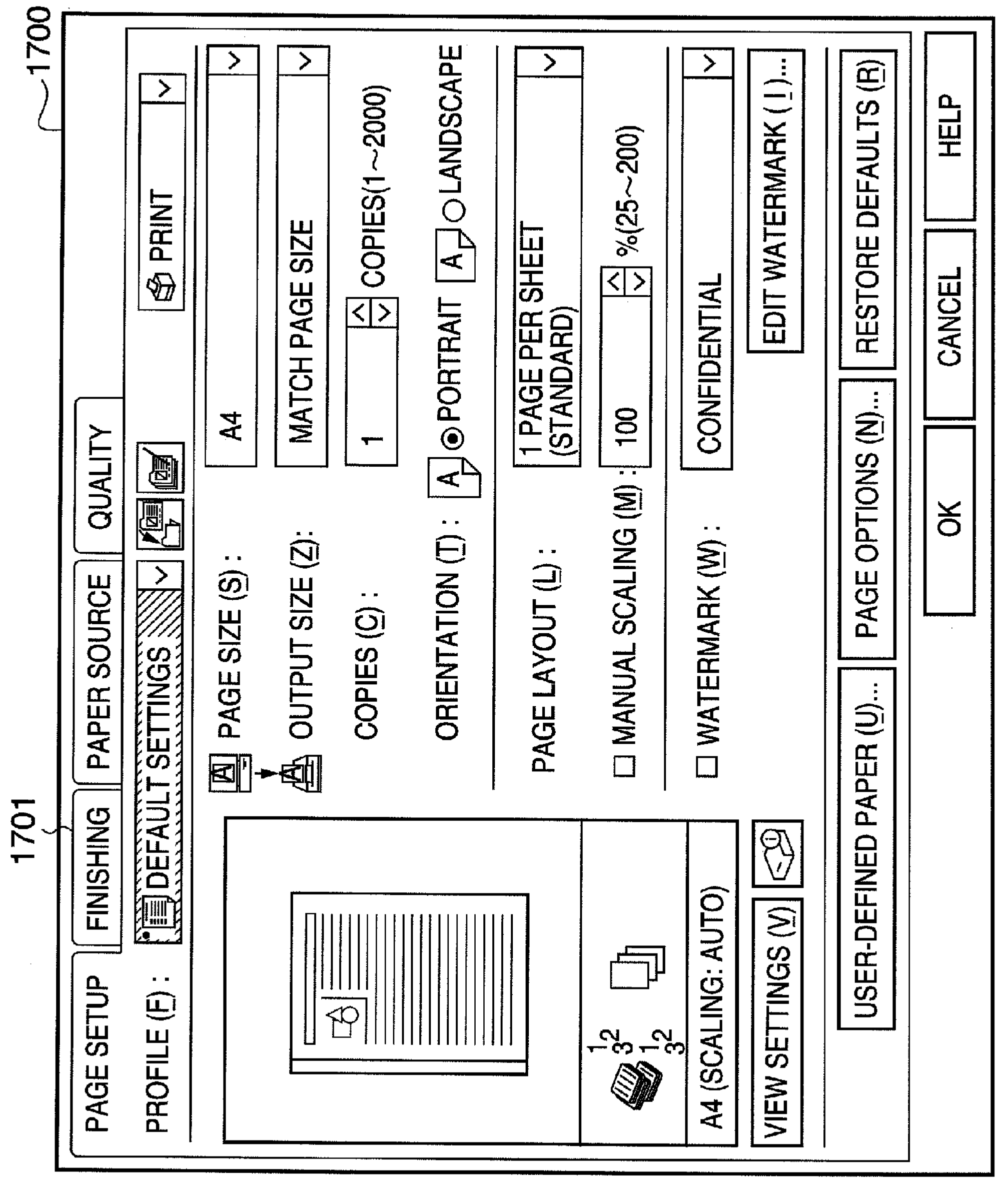
FIGS. 17A to 17C are views showing display control examples for the UI unit according to the first embodiment.
Figure 17B:
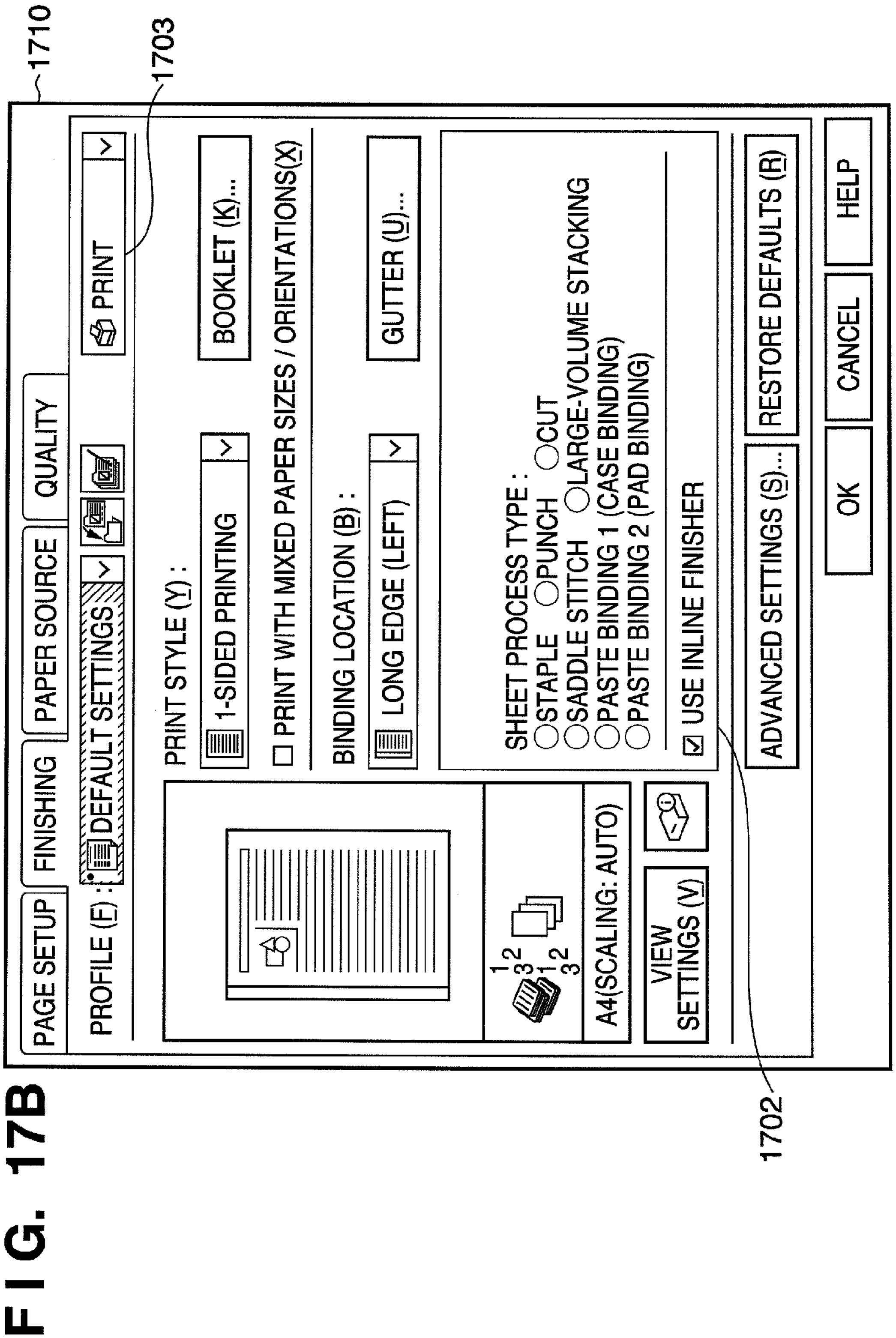
Figure 17C:
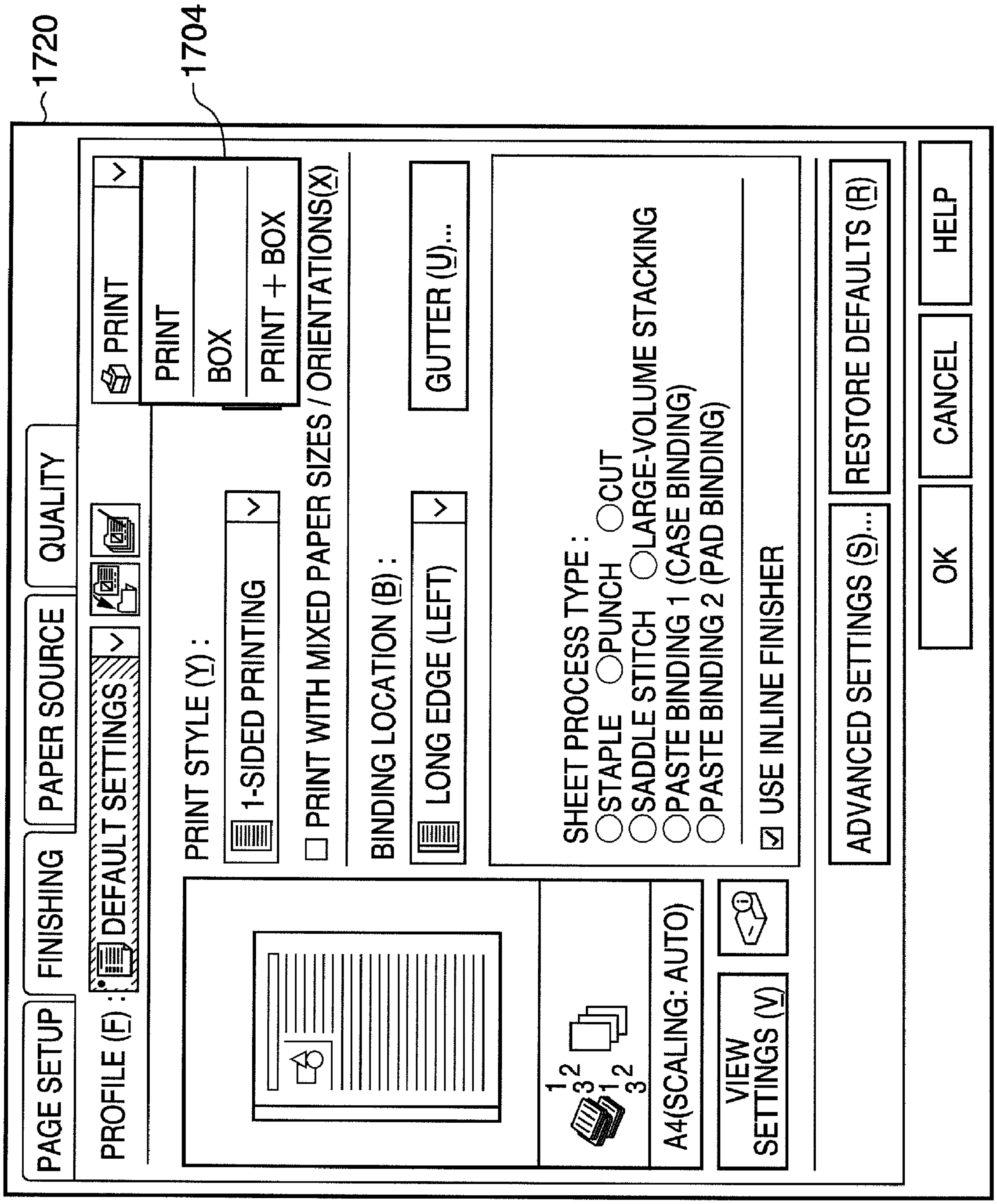

A print job requested from an information processing apparatus serving as an external apparatus will be explained with reference to FIGS. 17A to 17C. FIGS. 17A to 17C are views showing display control examples for the UI unit according to the first embodiment. An example when a host computer uses the printing system 1000 will be described.

For example, the printing system 1000 is controlled as follows when operated by a host computer (e.g., the PC 103 or 104 in FIG. 1) which downloads program data for executing various processes and control operations in the embodiment from a data supply source (e.g., WEB) or a specific storage medium. The main controller is the control unit of the PC.

Assume that an instruction to activate a printer driver for operating the printing apparatus 100 of the printing system 1000 is received in response to a mouse or keyboard operation by a user. In accordance with the instruction, the CPU of the host computer displays a print setup window 1700 shown in FIG. 17A on the display unit of the host computer.

Assume that the user presses a finishing key 1701 with the mouse in the print setup window 1700. Then, the CPU controls the display unit to switch the print setup window 1700 to a print setup window 1710 shown in FIG. 17B.

The CPU causes the display unit to display sheet process types, and allows the user to select whether to execute a sheet process by the inline type sheet processing apparatus 200 of the printing system 1000. A sheet process setting item 1702 in the print setup window 1710 displays sheet processes executable by the inline type sheet processing apparatuses 200 of the printing system 1000. Alternatively, the sheet process setting item 1702 displays sheet processes to be executed by the paper folding apparatus 107, cutting apparatus 109, saddle stitching apparatus 110, and case binding apparatus 108 which are non-inline type sheet processing apparatuses in the whole POD system 10000.

Assume that the user presses an output destination designation key 1703 in the print setup window 1710. Then, the CPU controls the display unit to switch the print setup window 1710 to a print setup window 1720 shown in FIG. 17C. The CPU causes the display unit to display a pull-down menu 1704 which allows the user to select one of printing, storage in the box, and storage in the box after printing as an output destination type.

The printing system according to the present invention may display another display window for making settings, in addition to the windows in FIGS. 17A, 17B, and 17C. That is, an external apparatus suffices to execute the same processes and control operations as those described in the embodiment.

Assume that the user selects a desired sheet process and output destination via the setting item 1701, and presses the OK key.

In response to this, the CPU associates, as one job, commands representing various printing conditions set by the user via the print setup window with a series of data to be printed by the printer unit 203. Thereafter, the CPU transmits the job to the printing system 1000 via the network 101.

The external I/F unit 202 of the printing system 1000 receives the job (job ticket) from the computer. At this time, the external I/F unit 202 functions as a reception unit. Upon receiving the job, the control unit 205 of the printing system controls the printing system 1000 to process the job from the host computer on the basis of process requirements set by the user on the host computer.

The above-described configuration can obtain various effects described in the embodiment even for a job from an external apparatus or the like, and can further increase the use efficiency of the printing system 1000.

The control unit 205 of the printing system 1000 executes various control operations to be described below on the premise of the above-described constituent features. The configurations described with reference to FIGS. 1 to 17C correspond to constituent features common to all examples in the embodiment. That is, various control operations described in the embodiment correspond to constituent features based on these configurations.

Figure 18A:
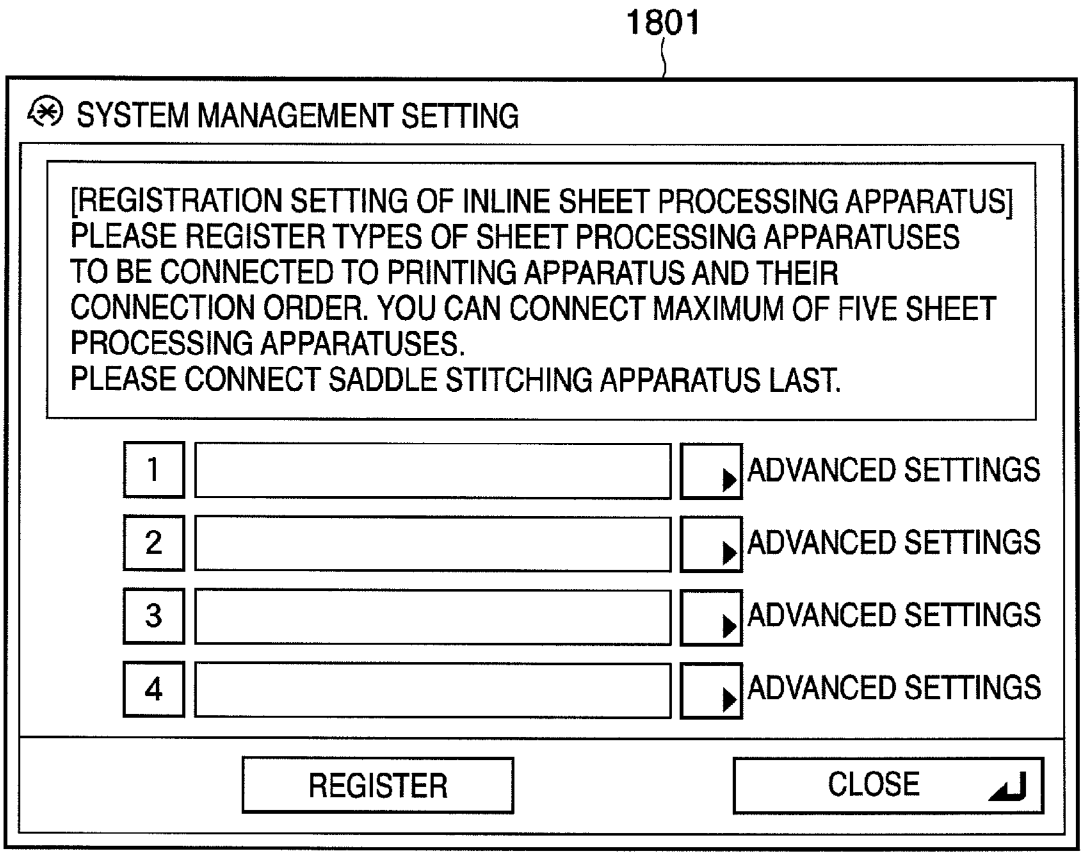
FIGS. 18A to 18D are views showing display control examples for the UI unit according to the first embodiment.

The printing system 1000 is designed by paying attention to the operability of a user. For example, the printing system 1000 allows an operator to manually register a system configuration in the HDD 209. Assume that a POD company wants to build the system configuration shown in FIG. 8A as the system configuration of the printing system 1000. In this case, the operator of the POD company connects three sheet processing apparatuses shown in FIG. 8A purchased together with the printing apparatus 100 to the printing apparatus 100 in the connection order shown in FIG. 8A. Then, the operator presses the user mode key 505 of the operation unit 204. In response to this key operation, the control unit 205 causes the display unit 401 to execute a display shown in FIG. 18A. FIG. 18A is a view showing a display control example for the UI unit according to the first embodiment.

A setup window 1801 is a display which allows an operator to manually input system configuration information of the printing system 1000. The control unit 205 allows the operator via displays in FIGS. 18A to 18D to decide the types of inline type sheet processing apparatuses 200 to be connected to the printing apparatus 100. In addition, the control unit 205 allows the operator via the displays in FIGS. 18A to 18D to decide the connection order of sheet processing apparatuses 200 to be connected to the printing apparatus 100.

If the operator presses an “advanced settings” key in the setup window 1801, the control unit 205 displays a window (not shown). This window enables specifying sheet processing apparatuses 200 used in the printing system 1000 one by one. To follow the above-mentioned restrictions, the control unit 205 also notifies the operator of the restriction information as guidance information. For example, the control unit 205 notifies the operator of a guidance “please register the types of sheet processing apparatuses to be connected to the printing apparatus, and their connection order. You can connect a maximum of five apparatuses. Please connect a saddle stitching apparatus last.” In this case, the maximum number of connected inline type sheet processing apparatuses 200 is five, but is not limited to this.

The control unit 205 displays sheet processing apparatuses 200 for use one by one from the top setting item in FIG. 18A. The control unit 205 determines that the setting order itself from the top setting item is an actual apparatus connection order.

Figure 18B:
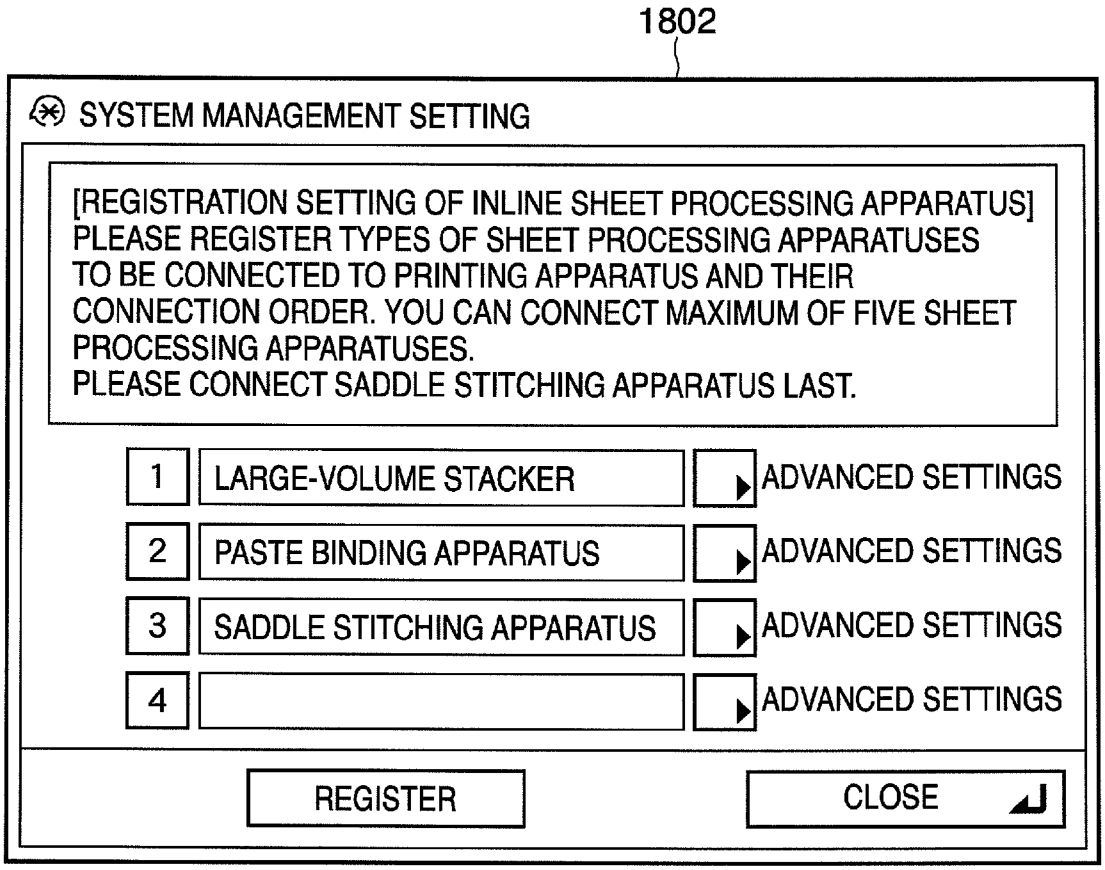

For example, the types of sheet processing apparatuses and their connection order are registered as represented by a setup window 1802 shown in FIG. 18B. In the setup window 1802, “large-volume stacker 200*a*, paste binding apparatus 200*b*, and saddle stitching apparatus 200*c*” are set sequentially from the top setting item. The control unit 205 determines that this setting order is an actual connection order, as shown in FIG. 8A.

Figure 18C:
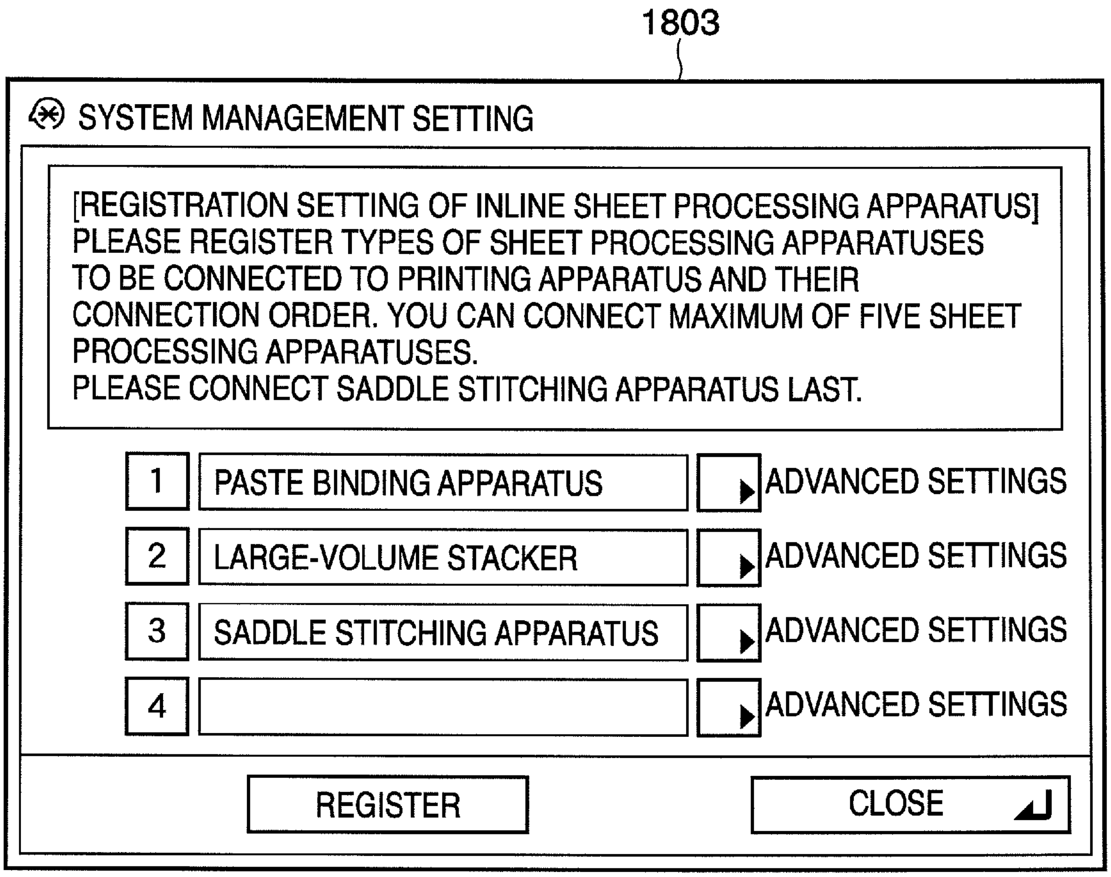

When the printing system 1000 has the system configuration shown in FIG. 9A, the types of sheet processing apparatuses and their connection order are registered as represented by a setup window 1803 shown in FIG. 18C. In the setup window 1803, “paste binding apparatus 200*b*, large-volume stacker 200*a*, and saddle stitching apparatus 200*c*” are set sequentially from the top setting item. The control unit 205 determines that this setting order is an actual connection order, as shown in FIG. 9A.

Figure 18D:
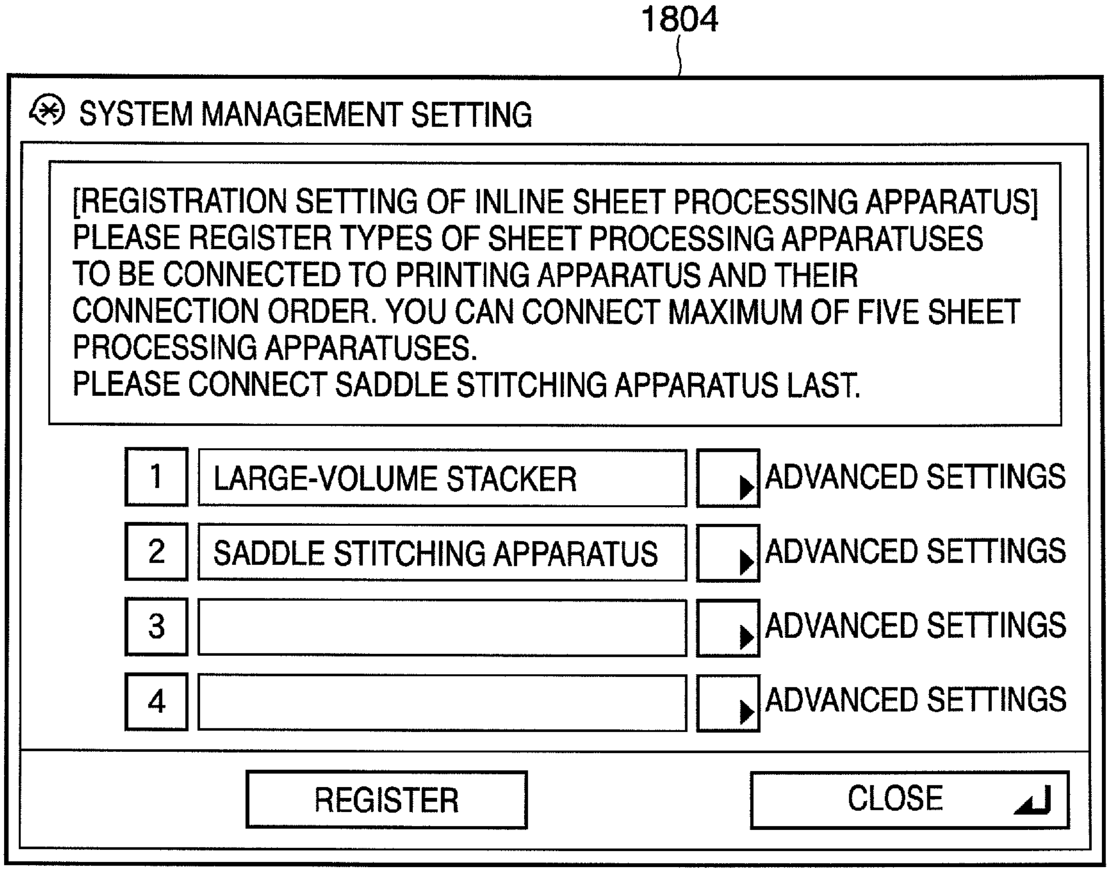

When the printing system 1000 has the system configuration shown in FIG. 10A, the types of sheet processing apparatuses and their connection order are registered as represented by a setup window 1804 shown in FIG. 18D. In the setup window 1804, "large-volume stacker 200*a* and saddle stitching apparatus 200*c*" are set sequentially from the top setting item. The control unit 205 determines that this setting order is an actual connection order, as shown in FIG. 10A.

A printing system according to the embodiment in which identical sheet processing apparatuses are connected will be explained with reference to FIG. 19. FIG. 19 is a view showing another system configuration of the printing system 1000 according to the first embodiment. A system configuration in which a total of three sheet processing apparatuses 200, i.e., two large-volume stackers 200*a* and one saddle stitching apparatus 200*c* are connected will be explained. In this way, sheet processing apparatuses 200 of the same type may be connected in the printing system 1000 according to the embodiment. A configuration in which sheet processing apparatuses 200 of the same type are cascade-connected as shown in FIG. 19 will be called tandem connection. The system configuration shown in FIG. 19 assumes a situation in which large-volume stacking is frequently executed.

Supplementary Remarks

Figure 20:
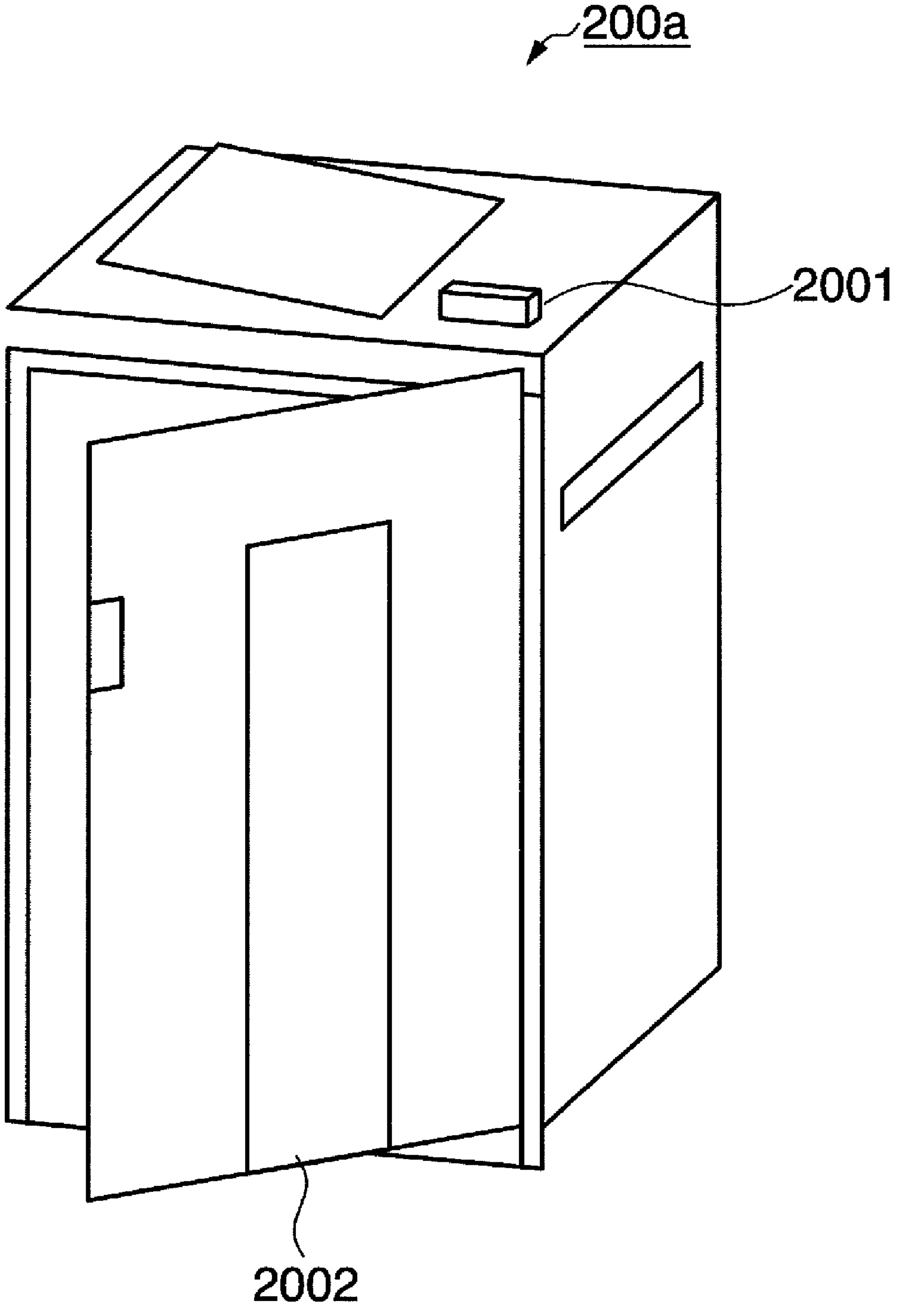
FIG. 20 is a perspective view showing an outline of the large-volume stacker according to the first embodiment.

Supplementary remarks of the sheet processing apparatus 200 will be made. The sheet processing apparatus 200 such as the large-volume stacker 200*a* in the embodiment has an openable/closable door (front door) on the front surface of the apparatus housing. The door is necessary to cancel a jam for each apparatus or take out the printed materials (also called printed media) of a job printed by the printer unit 203. FIG. 20 is a perspective view showing an outline of the large-volume stacker according to the first embodiment.

As shown in FIG. 20, the front surface of the large-volume stacker 200*a* has a front door 2002 openable/closable by an operator. The large-volume stacker 200*a* has a switch 2001 at the top of the apparatus housing to allow the operator to input an instruction to open the front door 2002. The switch 2001 is used to open the front door. When the front door 2002 is opened, the operator can take out sheets stacked on the stack tray 1105 of the large-volume stacker 200*a*.

Control Unit of Printing Apparatus

Figure 21:
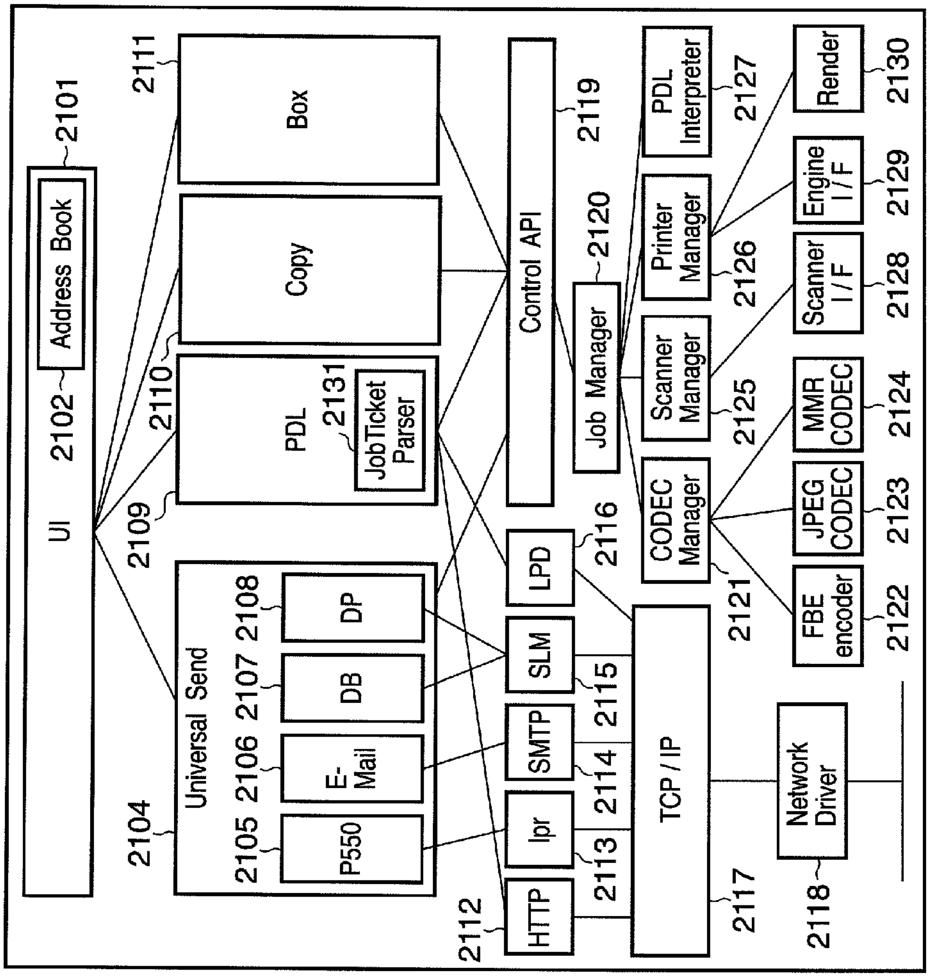
FIG. 21 is a block diagram showing software blocks executed by the control unit of a printing apparatus according to the first embodiment.

Functions executed by the control unit 205 in the printing apparatus 100 will be explained with reference to FIG. 21. FIG. 21 is a block diagram showing software blocks executed by the control unit of the printing apparatus according to the first embodiment. The roles and functions of the software blocks will be described. It should be noted that actual control is complete by executing related software blocks by the control unit 205.

Reference numeral 2101 denotes a UI module which manages the UI (User Interface) and interfaces devices when the operator performs various operations and settings of the printing apparatus 100. The module 2101 performs processes such as transfer of input information to various modules (to be described later) and setting of data in accordance with an operation by the operator.

Reference numeral 2102 denotes an Address Book database module which manages a data sending destination, communication destination, and the like. The contents of the Address Book database module 2102 are used to give data sending or communication destination information to each module in accordance with a data addition, deletion, or acquisition operation from the module 2101.

Reference numeral 2104 denotes a Universal Send module which manages data distribution. The module 2104 distributes data designated by the operator via the UI module 2101 to a similarly designated communication (output) destination. When the operator designates generation of distribution data using the scanner function of the printing apparatus 100, the module 2104 operates the device via a Control API 2119 (to be described later) to generate data.

Reference numeral 2105 denotes a module executed within the Universal Send module 2104 when a printer is designated as an output destination. Reference numeral 2106 denotes a module executed within the Universal Send module 2104 when an E-mail address is designated as a communication destination. Reference numeral 2107 denotes a module executed within the Universal Send module 2104 when a database is designated as an output destination. Reference numeral 2108 denotes a module executed within the Universal Send module 2104 when a document processing apparatus identical to the printing apparatus 100 is designated as an output destination.

Reference numeral 2109 denotes a PDL module which implements a function of printing a PDL (Page Description Language) document transmitted from outside the printing apparatus 100 by using the print function of the printing apparatus 100.

Reference numeral 2131 denotes a Job Ticket Parser module which interprets job ticket data received together with PDL data. The job ticket can designate a printing medium, the number of copies, a post-process, various color processes, and an image processing method. The module 2131 functions as a determination unit, and determines whether the job ticket contains supplementary area information. When the job ticket contains supplementary area information, the control unit 205 sets the print area of a bitmap image in accordance with the supplementary area information. The module 2131 parses information designated in the job ticket. The parsed information is transmitted via the Control API 2119 (to be described later) to a Job Manager module 2120, Printer Manager module 2126, and PDL Interpreter module 2127 (to be also described later). The module 2131 also provides a function of printing an electronic document stored in an external Web server by using an HTTP module 2112.

Reference numeral 2110 denotes a Copy module which executes a copy operation on the basis of a UI instruction by using the print function and scanner function of the printing apparatus 100.

Reference numeral 2111 denotes a Box module which stores a scanned image or PDL print image in the HDD 209. The stored image can be printed or transmitted by the Universal Send function. The module 2111 also provides a function of managing deletion of a document stored in the HDD 209, grouping (storage in an individual box), movement between boxes, copying between boxes, and the like.

The module 2112 is used when the printing system 1000 communicates by HTTP, and provides communication from a TCP/IP module 2117 (to be described later) to the PDL module 2109. Reference numeral 2113 denotes an Ipr module which provides communication from the TCP/IP module 2117 (to be described later) to the printer module 2105 in the Universal Send module 2104. Reference numeral 2114 denotes an SMTP module which provides communication from the TCP/IP module 2117 (to be described later) to the E-mail module 2106 in the Universal Send module 2104.

Reference numeral 2115 denotes an SLM (Salutation Manager) module. The module 2115 provides communication from the TCP/IP module 2117 (to be described later) to the database module 2107 and DP module 2108 in the Universal Send module 2104. Reference numeral 2116 denotes an LPD module which provides communication from the TCP/IP module 2117 (to be described later) to the PDL module 2109.

The TCP/IP communication module 2117 provides network communication from a Network Driver module (to be described later) to various modules described above. Reference numeral 2118 denotes a Network Driver module which controls a part physically connected to the network, i.e., the external I/F unit 202.

The Control API 2119 interfaces host modules with submodules. Host modules are the Universal Send module 2104, PDL module 2109, Copy module 2110, Box module 2111, and the like. Submodules are the Job Manager module 2120 (to be described later) and the like. The Control API 2119 reduces the dependence between host modules and submodules, and enhances their flexibility.

The Job Manager module 2120 interprets processes designated by various modules described above via the Control API 2119, and gives instructions to modules (to be described later). The module 2120 centralizes hardware processes executed within the printing apparatus 100. Reference numeral 2121 denotes a CODEC Manager module which manages and controls various compression/decompression processes for data among processes designated by the Job Manager module 2120. Reference numeral 2122 denotes an FBE Encoder module which compresses, into the FEB format, data scanned by a scan process executed by the Job Manager module 2120 and a Scanner Manager module 2125.

Reference numeral 2123 denotes a JPEG CODEC module which JPEG-compresses read data and JPEG-decompresses print data. The JPEG CODEC module 2123 is used in a scan process executed by the Job Manager module 2120 and Scanner Manager module 2125, and a printing process executed by the Printer Manager module 2126.

Reference numeral 2124 denotes an MMR CODEC module which MMR-compresses read data and MMR-decompresses print data. The MMR CODEC module 2124 is used in a scan process executed by the Job Manager module 2120 and Scanner Manager module 2125. The MMR CODEC module 2124 is also used in a printing process executed by the Printer Manager module 2126.

Each of the FBE Encoder module 2122, JPEG CODEC module 2123, and MMR CODEC module 2124 performs an actual compression/decompression process by controlling the compression/decompression unit 210 which is dedicated hardware.

The Scanner Manager module 2125 manages and controls a scan process designated by the Job Manager module 2120. Reference numeral 2128 denotes a Scanner I/F which provides an I/F between the Scanner Manager module 2125 and the scanner unit 201 internally connected to the printing apparatus 100.

The Printer Manager module 2126 manages and controls a printing process designated by the Job Manager module 2120. Reference numeral 2129 denotes an Engine I/F driver which provides an I/F between the Printer Manager module 2126 and the printer unit 203.

The PDL Interpreter module 2127 interprets PDL data in accordance with an instruction from the Job Manager module 2120, and generates a display list which is a common transcription independent of the PDL data type. Examples of PDL data, i.e., page description language data are LIPS, PostScript, PCL, PDF, and SVG.

Reference numeral 2130 denotes a Render module which rasterizes a display list generated by the module 2127 into the raster image memory in accordance with an instruction from the Printer Manager module 2126.

Figure 22:
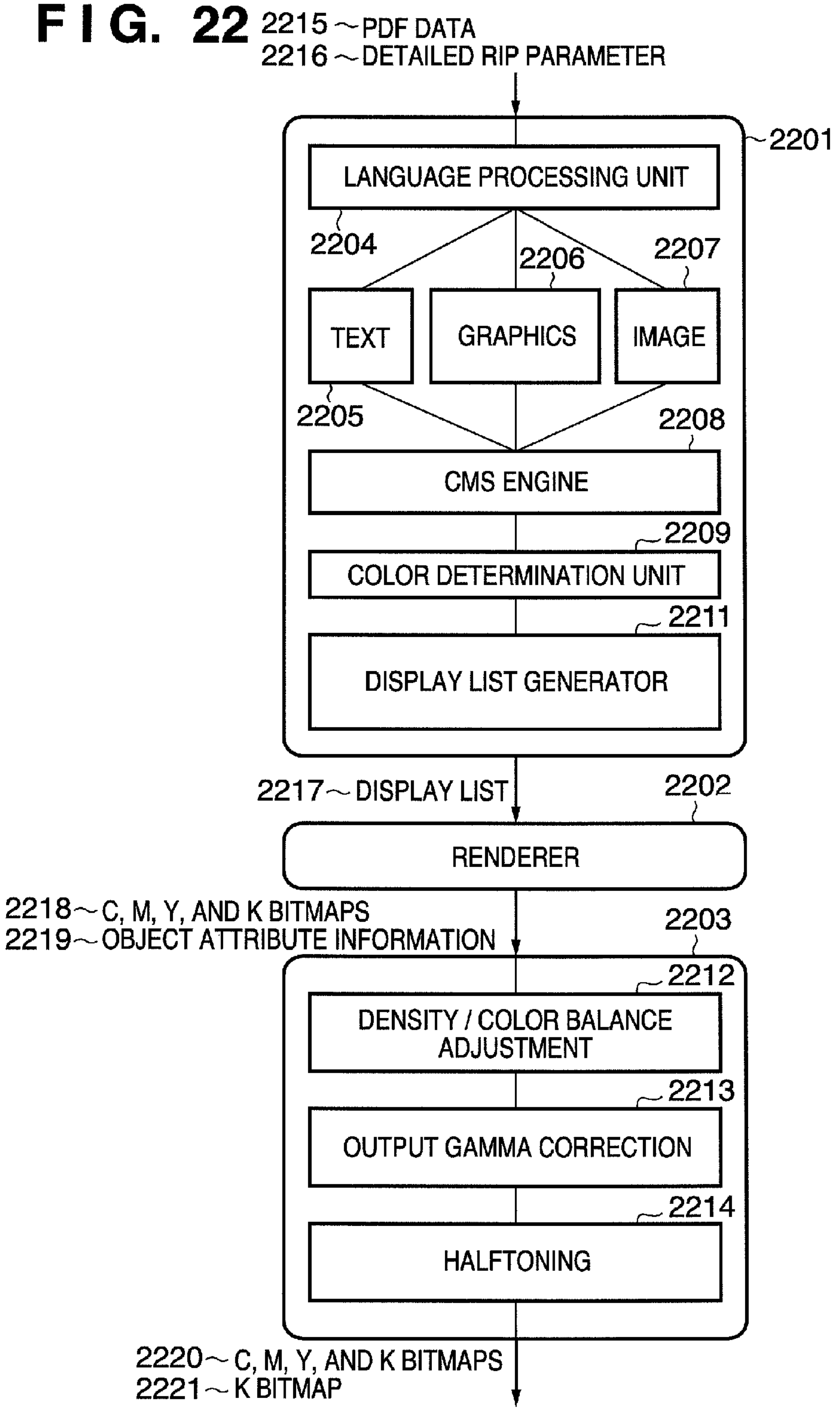
FIG. 22 is a block diagram showing the control sequence of a RIP process executed by the control unit according to the first embodiment.

The sequence of a RIP process to interpret page description language data and form an image will be explained with reference to FIG. 22. FIG. 22 is a block diagram showing the control sequence of the RIP process executed by the control unit according to the first embodiment. A PDF interpreter 2201, which is part of the module 2127, interprets data described in PDF to generate a display list 2217 as intermediate language data.

The control unit 205 pipeline-executes modules in the PDF interpreter 2201. Modules 2204 to 2211 are repetitively executed for each rendering object. At the end of processing all rendering objects in a single page, a display list for one page is generated.

A detailed RIP parameter 2216 is a set of parameters applied in a RIP process among information designated by a job ticket. Parameters applied here are an output color mode, RGB source profile, CMYK simulation profile, output profile, finishing information, double-sided output information, and the like.

In the sequence of the RIP process in FIG. 22, the color of rendering objects in each page decides whether the entire page is color or monochrome.

The language processing unit 2204 interprets PDF data, and issues a rendering request to the text processing unit 2205, graphics processing unit 2206, and image processing unit 2207 in accordance with a rendering operator.

The text processing unit 2205 generates a text bitmap on the basis of a designated font. The graphics processing unit 2206 controls vector graphics rendering. The image processing unit 2207 converts image data into a common internal data format.

The CMS engine 2208 is a color management module which converts input colors into an absolute color space and generates output colors (C, M, Y, and K) unique to the printer engine. PDF defines various color spaces such as the Device color space, CIEBased color space, and special color space. As for input colors designated in the Device color space, the CMS engine 2208 converts the colors using a designated one of prepared ICC profiles such as an RGB source profile and CMYK simulation profile. As for input colors designated in the CIEBased color space, the CMS engine 2208 converts the colors using a conversion table, conversion function, and conversion matrix designated in the color space. The CMS engine 2208 converts an absolute color space into a color space unique to the printer engine using an output profile. As the output profile, the CMS engine 2208 selectively uses two profiles: a gray compensation profile which preferentially represents the gray scale in a single K color, and a normal profile which represents the gray scale in four C, M, Y, and K colors. The CMS engine 2208 converts a spot color designated in the Separation color space, DeviceN color space, or the like into process colors (C, M, Y, and K) using a Named profile. ICC profiles including the RGB source profile, CMYK simulation profile, output profile, and Named profile are stored at predetermined positions in the HDD 209.

The color determination unit 2209 checks C, M, Y, and K colors as values output from the CMS engine 2208, and determines whether a page in process is a color or monochrome page. The color is determined only when Auto is designated as the output color mode of the detailed RIP parameter. In addition, color and monochrome can also be designated as the output color mode. When color or monochrome is designated as the output color mode, the color determination unit 2209 does not execute color determination.

The display list generator 2211 generates the display list 2217 as intermediate language data. The display list 2217 contains the attribute flag of each rendering object to identify whether the rendering object is graphics, an image, or a text. Each attribute is directly notified from the text processing unit 2205, graphics processing unit 2206, or image processing unit 2207. The attribute flag is used for a subsequent image process through a renderer. The display list 2217 contains raster operation information of each object to identify whether the object requires a raster operation process.

The renderer 2202 interprets the display list 2217 to generate C, M, Y, and K bitmaps 2218 each at a bit depth of 8×4 planes. The renderer 2202 has raster operation modes such as Mask (result=src & dest), Copy (result=src), and Merge (result=src|dest). The renderer 2202 executes a raster operation process between a rendered object (background, dest) and the next object to be rendered (foreground, src) in accordance with a raster operation mode designated for each rendering object. The renderer 2202 expands the raster operation process result in the page memory. The renderer 2202 generates an object attribute information 2219 representing the attribute of each device pixel on the basis of an attribute flag contained in the display list 2217. The object attribute information 2219 has attribute information of a 2-bit depth (e.g., 01 for graphics, 10 for an image, and 11 for a text) for each pixel. The C, M, Y, and K bitmaps 2218 and object attribute information 2219 are sent to an image processor 2203. Whether to perform rendering after creating the display list 2217 depends on control by the Job Manager module 2120 and Printer Manager module 2126. If rendering is not done immediately, the created display lists 2217 are sequentially stored at predetermined positions in the HDD 209.

The Printer Manager module 2126 controls the image processor 2203. The image processor 2203 performs image processes such as density/color balance adjustment 2212, output gamma correction 2213, and halftoning 2214 for the C, M, Y, and K bitmaps 2218.

The image processor 2203 applies different halftoning as the halftoning 2214 to each object attribute by referring to the object attribute information 2219. The image processor 2203 applies a resolution priority high-LPI screen to an image area of the graphics attribute, a tonality priority low-resolution screen to an image area of the image attribute, and error diffusion to an image area of the text attribute.

When the color determination unit 2209 determines that the target page is a monochrome page, the image processor 2203 receives only the K bitmap among the C, M, Y, and K bitmaps 2218 created by the renderer 2202. Then, the image processor 2203 generates a K bitmap 2221 used for a final output. When the color determination unit 2209 determines that the target page is a color page, the image processor 2203 receives the C, M, Y, and K bitmaps 2218 created by the renderer 2202. Then, the image processor 2203 generates C, M, Y, and K bitmaps 2220 used for a final output. The C, M, Y, and K bitmaps 2220 or K bitmap 2221 generated by the image processor 2203 is transferred to the printer unit 203 via the Engine I/F driver 2129, and printed out on a desired medium.

The printing apparatus 100 has two generated printing modes. One is a RIP-in-process printing mode in which the C, M, Y, and K bitmaps 2220 or K bitmap 2221 is printed out in parallel with interpretation or rendering of the next page. The other is an after-RIP printing mode in which the C, M, Y, and K bitmaps 2220 or K bitmap 2221 is printed out after rendering all pages in one job. In the RIP-in-process printing mode, no page may be output at the engine speed if page interpretation or rendering takes a long time. In the after-RIP printing mode, a plurality of pages can be output at the engine speed. The job ticket can designate which of the RIP-in-process printing mode and after-RIP printing mode is selected. The after-RIP printing mode is a default operation in the printing apparatus 100.

Process Sequence of Control Unit

Figure 23:
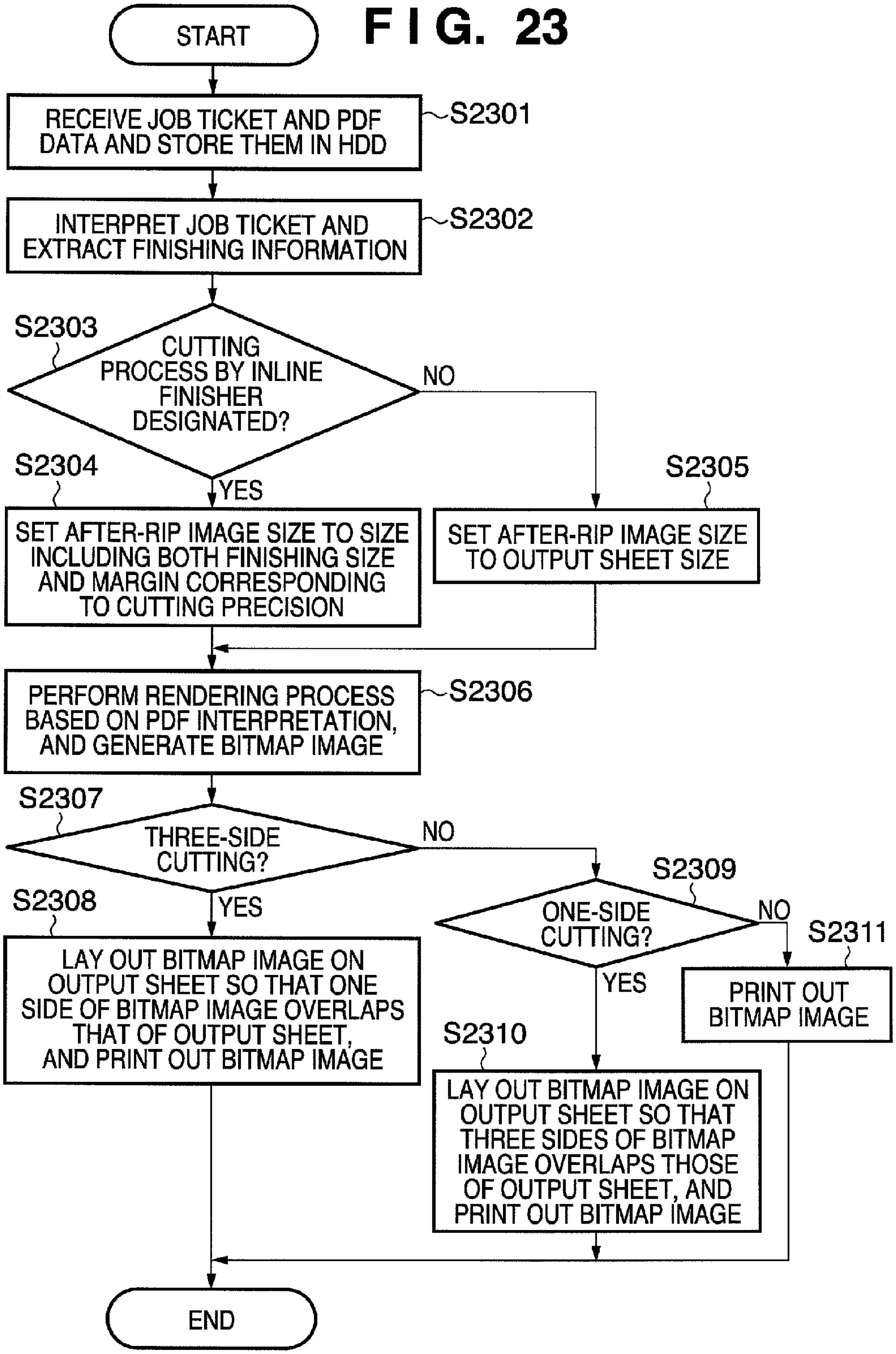
FIG. 23 is a flowchart showing a process by the control unit of the printing apparatus according to the first embodiment.

A process by the control unit 205 according to the embodiment will be explained with reference to FIGS. 23 to 26. FIG. 23 is a flowchart showing the process by the control unit of the printing apparatus according to the first embodiment. FIGS. 24A to 24E are views showing a layout in three-side cutting executed by the control unit according to the first embodiment. FIGS. 25A and 25B are views showing a layout in one-side cutting executed by the control unit according to the first embodiment. FIG. 26 is a table showing the contents of a management table looked up by the control unit according to the first embodiment. In a description of the process sequence with reference to FIG. 23, a detailed description will be added with reference to FIGS. 24A to 26, as needed.

In step S2301, the control unit 205 receives a job ticket and PDF data (i.e., a print job), and stores them in the HDD 209. The printing apparatus 100 receives a print job via the user interface of an external apparatus capable of communicating data with the printing apparatus 100. The printing apparatus 100 may receive a print job via the user interface, e.g., operation unit 204 of the printing apparatus 100.

In step S2302, the control unit 205 interprets the job ticket and extracts finishing information. The finishing information is information about a sheet process type and its details. The sheet process type is information representing whether to execute a sheet process such as stapling, punching, cutting, shift delivery, saddle stitching, folding, case binding, pad binding, or large-volume stacking. The detailed information includes the number of cutting sides such as three- or one-side cutting, punch position information representing two or multiple holes, and staple position information representing single or double staples.

In step S2303, the control unit 205 determines whether a cutting process by an inline finisher is designated. In executing processes in S2303, S2304, and S2305, the control unit 205 looks up a management table 2600 shown in FIG. 26. When the cutting method is cutting by an inline finisher (inline type sheet processing apparatus 200), the control unit 205 shifts the process to S2304.

In step S2304, the control unit 205 sets an after-RIP image size to a size including both a finishing size and a margin (supplementary area 1603) corresponding to the cutting precision. That is, the control unit 205 generates an after-RIP image in which printing in the supplementary area 1603 (also referred to as, e.g., a bleed portion or outside the finishing-size rectangle) exceeding the finishing size is limited. The control unit 205 may limit the supplementary area 1603 to an area smaller than the supplementary area 1603 and larger than the finishing size for a near-line or offline finisher. The control unit 205 may not ensure the supplementary area 1603. In this case, for example, if the cutting process is done as part of the sheet process, the sheet processing apparatus 200 which executes the cutting process must have a precision enough to accurately cut sheets into the finishing size because no bleed is set.

If the cutting method is cutting by a non-inline finisher, the control unit 205 shifts the process to S2305. In step S2305, the control unit 205 sets an after-RIP image size to an output sheet size. That is, the control unit 205 generates print data for which printing outside the finishing-size rectangle is set.

Figure 24A:
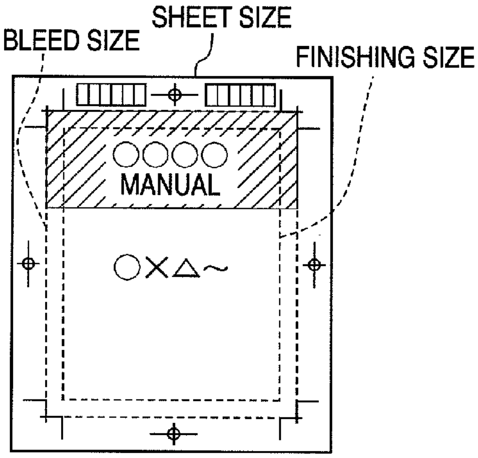
FIGS. 24A to 24E are views showing a layout in three-side cutting executed by the control unit according to the first embodiment.
Figure 24B:
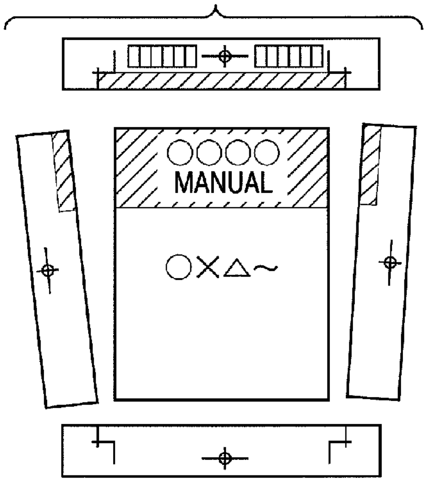
Figure 25A:
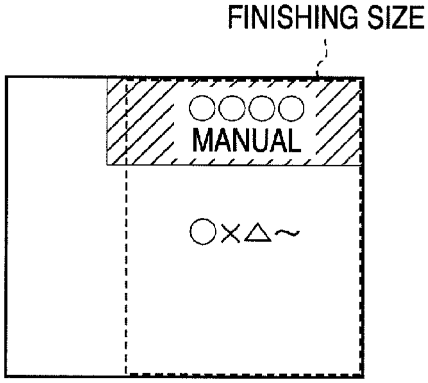
FIGS. 25A and 25B are views showing a layout in one-side cutting executed by the control unit according to the first embodiment.
Figure 25B:
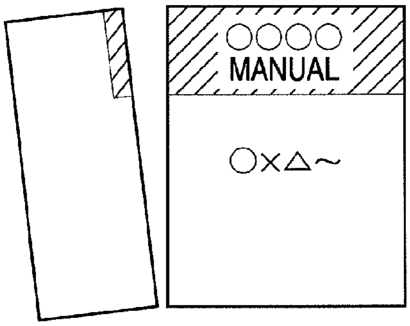

As shown in FIG. 24A, PDF designates a sheet size (MediaBox), finishing size (CropPox), and bleed size (BleedBox) in data. The sheet size is rectangle information which designates the size of an output medium. The finishing size is rectangle information which designates a size after cutting in bookbinding or the like. PDF data in FIG. 24A assumes cutting as illustrated in FIG. 24B. The bleed size is rectangle information which designates a size containing a margin outside the finishing size in consideration of a cutting position error. In the absence of a bleed, even if the user wants to print up to the page end of a final product, the page end may not be printed due to a cutting position error.

In S2304, a size containing a margin based on actual cutting precision information is set as an after-RIP image size, and is different from a finishing size designated in PDF data. The cutting precision information is acquired by communication with an inline type post-processing apparatus which is connected to the printing apparatus 100 and actually performs the cutting process.

The setting of the after-RIP image size in steps S2304 and S2305 also defines the relationship between the coordinates of a bitmap generated after RIP and those of original PDF data. The origin of the bitmap coordinates is the upper left corner of a generated bitmap. The origin of original PDF data is the lower left corner of a sheet-size rectangle. In other words, the setting of the after-RIP image size defines the positional relationship between these two origins.

Figure 24C:
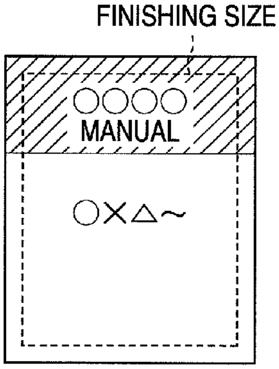

After setting the after-RIP image size, the control unit 205 performs a RIP process for PDF data in step S2306. The control unit 205 interprets the PDF data and performs a rendering process, generating bitmap data. In the RIP process, a request for rendering outside the after-RIP image size set in step S2304 or S2305 is excluded by a clipping process. Bitmap data illustrated in FIG. 24C is generated from PDF data illustrated in FIG. 24A.

Figure 24D:
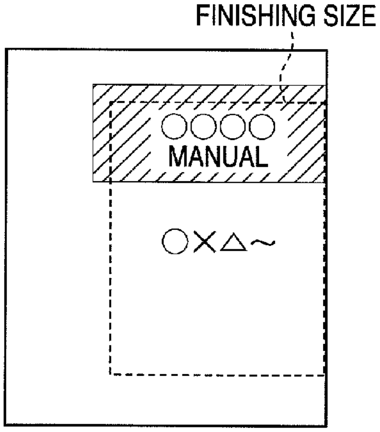
Figure 24E:
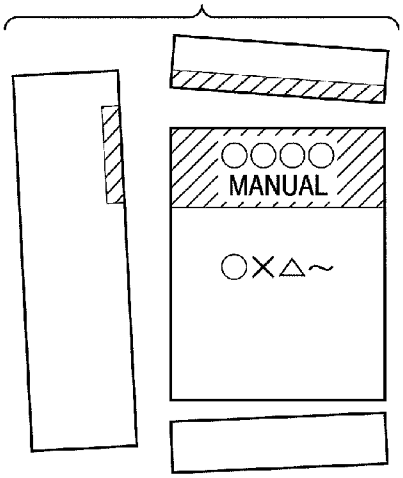

In step S2307, the control unit 205 determines whether the cutting process is three-side cutting. If the cutting process is three-side cutting, the control unit 205 shifts the process to S2308; if NO, to step S2309. In step S2308, the control unit 205 lays out the bitmap image on an output sheet so that one side of the bitmap image overlaps that of the output sheet. Then, the control unit 205 prints out the bitmap image. In three-side cutting, the case binding apparatus cuts three sides of a sheet printed by the printer unit 203, outputting the sheet. The PDF data illustrated in FIG. 24A is laid out on a sheet as illustrated in FIG. 24D, and then output. The PDF data and sheet are so aligned as to make only their right sides in the right-to-left direction overlap each other. In the top-and-bottom direction, the RIPed bitmap is laid out at the center of the sheet so as to generate upper and lower uniform margins. In this manner, the control unit 205 according to the embodiment functions as a print position correction unit to correct a position on a sheet where an image is printed in accordance with the sheet process.

In step S2309, the control unit 205 determines whether the cutting process is one-side cutting. If the cutting process is one-side cutting, the control unit 205 shifts the process to S2310; if NO, to step S2311. In step S2310, the control unit 205 lays out the bitmap image on an output sheet so that three sides of the bitmap image overlap those of the output sheet. Then, the control unit 205 prints out the bitmap image. In one-side cutting, the saddle stitching apparatus 200*c* or paste binding apparatus 200*b* cuts one side of a sheet printed by the printer unit 203, outputting the sheet. The PDF data illustrated in FIG. 24A is laid out on a sheet as illustrated in FIG. 25A, and then output. The PDF data and sheet are so aligned as to make their right sides in the right-to-left direction and their upper and lower sides in the top-and-bottom direction overlap each other. In this description, three sides of a medium are aligned for easy comparison. It should be noted that two, upper and lower edges are aligned for the saddle stitching apparatus 200*c* because data of a lower surface to be stitched is also laid out on the same medium as that of an upper surface. In this manner, the control unit 205 corrects a position on a sheet where an image is printed in accordance with the cutting process (sheet process). An output sheet is cut on one side, as shown in FIG. 25B.

In step S2311, the control unit 205 directly prints out the bitmap image on a sheet because no cutting process is performed. The PDF data illustrated in FIG. 24A is printed on a sheet as represented by the original data.

In the embodiment, rendering outside the finishing size is deleted by clipping rendering in RIP of PDF data, but may be deleted by another method. For example, the control unit 205 may control to always form a bitmap image of the sheet size in RIP so as not form a latent image in an area outside the finishing size on the photosensitive drum in printing. It is efficient to delete rendering outside the finishing size in as early a stage as possible in the control sequence. To suppress unnecessary toner consumption, unnecessary rendering can be deleted by any method. The control unit 205 according to the embodiment may limit at least one of the size of the supplementary area 1603 and an object to be printed in the supplementary area 1603 when limiting printing in the supplementary area 1603. That is, both of the two limitation methods are effective for suppressing unnecessary toner consumption.

In the embodiment, printing in the supplementary area is decided by determining whether the inline type sheet processing apparatus 200 executes the cutting process. However, the present invention may adopt another condition as the condition of printing in the supplementary area.

Assume that the printing system can supply the printing medium of a job printed by the printing apparatus 100 to a cutting apparatus capable of executing the cutting process. In this case, the control unit 205 may decide whether to permit or inhibit printing in the supplementary area by determining whether the cutting process is necessary. More specifically, when the target print job does not require the cutting process by the cutting apparatus, the control unit 205 may permit printing in the supplementary area. When the target print job requires the cutting process, the control unit 205 may inhibit printing in the supplementary area.

Similarly, assume that the printing system can supply the printing medium of a job printed by the printing apparatus 100 to a cutting apparatus capable of executing the cutting process. The cutting apparatus will be referred to as cutting apparatus A, and another cutting apparatus will be referred to as cutting apparatus B. Cutting apparatus B receives, via, e.g., a user, the printing medium of a job printed by the printing apparatus 100. In this case, the control unit 205 may decide whether to permit or inhibit printing in the supplementary area by determining which of the cutting apparatuses needs to execute the cutting process for a print target job. More specifically, when the target print job requires the cutting process by cutting apparatus B, the control unit 205 may permit printing in the supplementary area. When the target print job requires the cutting process by cutting apparatus A, the control unit 205 may inhibit printing in the supplementary area.

Effects obtained by the printing system 1000 according to the embodiment are as follows. For example, a user-friendly printing environment adaptable not only to the office environment but also to the POD environment can be built. For example, the printing system 1000 can satisfy needs on actual work site in a printing environment such as the POD environment. Such needs include a need to operate the system at the highest productivity, and a need to reduce the work load on an operator.

More specifically, when an inline type cutting apparatus executes the cutting process, the toner consumption amount can be suppressed, reducing either the running cost of a printing company or that of an office-equipment distributor. When no inline type cutting apparatus executes the cutting process, information (e.g., printer's mark or color bar) necessary for a post-process can be printed, like conventional printing. In this fashion, efficient operations are possible in accordance with whether an inline type post-processing apparatus performs a post-process. Since rendering data outside the finishing size is deleted in RIP, the RIP process time can be shortened, and the storage area for storing a bitmap image after RIP can be saved. A convenient, flexible printing environment capable of coping with use cases and needs assumable in the conventionally assumed POD environment can be established. Various mechanisms can be provided toward practical use of a product.

Second Embodiment

Figure 27A:
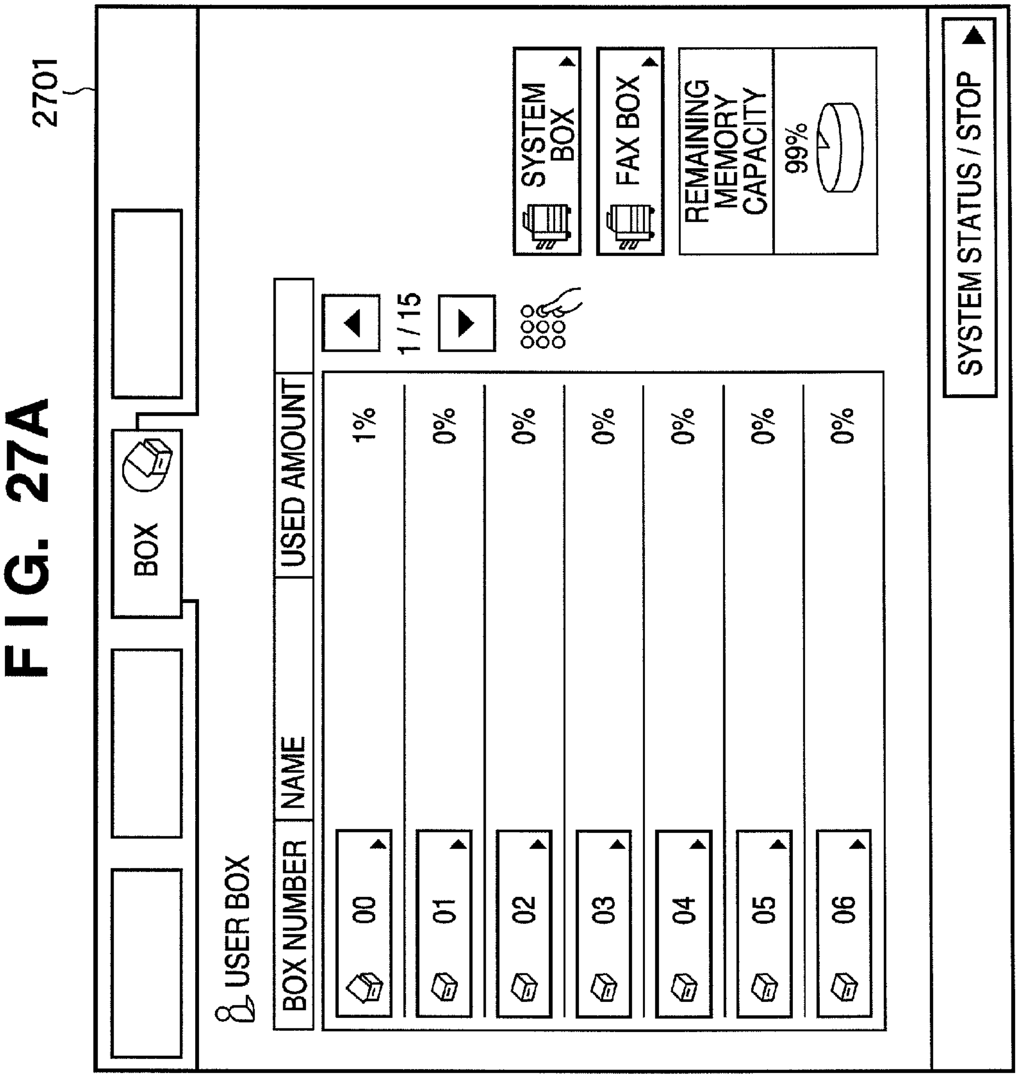
FIGS. 27A to 27C are views showing display control examples for a UI unit according to the second embodiment.
Figure 27B:
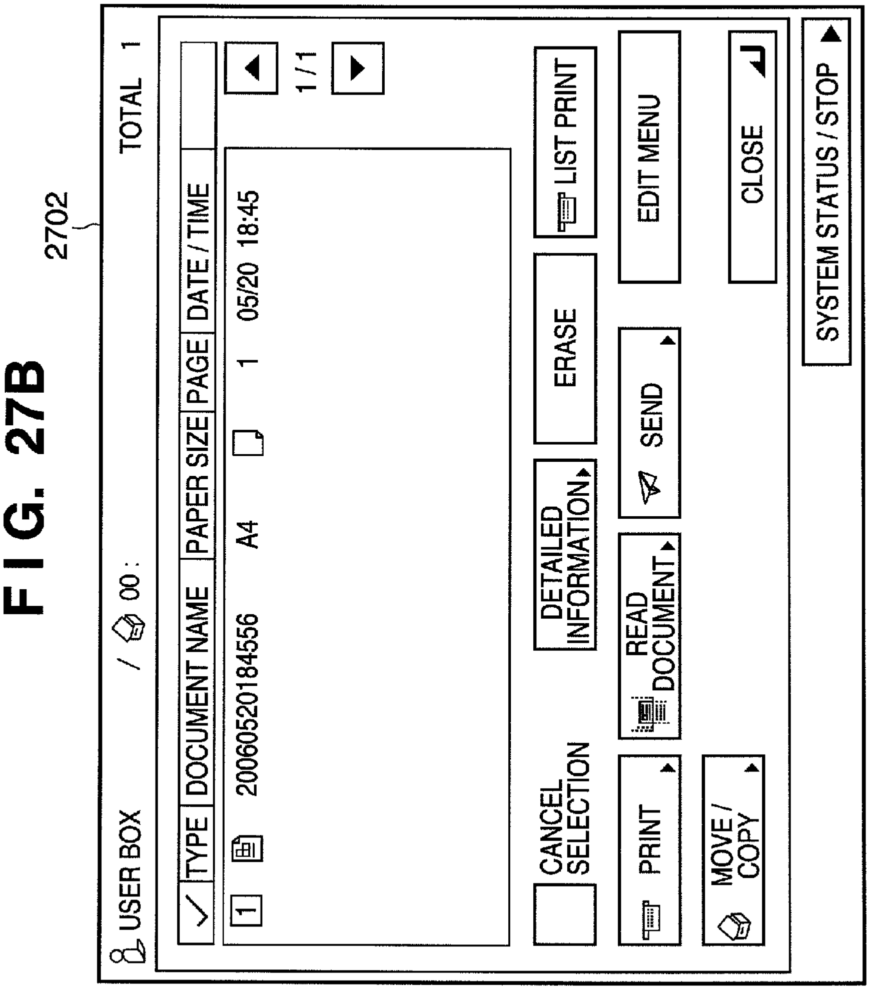
Figure 27C:
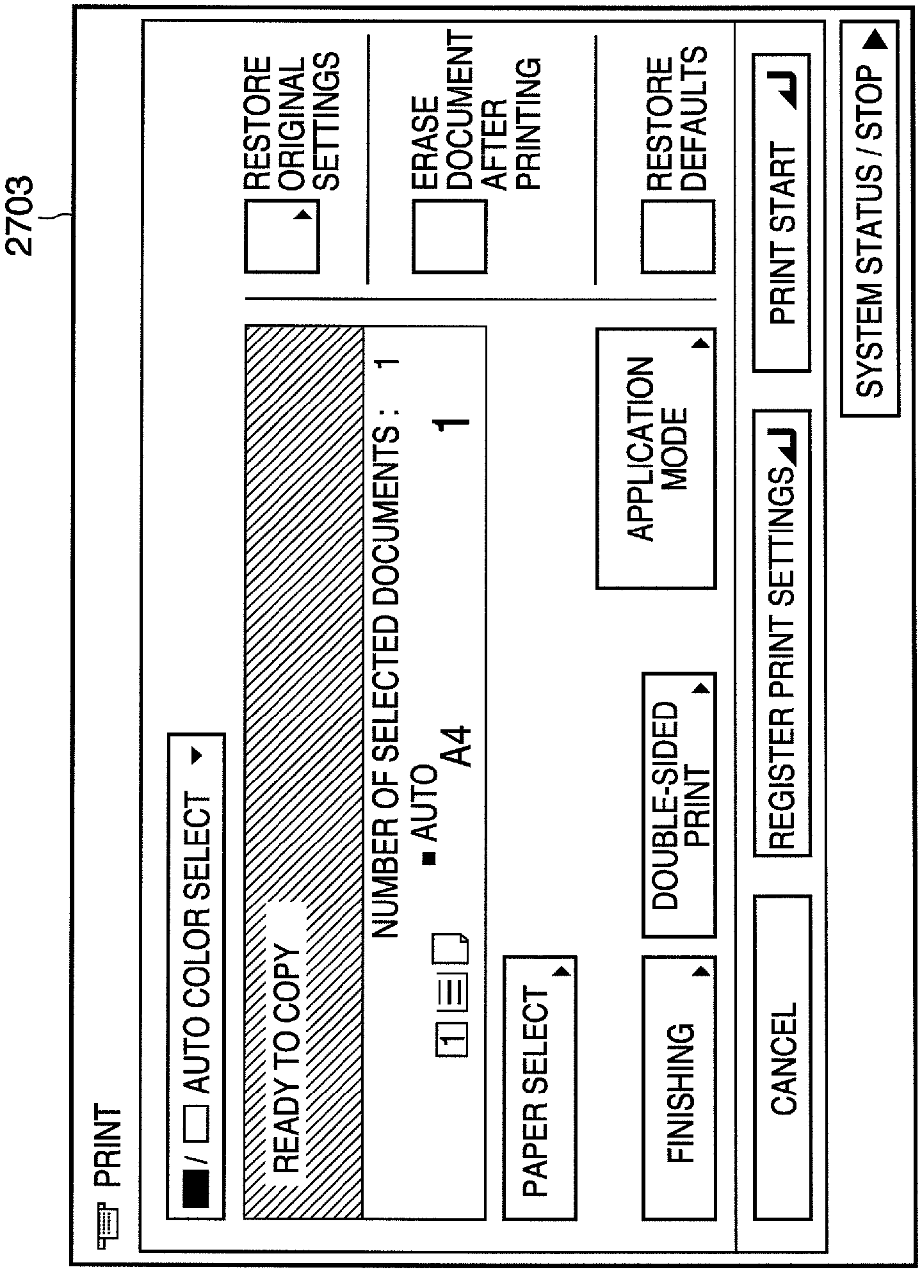

The second embodiment will be described with reference to FIGS. 27A to 28. FIGS. 27A to 27C are views showing display control examples for a UI unit according to the second embodiment. FIG. 28 is a table showing the contents of a management table looked up by a control unit according to the second embodiment. The printing system according to the first embodiment print immediately after RIP. To the contrary, a printing system according to the second embodiment temporarily stores RIPed bitmap data by using the box function after RIP.

When storing RIPed bitmap data by using the box function, the user can change print settings. Changeable print settings are the number of copies, double-sided printing, finishing setting, and the like. The finishing setting includes a sheet process type and its details. The sheet process type is setting information representing whether to execute a sheet process such as stapling, punching, cutting, shift delivery, saddle stitching, folding, case binding, pad binding, or large-volume stacking. The detailed setting includes the number of cutting sides such as three- or one-side cutting, punch position information representing two or multiple holes, and staple position information representing single or double staples.

When the user presses a box tub 603 on a display unit 401 in a default state shown in FIG. 6, a control unit 205 causes the display unit 401 to display a box function operation window 2701 in FIG. 27A. If the user presses a key to designate a box number in the operation window 2701, the control unit 205 causes the display unit 401 to display an individual box operation window 2702 in FIG. 27B. If the user presses a print key in the operation window 2702, the control unit 205 causes the display unit 401 to display a print setup window 2703 in FIG. 27C. If the user presses a print start button in the print setup window 2703, the control unit 205 causes a printer unit 203 to print designated document data. In this case, the control unit 205 executes printing by directly using the print settings of the document data, i.e., the print settings of an original print job. The document data is substantially synonymous with a set of RIPed bitmap data. If the user presses a finishing key in the print setup window 2703, the control unit 205 causes the display unit 401 to display a sheet process selection window shown in FIG. 7.

Even if a job designates cutting by an inline finisher as a job setting before box storage, the setting may be changed to cancel cutting by an inline finisher in actual printing. In contrast, even if a job does not designate cutting by an inline finisher as a job setting before box storage, the setting may be changed to designate cutting by an inline finisher in actual printing.

When the setting is changed to designate cutting in printing, an unnecessary print area (e.g., supplementary area) can be deleted by, e.g., the process of a RIPed bitmap. However, when cutting is canceled in printing, image data to be printed in the supplementary area outside the finishing area has already been deleted from a RIPed bitmap and cannot be restored.

To solve this, according to the second embodiment, the control unit 205 functions as a storage unit. More specifically, only when box storage is designated and cutting by an inline finisher is designated, the control unit 205 generates and stores both a bitmap of the finishing size, and a bitmap from which an image to be printed in the unnecessary supplementary area is not deleted. By looking up a management table 2800 shown in FIG. 28, the control unit 205 controls a method of generating a RIPed bitmap. As a print image storage method, the control unit 205 executes the same control as a management table 2600 shown in FIG. 26 when only printing an image without storing it, i.e., when executing no box storage. According to the print image storage method, the control changes between storage in a box and storage in a box after printing. When cutting by an inline finisher is designated, the control unit 205 generates a RIPed bitmap in which the supplementary area outside the finishing-size rectangle is limited. The control unit 205 also generates a RIPed bitmap in which the supplementary area outside the finishing-size rectangle is set. When cutting by a non-inline finisher is designated, the control unit 205 generates only a RIPed bitmap in which the supplementary area outside the finishing-size rectangle is set.

As a similar control method, the following method is applicable. Only when box storage is designated and cutting by an inline finisher is designated, the control unit 205 stores both a RIPed bitmap of the finishing size, and original PDL data. When designation of cutting by an inline finisher is canceled in printing, the control unit 205 performs the RIP process for the original PDL data again to generate again a RIPed bitmap in which the supplementary area outside the finishing-size rectangle is not limited. Storage of these images may also comply with information set by a user (operator). That is, the control unit 205 may store a finishing-size bitmap and a bitmap to be printed in the supplementary area in accordance with setting information of the print job input from the operation unit 204 or an external apparatus.

As described above, the control method according to the second embodiment can also obtain the effects described in the first embodiment even in the use of the box function.

Other Embodiments

A host computer (e.g., the PC 103 or 104) may use an externally installed program to achieve the functions shown in the drawings in the embodiments. In this case, the host computer may externally install data for displaying the above-described operation windows, and display various operation windows on the display unit of the host computer.

An example of this operation has been described using the configuration of the UI windows in FIGS. 17A to 17C. A printer driver in the host computer generates page description language data in a general page description language such as PostScript. When the printer driver can determine whether to use an inline finisher, as shown in FIG. 17B, it is rational to limit the rendering area in generating data. The CPU of the host computer controls the print data generation method using a management table 2900 shown in FIG. 29. That is, when cutting by an inline finisher is designated, the CPU of the host computer generates print data (page description language data) in which rendering outside the finishing-size rectangle is limited. When cutting by a non-inline finisher is designated, the CPU of the host computer generates print data (page description language data) in which rendering outside the finishing-size rectangle is set.

In this configuration, the present invention is also applicable to a case where an output apparatus receives a set of information including a program from a storage medium such as a CD-ROM, flash memory, or FD, or from an external storage medium via a network.

As described above, the object of the present invention is also achieved by supplying a storage medium which records software program codes for implementing the functions of the above-described embodiments to a system or apparatus, and reading out and executing the program codes stored in the storage medium by the computer (or CPU or MPU) of the system or apparatus.

In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD.

In this case, the program code read out from the storage medium implements the functions of the above-described embodiments, and the storage medium which stores the program codes constitutes the present invention.

As another program supply method, a computer program itself or a compressed file containing an automatic installing function may be downloaded to a recording medium such as a hard disk. As one downloading method, a client computer is connected to an Internet homepage via the browser of the client computer to download the computer program or the compressed file from the homepage. It is also possible to group program codes which form the program of the present invention into a plurality of files, and download the files from different homepages. That is, claims of the present invention also incorporate a WWW server, FTP server, and the like which prompt a plurality of users to download the program files for implementing functional processes of the present invention by a computer.

The program of the present invention can also be encrypted, stored in a storage medium such as a CD-ROM, and distributed to a user, decrypted using separately acquired key information, and installed in a computer. As a key information distribution method, a user who satisfies predetermined conditions is prompted to download key information from a homepage via the Internet.

The functions of the above-described embodiments are implemented when the computer executes the readout program codes. An OS (Operating System) or the like running on the computer may perform some or all of actual processes on the basis of the instructions of the program codes. In this case, the present invention also includes a case where the functions of the above-described embodiments are implemented by this process.

The present invention can also take another form. First, the program codes read out from the storage medium are written in the memory of a function expansion board inserted into the computer or the memory of a function expansion unit connected to the computer. Then, the CPU of the function expansion board or function expansion unit performs some or all of actual processes on the basis of the instructions of the program codes. In this case, the present invention also includes a case where the functions of the above-described embodiments are implemented by this process.

The present invention may be applied to a system including a plurality of devices or an apparatus formed by a single device. The present invention can also be achieved by supplying a program to the system or apparatus. In this case, the system or apparatus can obtain the effects of the present invention by proving, to the system or apparatus, a storage medium which stores a program represented by software for achieving the present invention.

The present invention is not limited to the above-described embodiments, and various modifications (including organic combinations of embodiments) can be made without departing from the scope of the invention, and are not excluded from the scope of the invention. For example, in the embodiments, the control unit 205 in the printing apparatus 100 serves as a main controller for various control operations. Instead, for example, an external controller in a housing different from the printing apparatus 100 may also execute some or all of various control operations.

Various examples and embodiments of the present invention have been described. It is apparent to those skilled in the art that the spirit and scope of the invention are not limited to a specific description in the specification.

The present invention can provide a printing system which is adaptable not only to the office environment but also to the POD environment and efficiently prints in accordance with the connection of apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207171 filed on Jul. 28, 2006, which is hereby incorporated by reference herein in its entirety.

What is claimed is:

1. A printing system adapted to be able to supply printing media of a job subjected to a printing process by a printing apparatus from the printing apparatus to a cutting apparatus, the cutting apparatus being capable of performing a cutting process for the printing media, the printing system comprising:

a controller adapted to permits printing print data of a job in a specific area on a printing medium by the printing apparatus in case that the job to be processed is a first type job that does not need the cutting process by the cutting apparatus, the controller inhibiting printing print data of a job in the specific area on the printing medium by the printing apparatus in case that the job to be processed is a second type job that needs the cutting process by the cutting apparatus.

2. The system according to claim 1, wherein the first type job includes a job that needs a cutting process by another cutting apparatus different from the cutting apparatus.

3. The system according to claim 1, wherein the printing apparatus includes a printing apparatus capable of printing print data stored in a storage unit on the printing medium, when the job to be processed is the second type job, the controller can print print data of the job in an area except the specific area on the printing medium by causing the printing apparatus to print, via the storage unit, print data to be printed in a print area including no specific area on the printing medium, and even if the job is the second type job, the controller causes the storage unit to hold print data to be printed in a print area including the specific area on the printing medium in case that the job has a setting made by an operator to hold print data in the storage unit even after printing by the printing apparatus.

4. The system according to claim 1, wherein the printing apparatus executes a printing process for a job for which an operator issues a print execute request via a user interface unit of an external apparatus capable of communicating data with the printing apparatus.

5. The system according to claim 1, wherein the printing apparatus executes a printing process for a job for which an operator issues a print execute request via a user interface unit of the printing apparatus.

6. A job processing method for a printing system adapted to be able to supply printing media of a job subjected to a printing process by a printing apparatus from the printing apparatus to a cutting apparatus, the cutting apparatus being capable of performing a cutting process for the printing media, the method comprising the steps of:

permitting printing print data of a job in a specific area on a printing medium by the printing apparatus in case that the job to be processed is a first type job that does not need the cutting process by the cutting apparatus; and inhibiting printing print data of a job in the specific area on the printing medium by the printing apparatus in case that the job to be processed is a second type job that needs the cutting process by the cutting apparatus.

7. The method according to claim 6, wherein the first type job includes a job that needs a cutting process by another cutting apparatus different from the cutting apparatus.

8. The method according to claim 6, wherein the printing apparatus includes a printing apparatus capable of printing print data stored in a storage unit on the printing medium, and the job processing method further comprises the steps of:

when the job to be processed is the second type job, allowing printing of print data of the job in an area except the specific area on the printing medium by causing the printing apparatus to print, via the storage unit, print data to be printed in a print area including no specific area on the printing medium, and even if the job is the second type job, causing the storage unit to hold print data to be printed in a print area including the specific area on the printing medium in case that the job has a setting made by an operator to hold print data in the storage unit even after printing by the printing apparatus.

9. The method according to claim 6, further comprising the step of allowing the printing apparatus to execute a printing process for a job for which an operator issues a print execute request via a user interface unit of an external apparatus capable of communicating data with the printing apparatus.

10. The method according to claim 6, further comprising the step of allowing the printing apparatus to execute a printing process for a job for which an operator issues a print execute request via a user interface unit of the printing apparatus.

11. A non-transitory computer-readable storage medium for storing a computer readable program for causing a computer to execute a method for a printing system adapted to be able to supply printing media of a job subjected to a printing process by a printing apparatus from the printing apparatus to a cutting apparatus, the cutting apparatus being capable of performing a cutting process for the printing media, the method comprising the steps of:

permitting printing print data of a job in a specific area on a printing medium by the printing apparatus in case that the job to be processed is a first type job that does not need the cutting process by the cutting apparatus; and inhibiting printing print data of a job in the specific area on the printing medium by the printing apparatus in case that the job to be processed is a second type job that needs the cutting process by the cutting apparatus.

* * * * *